US 6,359,911 B1

(12) United States Patent
Movshovich et al.

(10) Patent No.: US 6,359,911 B1
(45) Date of Patent: Mar. 19, 2002

(54) MPEG-2 TRANSPORT DEMULTIPLEXOR ARCHITECTURE WITH NON-TIME-CRITICAL POST-PROCESSING OF PACKET INFORMATION

(75) Inventors: Alek Movshovich, Santa Clara; Robert H. Hoem, San Jose; Niranjan A. Puttaswamy, Santa Clara; Brian Lai, Milpitas, all of CA (US)

(73) Assignee: Koninklijke Philips Electronics N.V. (KPENV), Eindhoven (NL)

( * ) Notice: Subject to any disclaimer, the term of this patent is extended or adjusted under 35 U.S.C. 154(b) by 0 days.

(21) Appl. No.: 09/205,807

(22) Filed: Dec. 4, 1998

(51) Int. Cl.$^7$ .................................................. H04J 3/06
(52) U.S. Cl. ........................................ 370/536; 370/542
(58) Field of Search ................................ 370/412, 413, 370/428, 429, 535, 536, 542; 348/412, 422

(56) References Cited

U.S. PATENT DOCUMENTS

| 5,742,623 A | * | 4/1998 | Nuber et al. ................. 714/798 |
| 5,870,396 A | * | 2/1999 | Abu-Amara et al. ........ 370/413 |
| 5,920,572 A | * | 7/1999 | Washington et al. ........ 370/535 |
| 6,032,190 A | * | 2/2000 | Bremer et al. ............... 709/238 |
| 6,061,399 A | * | 5/2000 | Lyons et al. ................. 375/240 |
| 6,088,355 A | * | 7/2000 | Mills et al. .................. 370/392 |
| 6,094,224 A | * | 7/2000 | Sugiyama .................... 348/412 |
| 6,208,643 B1 | * | 3/2001 | Dieterich et al. ........... 370/389 |

OTHER PUBLICATIONS

Texas Instruments 1394 Product Bulletin, *Mixed Signal & Analog Products*, Copyright 1998.
Texas Instruments 1394 Product Bulletin Page 2, *Mixed Signal & Analog Products*, Copyright 1998.
Adam J. Kunzman and Alan T. Wetzel, *1394 High Performance Serial Bus: The Digital Interface for ATV*, Texas Instruments.

* cited by examiner

Primary Examiner—Hassan Kizou
Assistant Examiner—Saba Tsegaye

(57) ABSTRACT

An appatatus for enhancing transport packet demultiplexing and distribution in a digital transport demultiplexing system that inputs a stream of digital multimedia transport packets is provided. The demultiplexing apparatus performs the demultiplexing operation by transferring data packets into and out of circular data queues. These circular queues comprise a contiguous block of memory which are defined by a queue starting address, a queue size, a read pointer, and a write pointer. When data packets are written to and read from a circular queue, the sequential addressing of the queue will automatically rollover from the highest memory location within the queue to the lowest memory location when the sequential addresses move through the circular queue. The addressing of the various queues and sharing of a transport stream bus is handled by a memory arbiter and queue manager.

14 Claims, 38 Drawing Sheets

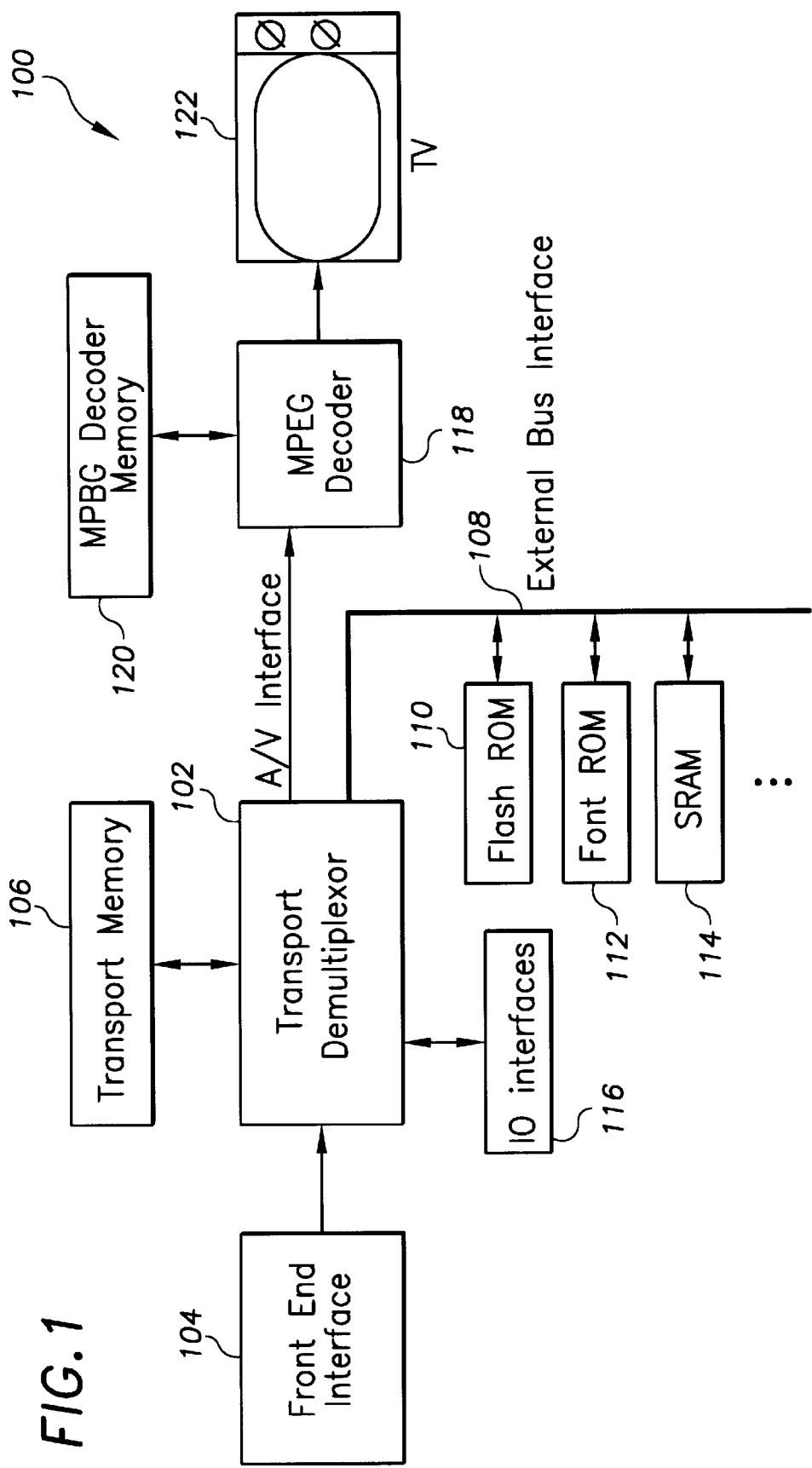

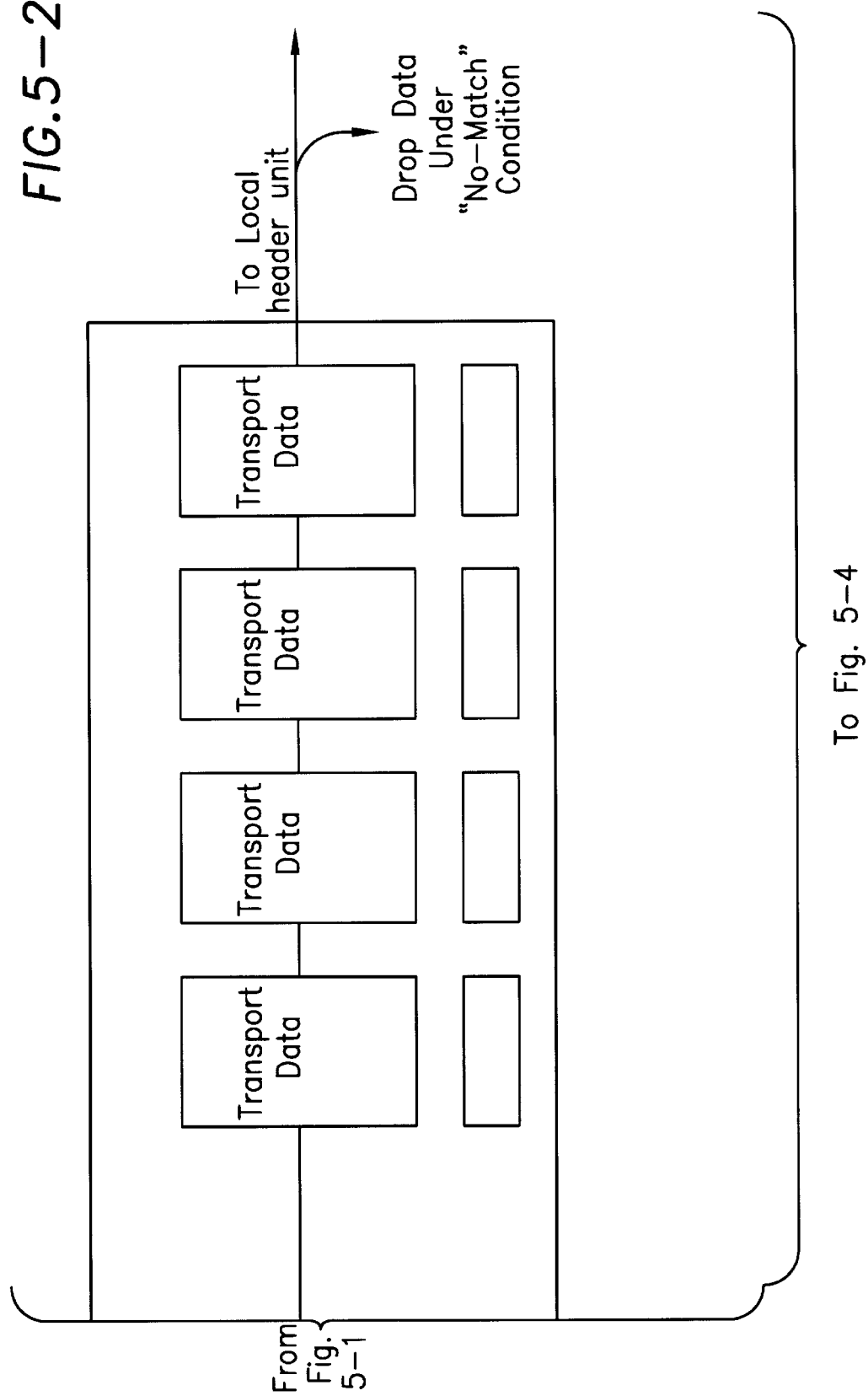

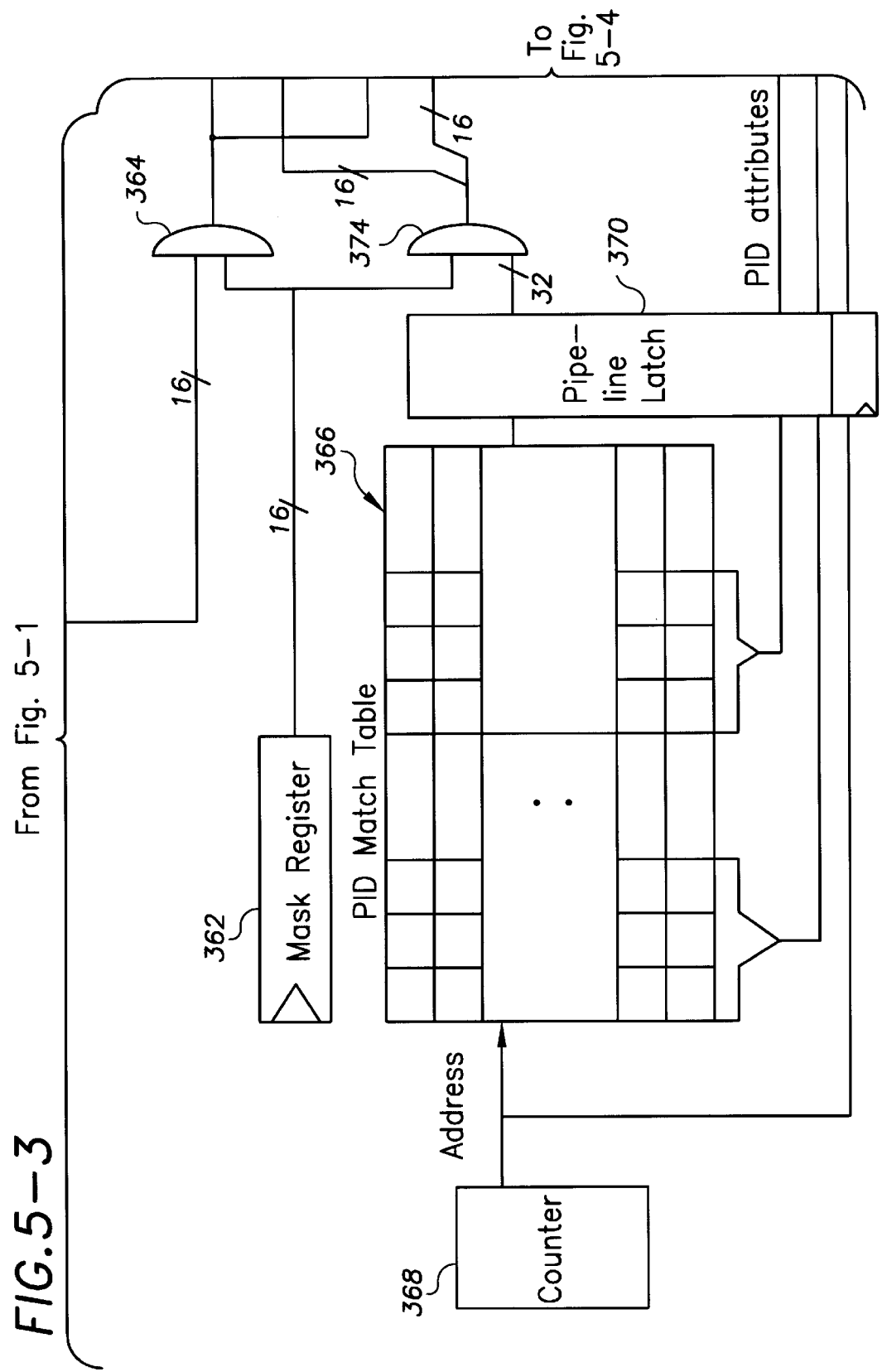

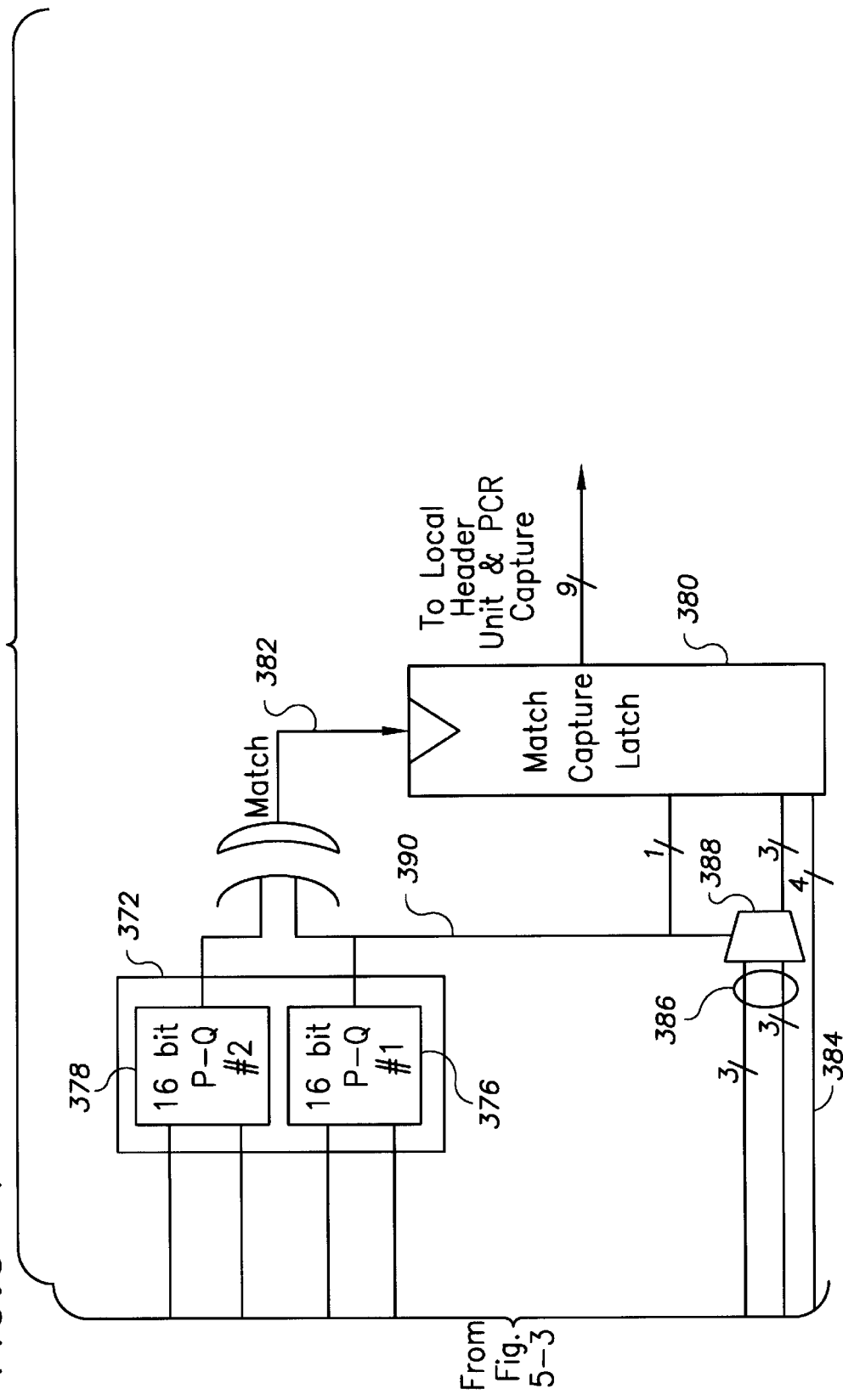

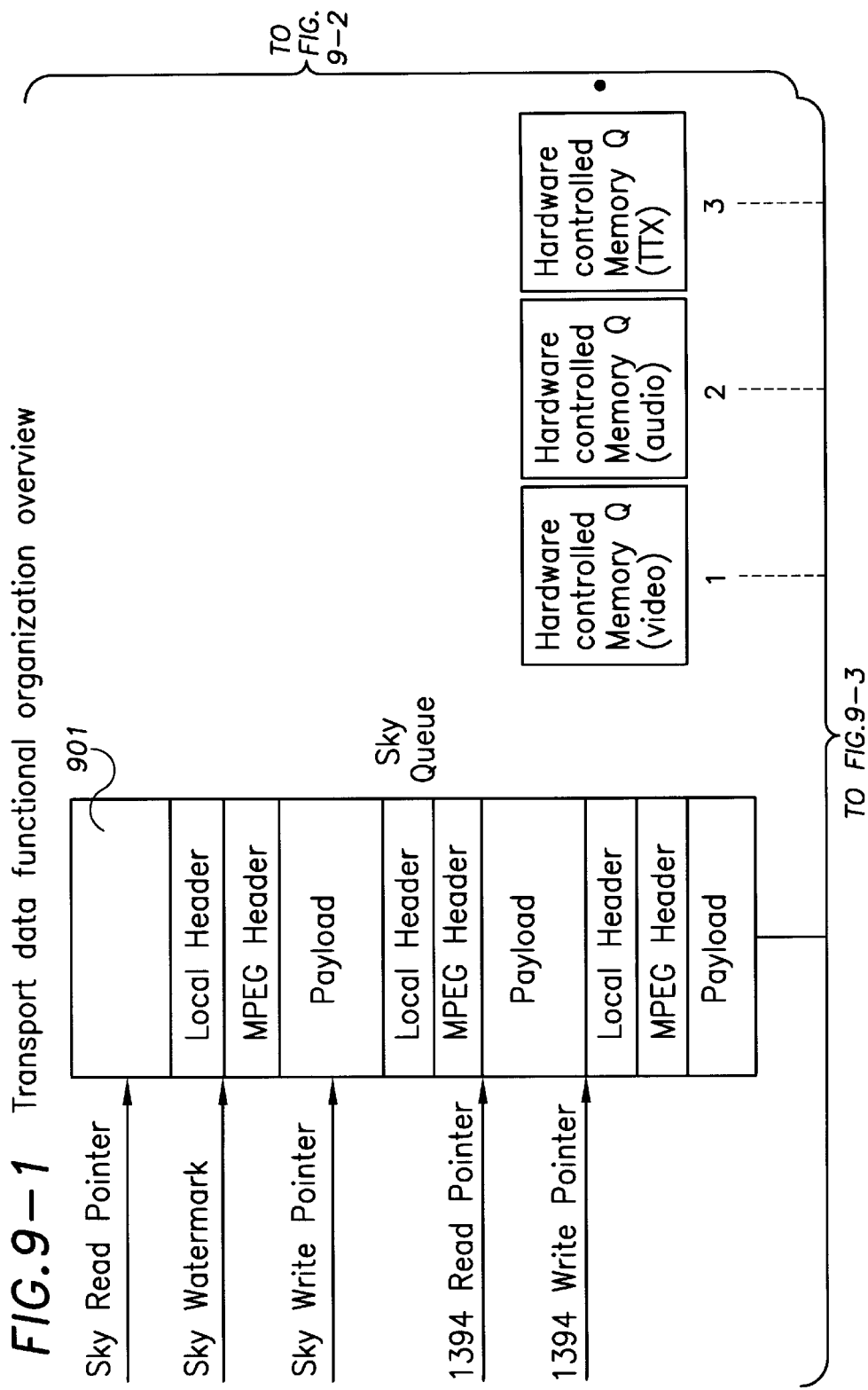
FIG. 9-1 Transport data functional organization overview

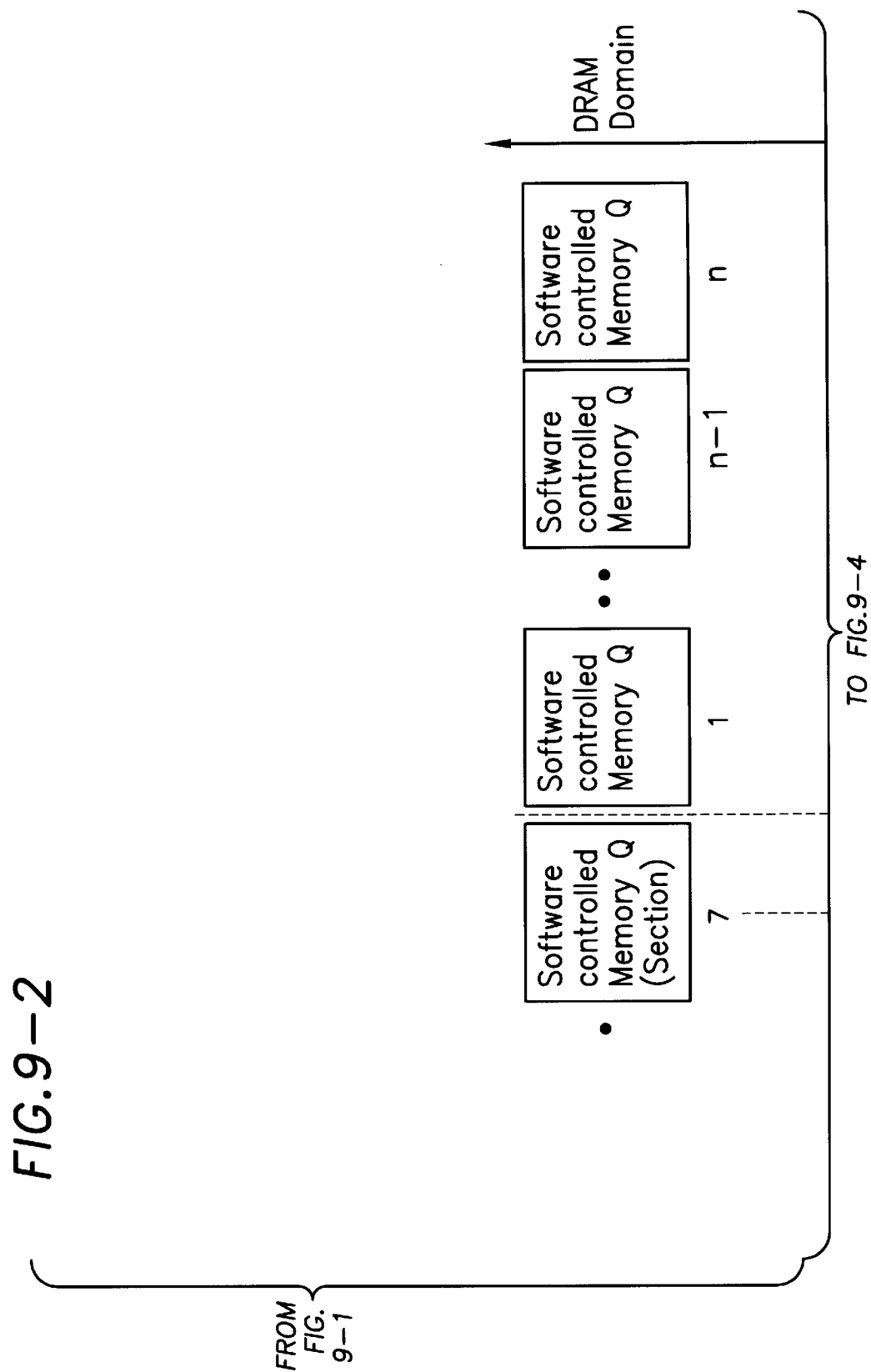

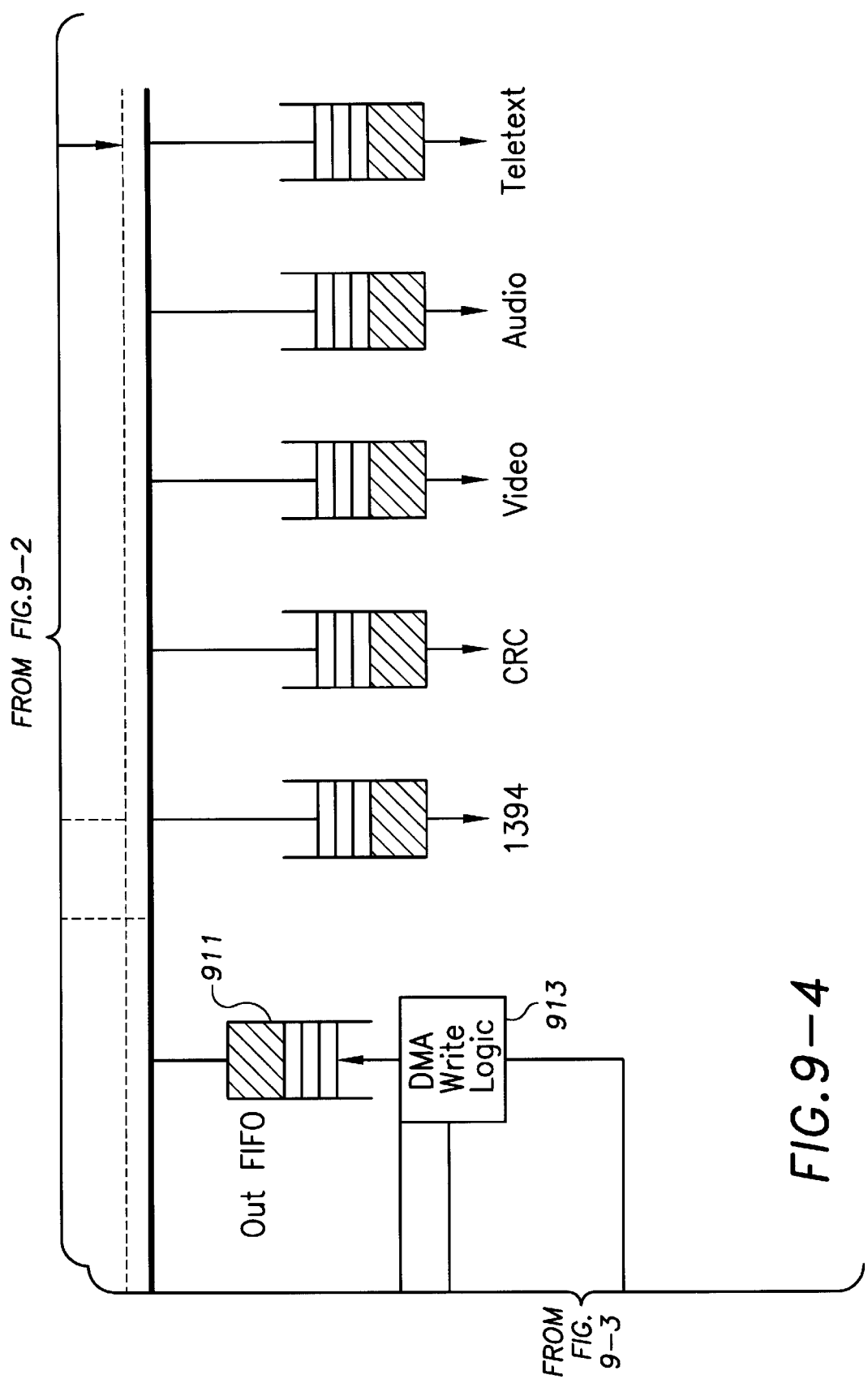

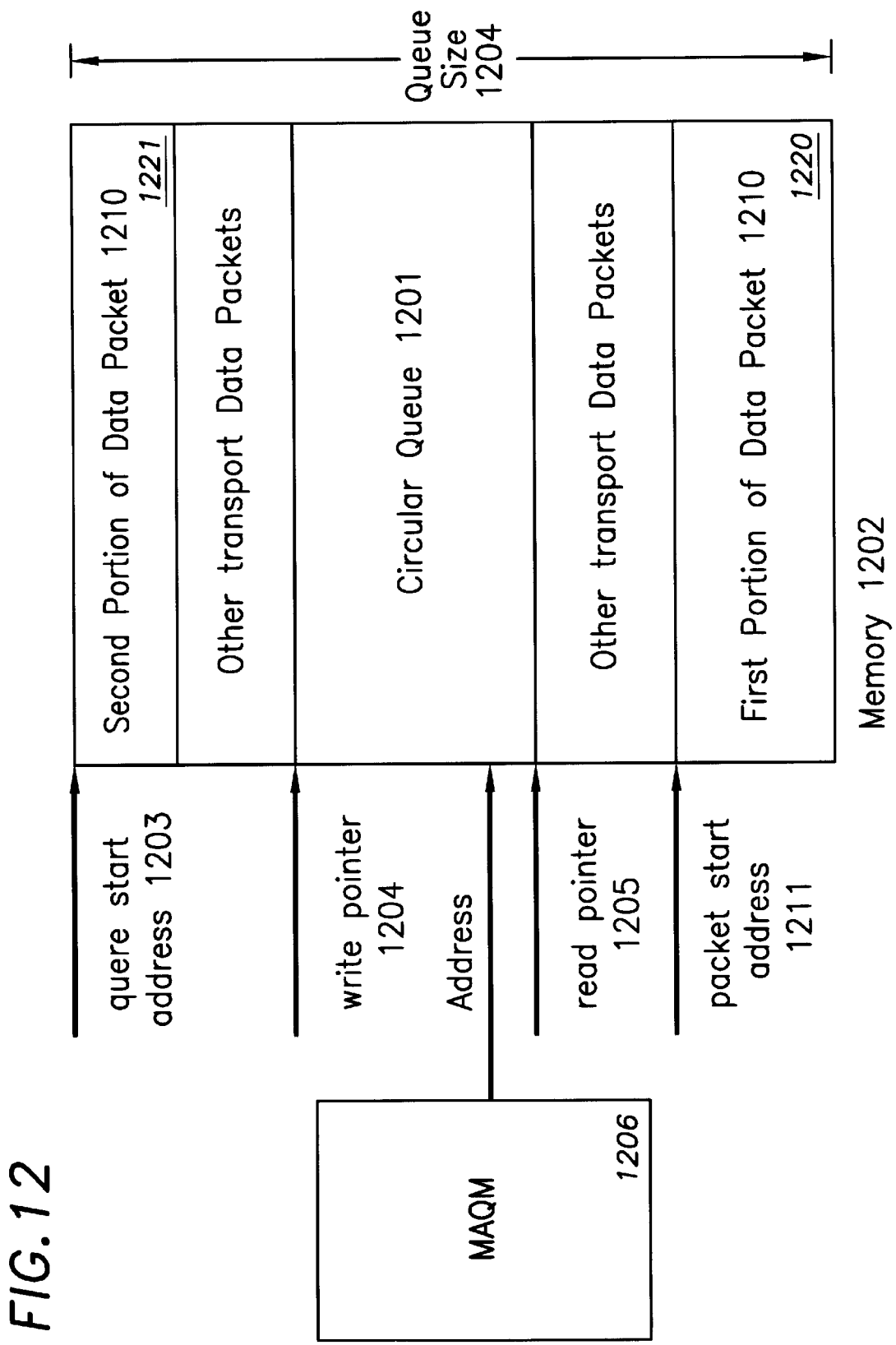

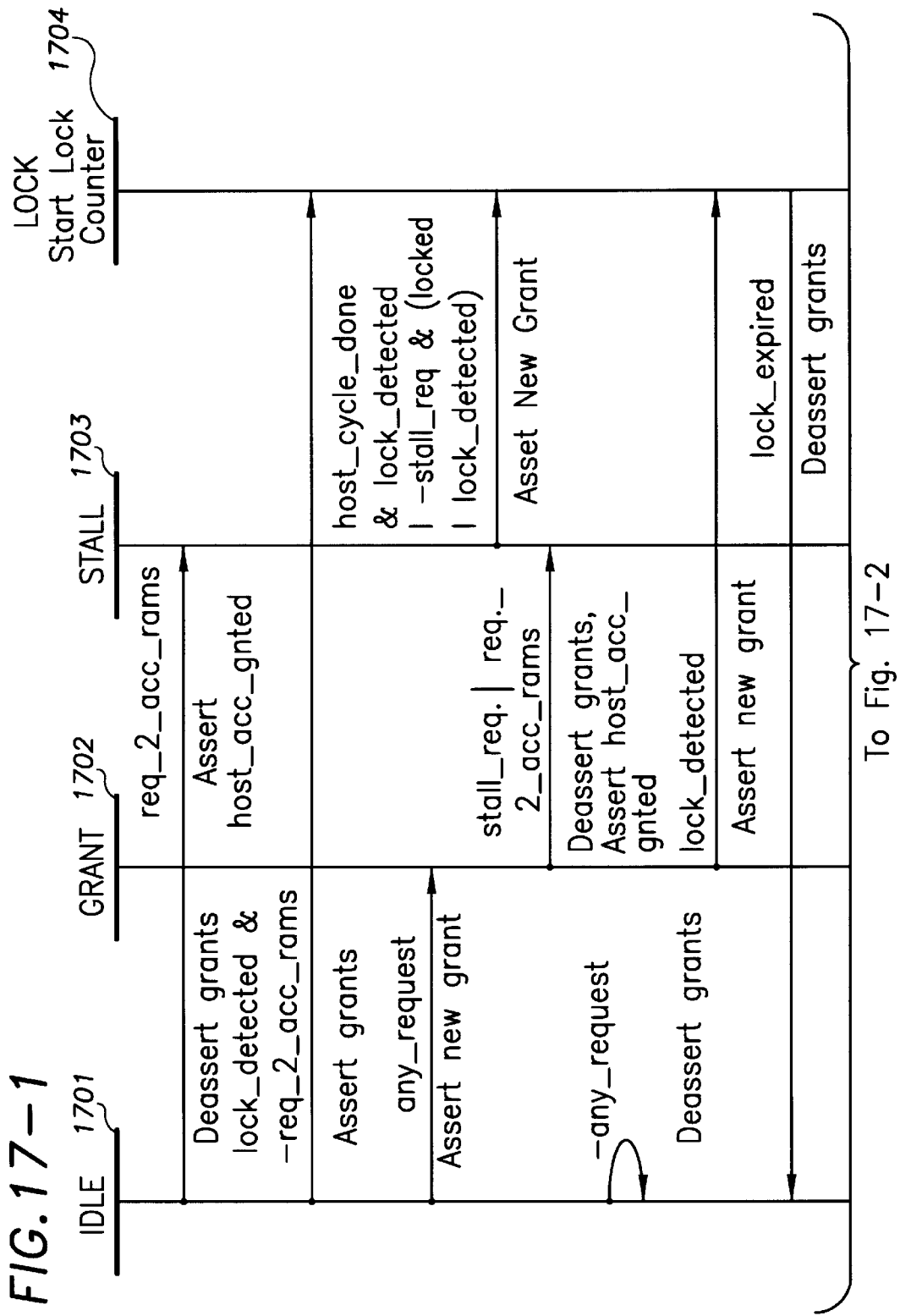

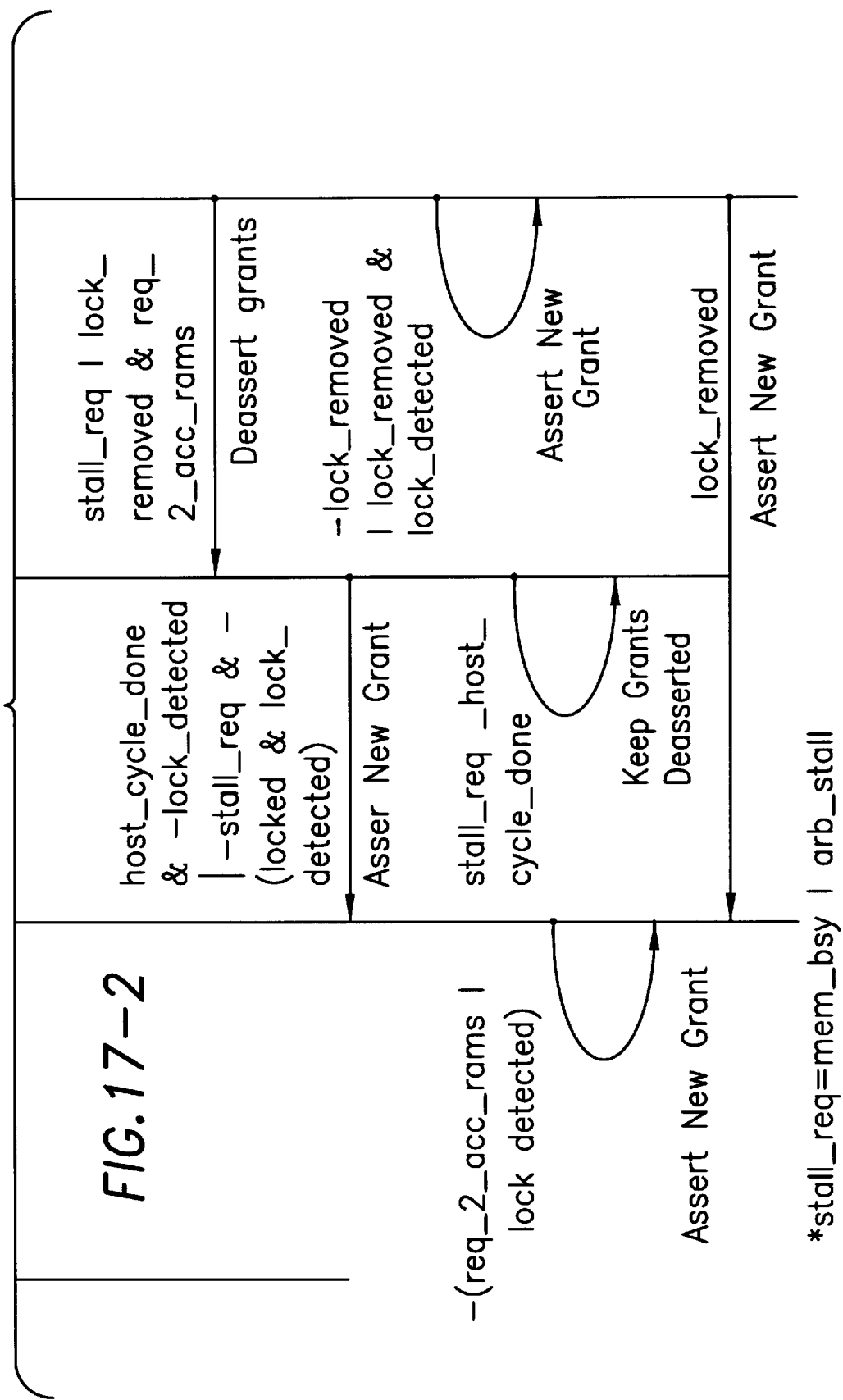

The state machine controls the operation of the pipeline module, flag_compute, ram_host module & the select controls for the various multiplexers.

FIG.21  Base Address Multiplexer
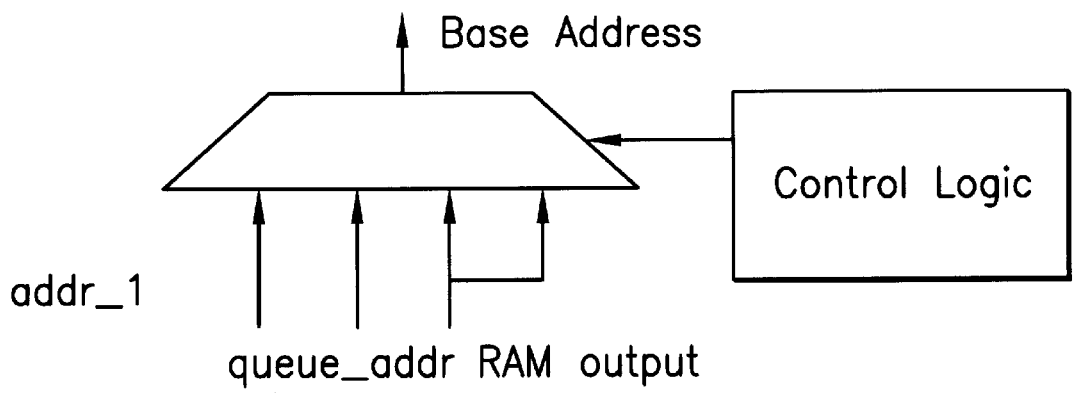
FIG.22  Offset Multiplexer
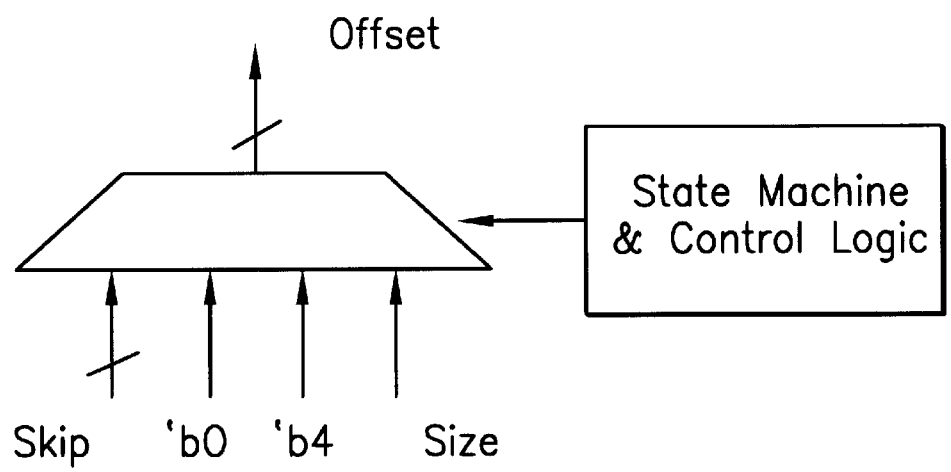

Host Access to the Write Pointer RAM

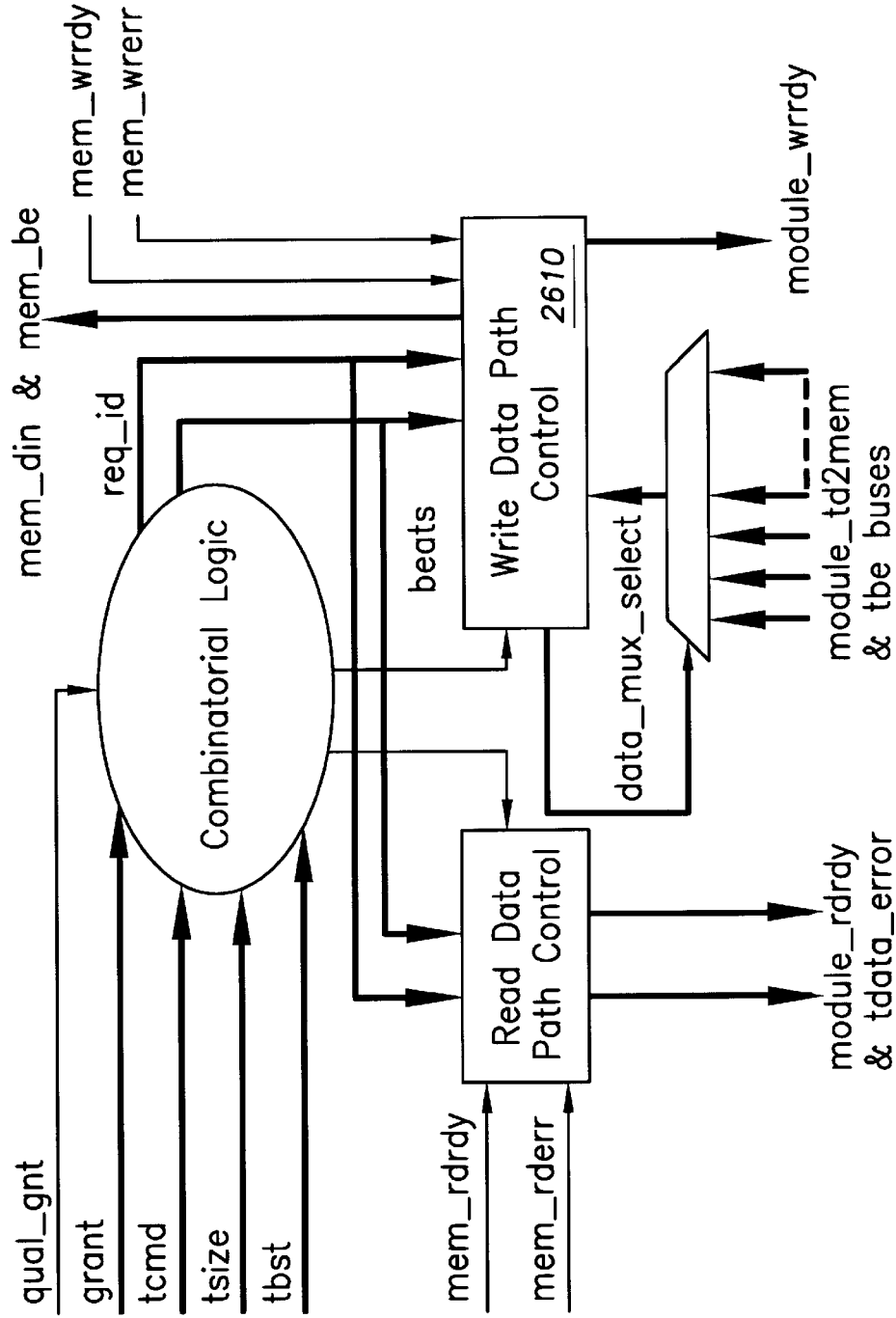
FIG. 26 The Block Diagram of the Data Path Control Module

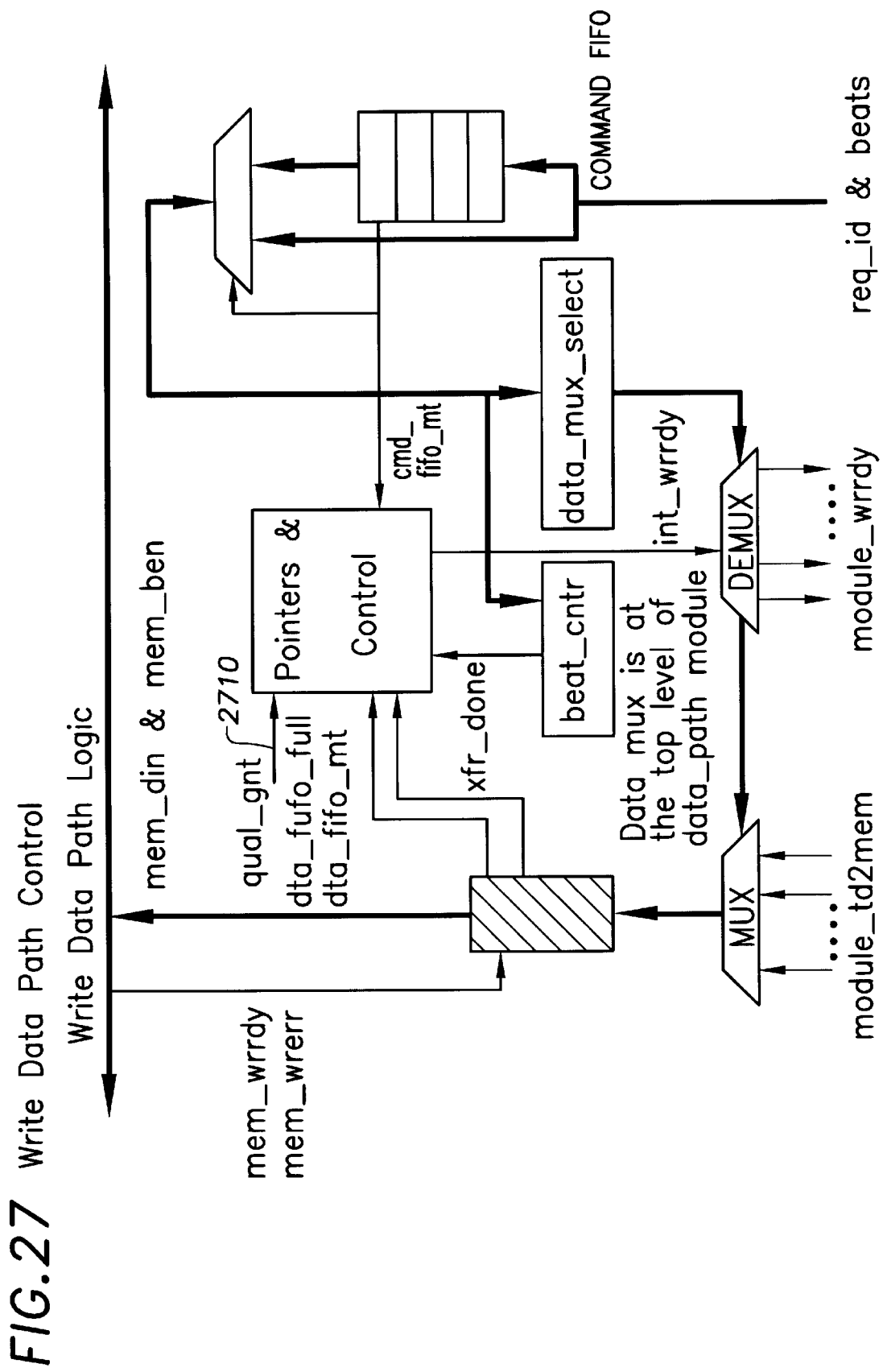
FIG. 27 Write Data Path Logic

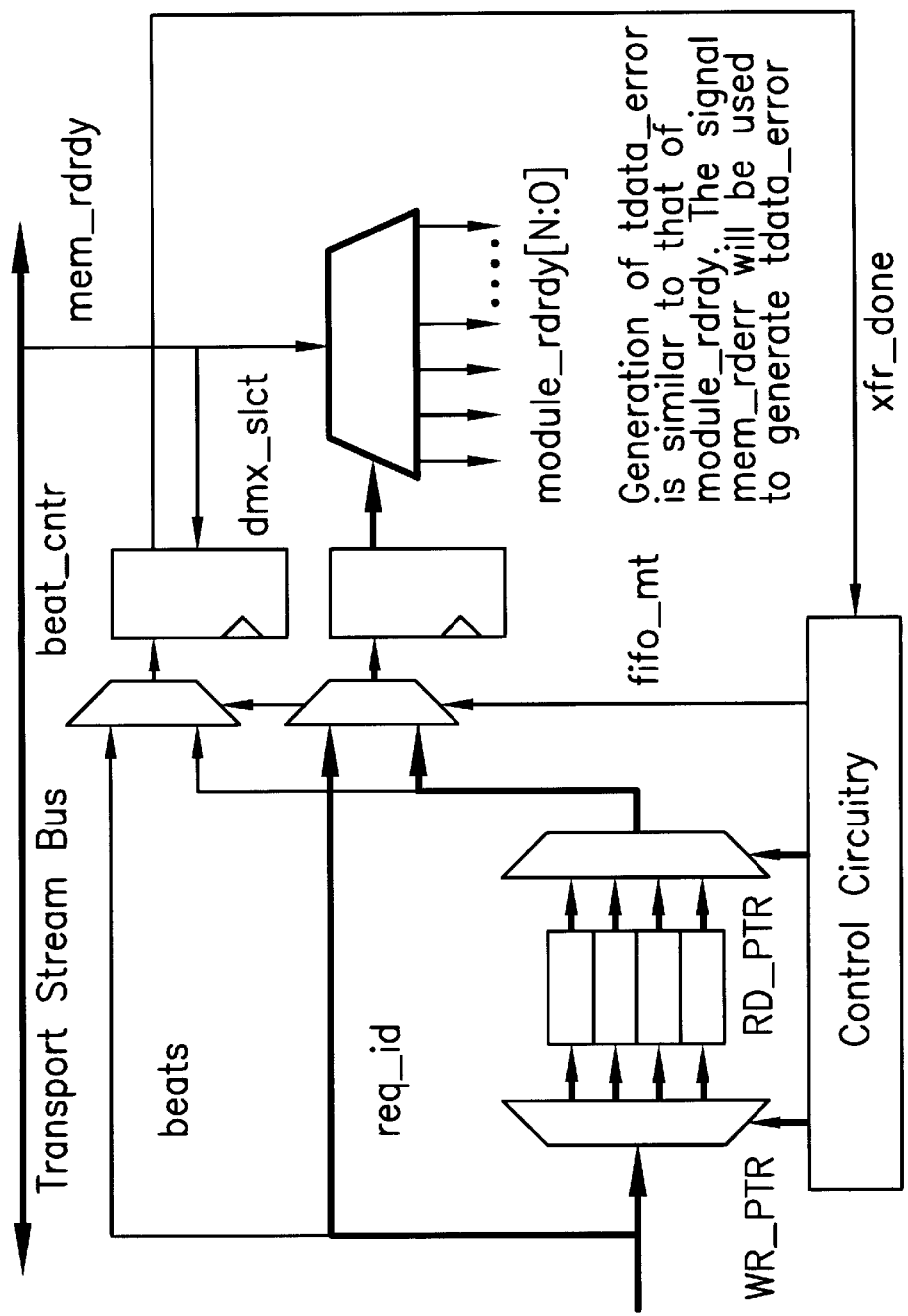
FIG. 28  The Read Datapath Control Logic

MPEG-2 TRANSPORT DEMULTIPLEXOR ARCHITECTURE WITH NON-TIME-CRITICAL POST-PROCESSING OF PACKET INFORMATION

FIELD OF THE INVENTION

The present invention relates generally to digital audio/video program and transport stream demultiplexing. More particularly, this invention relates to a system and method for demultiplexing and distributing transport packets, such as MPEG-2 transport packets, by generating and associating a locally-generated header with each of the transport packets to create a self-contained modified packet which incorporates essential distribution information therein.

BACKGROUND OF THE INVENTION

The development of digital video technology has made possible a variety of telecommunication applications, including video conferencing, video telephony, high-definition television (HDTV), and motion pictures at our desktops to name but a few. The multi-media explosion, including still pictures, moving video, and audio, is already proliferating the threads of the World Wide Web. Technological advances in digital video are presenting new opportunities as well, such as for existing quality television distribution, interactive television, and movies and news on demand.

In order to reduce the high cost of video compression codecs and resolve manufacturer equipment interoperability issues, standardization of digital video techniques has been a high priority. Furthermore, as the computer, telecommunications, and consumer electronics industries continue to amalgamate, the need for standardization becomes more prevalent. To address these and other issues, the International Organization for Standardization (ISO) has undertaken efforts to provide standards for various multi-media technologies, including digital video and audio. The expert group of the ISO that has undertaken this obligation is the Moving Picture Experts Group (MPEG). While the MPEG-1 standards addressed many of the issues facing digital video transmission today, they were not suited for broadcast environments or television applications. Therefore, the ISO developed the MPEG-2 standard (ISO/IEC 13818) to respond to these needs.

The MPEG-2 standard does not, however, define each part of the digital link. This allows for expansion and enhancement of the market via the technology industry. For example, while the MPEG-2 defines a format that can be used to describe a coded video bitstream, it does not specify the encoding method. Instead, it defines only the resulting bit stream.

The MPEG-2 standard is often associated with the video compression aspect of digital video. While video compression is an important part of the MPEG standards, MPEG-2 includes a family of standards involving different aspects of digital video and audio transmission and representation. The general MPEG-2 standard is currently divided into eight parts, including systems, video, audio, compliance, software simulation, digital storage media, real-time interface for system decoders, and DSM reference script format.

The video portion of the MPEG-2 standard (ISO/IEC 13818-2) sets forth the manner in which pictures and frames are defined, how video data is compressed, various syntax elements, the video decoding process, and other information related to the format of a coded video bitstream. The audio portion of the MPEG-2 standard (ISO/IEC 13818-3) similarly describes the audio compression and coding techniques utilized in MPEG-2. The video and audio portions of the MPEG-2 standard therefore define the format with which audio or video information is represented.

Another important part of the MPEG-2 standard is the MPEG-2 Systems portion (ISO/IEC 13818-1). At some point, the video, audio, and other digital information must be multiplexed together to provide encoded bitstreams for delivery to the target destination. The Systems portion of the standard defines how these bitstreams are synchronized and multiplexed together. Typically, video and audio data are encoded at respective video and audio encoders, and the resulting encoded video and audio data is input to an MPEG-2 Systems encoder/multiplexer. This Systems multiplexer can also receive other inputs, such as control and management information, private data bitstreams, and time stamp information. The resulting coded, multiplexed signal is referred to as the MPEG-2 transport stream. More specifically, it is referred to as the transport stream where the digital information is delivered via a network to be displayed in real time, and is referred to as a program stream where a local media-based system is used (e.g., CD-ROM, local hard disk, etc.).

The video and audio encoders provide encoded information to the Systems multiplexer and provide this information in the form of an "elementary stream". The encoded output of a video encoder provides a video elementary stream, and the encoded output of an audio encoder provides an audio elementary stream. In each of these cases, the elementary stream can be organized into "access units", which can represent a picture or an audio frame depending on whether it is part of the video or audio elementary stream. These elementary streams are "packetized" into packetized elementary streams (PES) which are comprised of many PES packets. Each PES packet is size-variable, and includes a packet payload corresponding to the data to be sent within the packet, and a PES packet header that includes information relating to the type, size, and other characteristics of the packet payload. The PES packet payloads are not fixed-length, which allows the packet payload to correspond to the access unit of its particular elementary stream.

PES packets from the video and audio encoders are mapped into transport stream packets (TSP) at the Systems encoder/multiplexor. Each TSP includes a payload portion which corresponds to a fixed-length portion of the PES packet stream, and further includes a TSP header. The transport stream packet header provides information used to transport and deliver the information stream, as compared to the PES packet header that provides information directly related to the elementary stream. Although one PES packet may occupy multiple transport packets, byte "stuffing" is used to fill the remainder of a transport packet payload which was not completely filled by a PES packet, thereby allowing each PES header to be positioned at the beginning of the transport packet payload. This allows the PBS header to be more easily synchronized at the decoder.

The consecutive flow of transport stream packets forms the MPEG transport stream. MPEG-2 Systems provide for two types of transport streams. The first is the single program transport stream (SPTS), which contains different PES streams, but shares a common time base. The multi-program transport stream (IPTS) is a multiplex of various single program transport streams, which in turn may be multiplexed into various network channels for multi-channel delivery to the media user.

The challenge then becomes determining an efficient manner to extract the desired information from the program or transport stream for decoding at the video, audio, or other decoders. Before the transport stream is decoded, the transport packets must undergo analysis, synchronization, demultiplexing, as well as other packet manipulating finctions. These fuictions can be managed by devices such as a MPEG transport demultiplexor, and must be managed properly to execute the functions in the most efficient manner possible to enhance packet transport speed and ease. Due to the extraordinarily high data transfer requirements associated with motion video, packet throughput time is a paramount concern.

One problem affecting the efficiency of such transport demultiplexors is high overhead associated with a host processor transferring the large amount of data contained within the data packets. Accordingly, there is a need for a system and method for enhancing transport packet demultiplexing and distribution in a digital transport demultiplexing system. The present invention allows the transport packet demultiplexing system to manage packet storage and packet attribute information in an efficient and organized manner. The present invention therefore offers advantages and provides solutions to shortcomings of the prior art.

SUMMARY OF THE INVENTION

The present invention is directed to a system and method for demultiplexing and distributing transport packets, such as MPEG-2 transport packets, by generating and associating a locally-generated header with each of the transport packets to create a self-contained modified packet which incorporates essential distribution information therein.

In accordance with one embodiment of the invention, a method for enhancing transport packet demultiplexing and distribution in a digital transport demultiplexing system that inputs a stream of digital multimedia transport packets is provided. Each of the transport packets includes a packet identifier (PID) to identify the digital program or elementary stream to which it corresponds. Local packet information is generated for each of the transport packets, which is used in identifying and distributing the transport packets. A local header is created that includes the generated local packet information, and the local header is linked to its corresponding transport packet to create a modified transport packet. In this manner, each of the modified transport packets represents a self-contained digital transport packet having local distribution information contained therein.

In accordance with another aspect of the invention, a transport stream demultiplexing apparatus for use in a digital transmission system capable of providing a plurality of digital transport packets to a digital program presentation device is provided. The demulitplexing apparatus performs the demultiplexing operation by transferring data packets into and out of circular data queues. These circular queues comprise a contiguous block of memory which are defined by a queue starting address, a queue size, a read pointer, and a write pointer. When data packets are written to and read from a circular queue, the sequential addressing of the queue will automatically rollover from the highest memory location within the queue to the lowest memory location when the sequential addresses move through the circular queue.

The above summary of the present invention is not intended to describe each illustrated embodiment or implementation of the present invention. This is the purpose of the figures and the associated discussion which follows.

BRIEF DESCRIPTION OF THE DRAWINGS

Other aspects and advantages of the present invention will become apparent upon reading the following detailed description and upon reference to the drawings in which:

FIG. 12 is a logic block diagram illustrating a circular queue according to another example embodiment of the present invention.

FIG. 17 is a state diagram illustrating Artiber State Transitions according to another example embodiment of the present invention.

FIG. 21 is a logic block diagram illustrating a a Base Address Multiplexer according to another example embodiment of the present invention.

FIG. 22 is a logic block diagram illustrating a Offset Multiplexer according to another example embodiment of the present invention.

FIG. 26 is a logic block diagram illustrating A Data Path Control Module according to another example embodiment of the present invention.

FIG. 27 is a logic block diagram illustrating a Write Data Path module according to another example embodiment of the present invention.

FIG. 28 is a logic block diagram illustrating Read Data Control Logic module according to another example embodiment of the present invention.

Figures 1, 2:
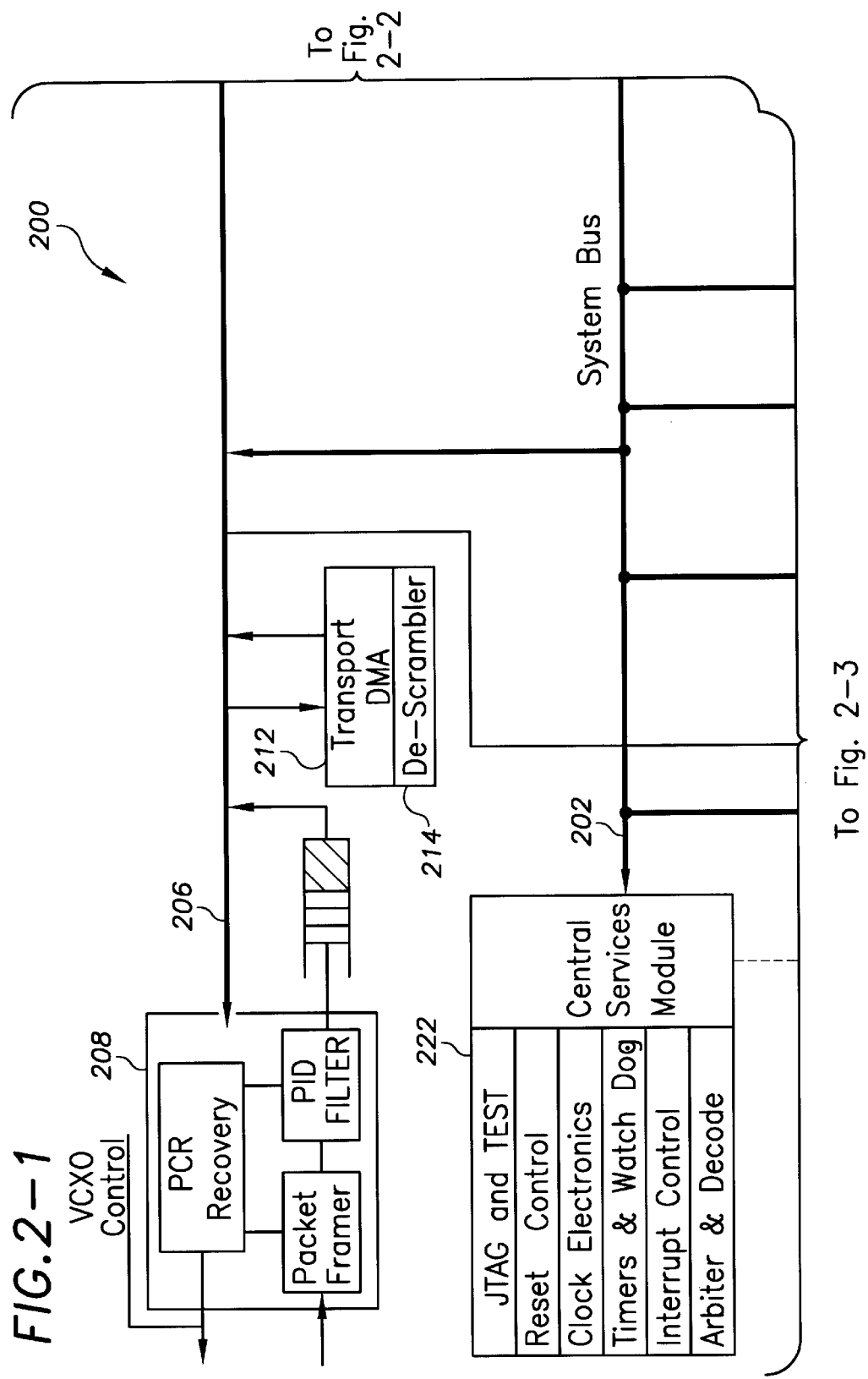
FIG. 1 is a block diagram of an illustrative set-top box system implementation incorporating a digital video transport system in accordance with the present invention.
FIG. 2 is a block diagram of one embodiment of an MPEG transport demultiplexor in accordance with the present invention.
Figure 2:
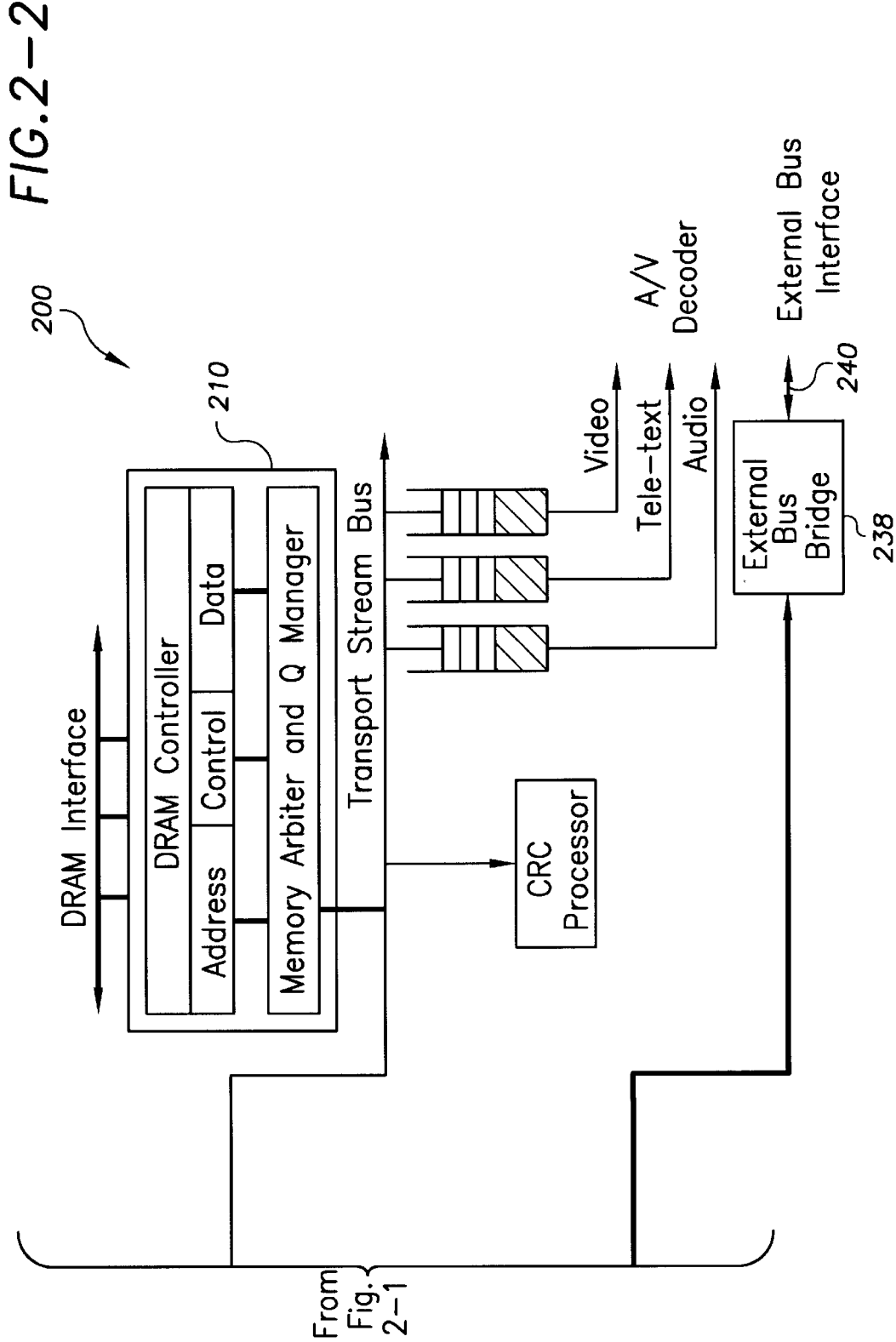

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE ILLUSTRATED EMBODIMENTS

The present invention is particularly advantageous in digital multimedia communications systems implementing the MPEG (Moving Pictures Experts Group) standards such as the MPEG-1 (ISO/IEC 11172-X) and MPEG-2 (ISO/IEC 13818-X) standards, and in transport stream applications relating to digital video in broadband networks. While the present invention may be applicable to many digital communication environments, an appreciation of the invention is best obtained in the context of the following diagrams, in which an MPEG-2 transport stream demultiplexing system is shown according to the present invention.

FIG. 1 is a block diagram of an illustrative set-top box 100 system implementation incorporating a digital video transport system 102 in accordance with the present invention. A set-top box is one of the key components of the modern information superhighway, and is the module that can turn an ordinary television into a sophisticated, interactive, video/audio system. The set-top box can take on a variety of roles, including: serving as a gateway to subscription and pay-per-view services digitally delivered by satellite, cable or terrestrial links; information-on-demand and other interactive services; low cost entrance to the Internet; games console for advanced 3-D video games, and more.

The input of the set-topbox includes the front end interface 104. The front end interface 104 which includes satellite, cable and terrestrial demodulators to receive the transport packets. The transport packets are provided to the digital video transport system 102, which in the present embodiment is an MPEG-2 transport system. The MPEG-2 transport system 102 of the present invention provides various functions, including transport stream synchronization and demultiplexing, cached processing capabilities for transport and application processing, dynamic random access memory (DRAM) control for the transport memory 106, external system interfacing via the external bus interface 108 to various external components such as the flash read only memory (ROM) 110, the font ROM 112 and the static RAM (SRAM) 114, and various set-top box peripheral input/output (I/O) functions via the I/O interfaces 116.

The MPEG-2 transport demultiplexor 102 is also coupled to a digital decoding unit 118, which includes the video and audio decoders, which utilizes the decoder memory 120. The decoded information can then be used by consumer devices, such as television 122.

FIG. 2 is a block diagram of one embodiment of an MPEG transport demultiplexor 200 in accordance with the present invention. In the embodiment described herein, the description will discuss the MPEG-2 standard. However, as will be appreciated by those skilled in the art from the following description, the principles described herein are applicable to other packet-based technologies. While some of the general functions of the MPEG-2 transport demultiplexor 200 are described in connection with FIG. 2, more specific implementations and functions are described in greater detail in connection with the ensuing diagrams.

The MPEG-2 transport demultiplexor 200 utilizes three internal buses, including the system bus 202, peripheral bus 204, and the transport stream bus 206. The system bus 202 is the transport demultiplexor processor bus for the processor, which in one embodiment is a 32-bit bus coupled to a host processor. The peripheral bus 204 is oriented to slow speed devices, and supports all I/O interfaces to the MPEG-2 transport demultiplexor 200. The transport stream bus 206 essentially carries all transport stream data to and from the transport memory.

The packet framer 208 receives the MPEG-2 transport packets from the front end interface demodulators. The transport packets may be input serially. The packet framer 208 provides functionality including synchronization byte detection with programmable synchronization values, synchronization byte lock and unlock hysteresis, packet alignment with programmable packet lengths, hardware packet identifier (PID) comparison, and packet discard capabilities.

A memory controller 210 includes a queue manager, arbiter, and DRAM controller. The memory controller 210 supports EDO-DRAM, SDRAM, and other types of RAM. The queue manager provides rate buffer control for the transport stream data, while the memory controller supports a host interface for the host processor code and associated data space.

The transport DMA controller 212 is a scatter-gather DMA engine controlled by memory-resident data structures which establish a control program. This single DMA, together with the memory controller queue manager, provides a mechanism for memory-to-memory or I/O transfers while achieving effective rate buffering and performing associated functions for the transport stream. The transport DMA controller 212 works in conjunction with the de-scrambler 214 to decrypt the data during these memory or I/O transfers.

The processor 216 is the host processor for the MPEG-2 transport demultiplexor 200. In one embodiment of the invention, the processor 216 is an ARM having on-chip caching functionality to reduce the bandwidth requirements of the on-board memory.

The peripheral bus bridge 218 interfaces the system bus 202 to the peripheral I/O devices 220, the central services module 222, and other data registers. This bus provides connectivity to slave devices. A representative sample of many of the peripheral devices supported by the MPEG-2 transport demultiplexor 200, which includes serial I/O 224, smart card interfaces 226, I²C interfaces 228, IEEE-1284 and IEEE-1394 interfaces 230, 232, codec interfaces 234 for modems, and infrared interfaces 236.

The central services module 222 provides the maintenance functions for the system. The functions handled by the central services unit include reset and power-up control, interrupt control, timer counters, bus arbitration, watch dog timers, bus timeout functions, and Joint Test Action Group (JTAG) capabilities for ARM emulation and test finctionality.

The external bus bridge interfaces the system bus 202 to the external bus interface 240, and provides connectivity for external ROM, RAM, and external MPEG decoders. The external bus interface supports master and slave interfaces. The ARM 216 is the master on the external bus interface 240. The external master device can then access all of the on-chip resources of the MPEG-2 transport demultiplexor 200.

Figures 2, 3:
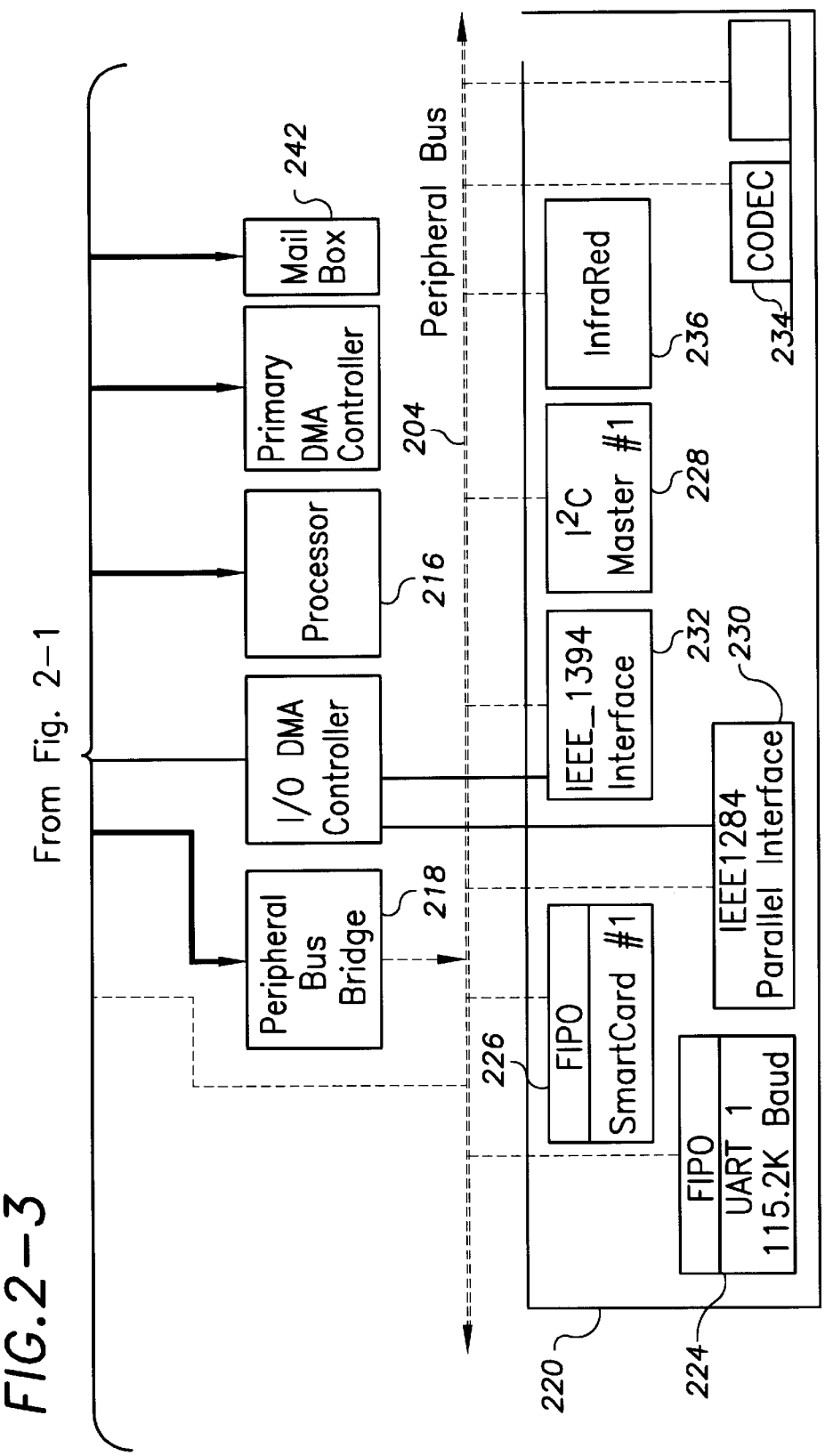
FIG. 3 is a block diagram of one embodiment of a transport packet management circuit in accordance with the present invention.
Figure 3:
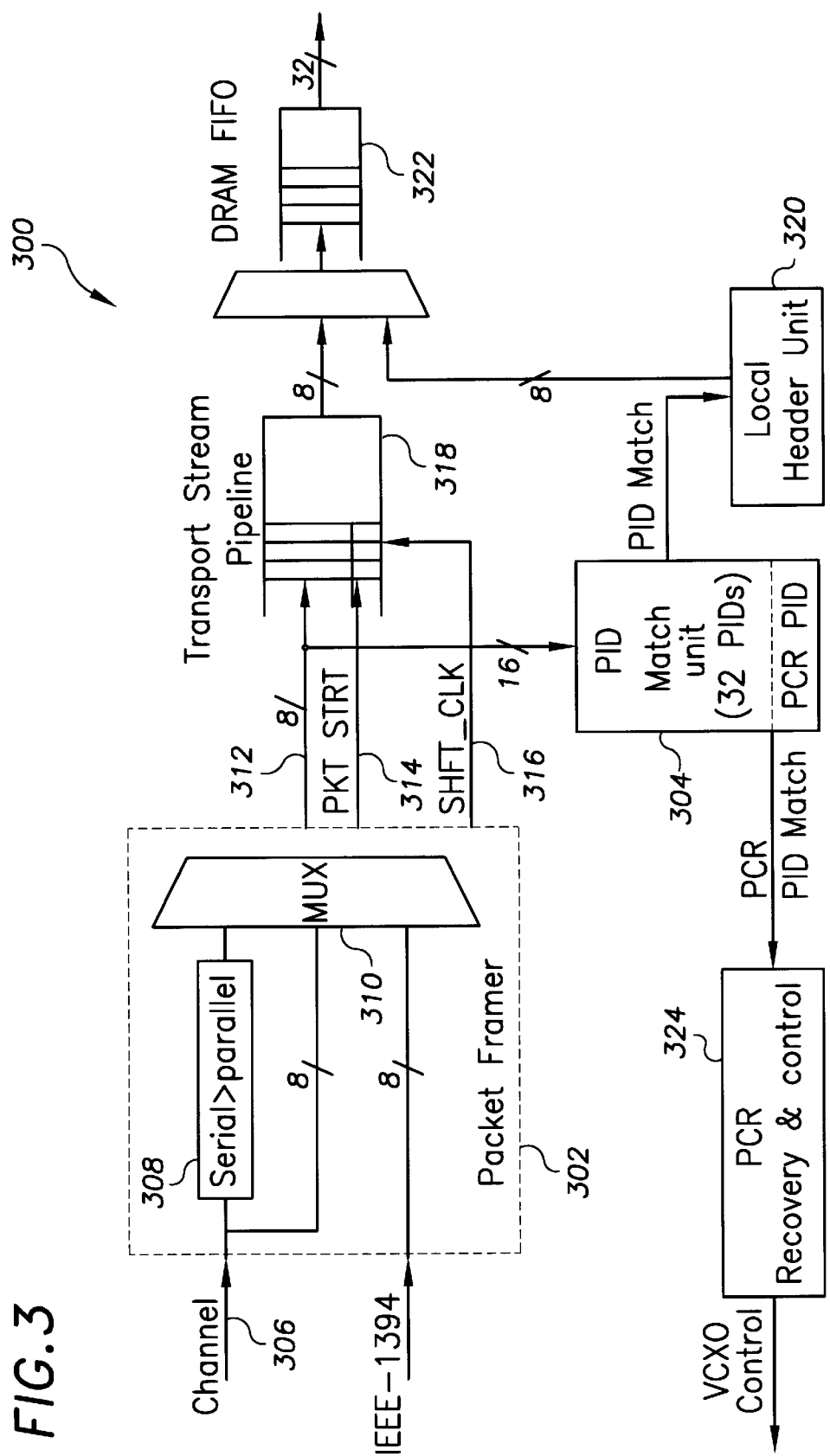

FIG. 3 is a block diagram of one embodiment of a transport packet management circuit 300 in accordance with the present invention. The packet management circuit 300 represents the transport front end, where transport packets are received at the MPEG-2 transport demultiplexor from an input channel or demodulator unit.

Generally, the packet framer 302 performs packet framing and byte alignment, as well as synchronization detection. The packet framer 302 continuously searches for the MPEG synchronization byte in the header of the incoming transport data stream. For MPEG-2 applications, the synchronization byte is used to locate the start of a transport packet, and has a hexadecimal value of 0x47. The packet framer 302 locates the synchronization byte among the rest of the transport data byte stream by tracking the arrival of synchronization bytes every transport packet interval. This is controlled by registers which establish the conditions under which the framer enters and exits a synchronization lock condition. The framer 302 forwards the data to the PID match unit 304 when an entire transport packet has been delineated from the transport data stream. For example, in a digital video broadcasting (DVB) application, the DVB transport stream is a 188-byte stream having a byte value x47 in the first byte of the transport header. When this value is detected a SYNC__LOCK signal is asserted, and the packet framer 302 outputs the transport packet to the PID match unit 304.

The packet framer 302 can receive inputs of various types, including serial and parallel input, as seen on channel input line 306. Where serial input is received, the serial-to-parallel converter 308 converts the input to a parallel 8-bit input to the multiplexor 310. Other interfaces, such as the IEEE-1394 standard, may also serve as inputs to the packet framer 302. A control signal coupled to the multiplexor 310 selects which input to accept to provide the transport stream at the output of the packet framer 302, which in one embodiment is provided in 8-bit bytes as shown on output bus 312. A PACKET_START signal shown on line 314 is asserted coincident with recognition of the synchronization byte to indicate the first byte of a transport packet. The PACKET__START signal triggers processing of the transport packet header information. The transport stream output on bus 312, the PACKET_START signal on line 314, and a SHIFT__CLOCK signal on line 316 are provided by the packet framer 302 to the transport stream pipeline 318, which is described more fully in connection with FIG. 5.

A transport packet is generally a fixed-length packet having a transport packet header and a packet payload that includes the PES packets. MPEG-2 transport packets include a transport packet header, an adaptation field, and a payload field containing the PES packets. Within the transport packet header is a packet identifier (PID), which is a 13-bit field used to identify transport packets which carry PES data from the same elementary stream, and to define the type of payload in the transport packet payload.

MPEG-2 allows for multiple audio/video programs to be provided per carrier, resulting in a multi-program transport stream (MPTS) which is a multiplex of a number of single program transport streams (SPTS). Each SPTS may contain different PES streams, each of which carries different video, audio and possibly data information all corresponding to a common program. Time division multiplexing (TDM) is used to concurrently transmit the multiple programs in an MPIS. Because the MPEG-2 transport stream can include a multiplex of audio/video programs, the MPEG transport demultiplexor 200 must determine which transport packets are part of the desired program in order to pass them on to the external MPEG decoders for further processing. The transport packets that are not part of the desired program can be discarded. The PID match unit 304 makes the determination of which PIDs are part of the desired program.

The PID match unit 304 plays an important role in multi-program transport stream management. The PID match unit 304 locates transport packets with matching PIDs, and forwards them to the local header unit 320. One aspect of the present invention is the generation of a local header by the local header unit 320. The local header is concatenated with the transport stream at the output of the transport stream pipeline 318 shown on output bus 318, and is used to distribute information throughout the transport demultiplexer. The transport packets, along with the associated local header, are forwarded to a FIFO 322 to eventually be stored to memory, which in one embodiment of the invention is a DRAM. The PID match unit 304 also includes program clock reference (PCR) PID matching, and corresponding PCR recovery circuitry 324.

In one embodiment of the invention, the PID match unit 304 includes a PID table of 32 PID entries. This table is organized as a 32-bit wide RAM with 16 locations (each location provides 2 PID entries). The table is updated by the host processor, such as processor 216 of FIG. 2. The PID table is updated when the system is first powered up and when the view changes the channel being viewed. Upon every power up sequence, the PID table is expressly updated by the host. Similarly, the host updates the PID table when a viewer performs a change channel operation. Both of these updates to the PID table are performed by the host using an alternate path to the PID match table address. A hardware mechanism interlock within the PID match unit forces the host to wait if updates are made when the PID match logic is active.

Figure 4:
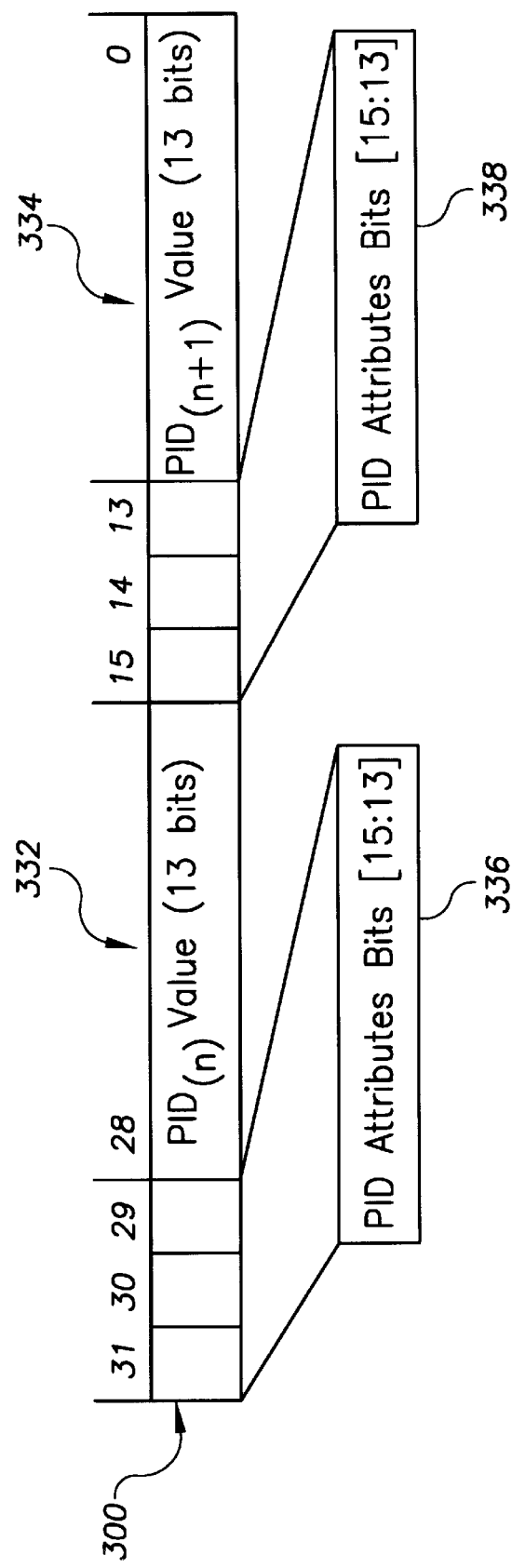
FIG. 4 illustrates the format in which predetermined PID values are stored in the PID match table.

FIG. 4 illustrates the format in which the PID values are stored in the PID match table. Table location 330 includes two PID values, shown as 13-bit $PID_{(n)}$ 332 and 13-bit $PID_{(n+1)}$ 334. Associated with each PID value is one or more attribute bits, which in one embodiment includes three attribute bits. $PID_{(n)}$ 332 is associated with attribute bits 29, 30 and 31, represented by attribute block 336. $PID_{(n+1)}$ 334 is associated with attribute bits 13, 14 and 15, represented by attribute block 338. The PID attribute details are described in Table 1 below.

TABLE 1

PID Attributes

| Bits [15:13];[31:29] | | Description |
|---|---|---|
| 0 | X | X | Invalid PID |
| 1 | 0 | 0 | Valid PID - Transport Stream |
| 1 | 0 | 1 | Valid PID - Transport Stream (1394 Enable) |

Each of the bit patterns of the attribute block can be used to represent a particular characteristic of the PID that was received. For example, where bit 15 is binary 0, it indicates an invalid PID whether it is a PCR packet or not. Where bits 15, 14 and 13 are binary 100, it indicates a valid transport stream PID.

Figures 1, 5:
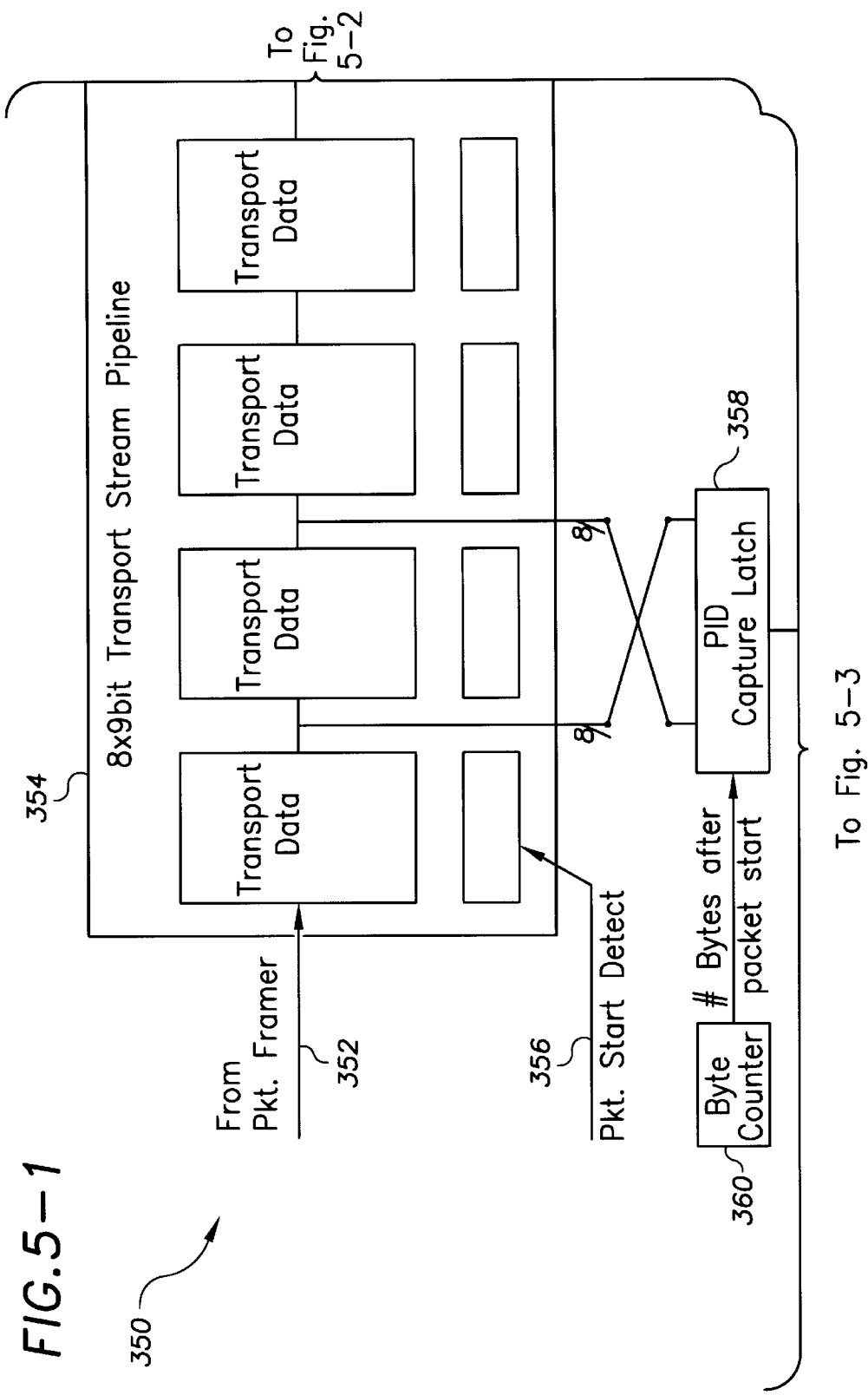
FIG. 5 is a block diagram of one embodiment of a PID match unit.

FIG. 5 is a block diagram of one embodiment of a PID match unit 350. The objective of the PID match unit 350 is to extract the PID information from the transport packets of the transport stream, for comparison with known PID table entries. The packet framer provides the transport packets to the PID match unit 350 via path 352 upon the occurrence of the SYNC_LOCK signal. The data is shifted into the transport stream pipeline 354 upon each occurrence of a shift clock after the PACKET_START signal has been detected as illustrated on line 356. The PACKET_START signal is propagated through the transport stream pipeline 354 as the transport packet propagates through the pipeline to signify the start of the transport packet. The transport stream pipeline allows the transport packets to be passed to the local header unit at the proper time. This time delay allows various functions to be performed, including locating a PID match in the PID match table, and computing the local header. For example, at a channel rate of 7.5 MB/sec (megabytes per second) and a system clock rate of 54 Mhz, it can be estimated that the PID capture time is 2 channel clock cycles for DSS and 3 channel clock cycles for DVB, which requires 3 stages of the pipeline. The PID compare time under this system clock frequency would be approximately 16 clock cycles (2 PIDs per clock cycle and 32 PIDs total), synchronization and pipeline delays of approximately 4 clock cycles, control state machine delays of approximately 4 clock cycles, and a local header computation of 4 clock cycles for a total of approximately 28 clock cycles or another 4 pipeline stages. This results in at least 7 pipeline stages, and therefore in one embodiment of the invention as shown in FIG. 5 an 8-stage transport stream pipeline provides timing assurance.

The PID capture latch 358 captures the PID information after a predetermined number of bytes past the PACKET_START signal as determined by the byte counter 360. This 16-bit value is masked using the PID mask register 362 and the AND block 364, where the result compared to the data from the PID table 366 two PIDs at a time. This masking operation is needed to obtain only the relevant bits for the comparison. The header constitutes 4 bytes of the 188 byte MPEG packet, where 2 bytes of the 130 bytes in the DSS are called pre-fix. The PID is contained within the 13 bits of information that straddles bytes 2 and 3 of a standard MPEG packet; and in the DSS format, the PID consists of 12 bits of the 2 byte pre-fix data. The PID capture latch collects a total of 16 bits. During the comparison, the non-PID bits must be ignored where the upper 3 bits are masked within the DVB and the upper 4 bits are masked within the DSS.

The compare operation is accomplished by providing a counter 368 which counts through each of the 16 locations in the PID match table 366, which enables the two PIDs at the current PID match table location to enter the pipeline latch 370, and to enter the compare unit 372 after masking by the AND block 374. The compare unit 372 includes two comparators 376 and 378 to concurrently compare the current PID value in the PID capture latch 358 to each of the PID values from the PID match table 366 at the location designated by the counter 368. Upon recognition of a match, the match capture latch 380 is updated via its clock input by the match signal shown on line 382. The match capture latch 380 provides the current counter value on path 384, as well as the PID attribute bits on paths 386 that correspond to the matched PID. Multiplexing unit 388 selects the matching PID attributes according to the state of the match bit on line 390. The match logic operates as follows: line 390 indicates that the second entry is matched. If the match 382 is true and line 390 is true, the system recognizes that the second entry is matched. If the match 382 is true and line 390 is false, the system recognizes that the first entry is matched. The line 390 also is used to select which of the two entries are to be captured into the match capture latch 380.

The PID match unit 350 stalls on the detection of a match. The match detection time for a particular entry in the PID table is deterministic, which allows for precise loop timings for PCR recovery. As will be described in greater detail in the ensuing description, the counter value on path 384 represents an address index which can be used to address particular memory queues corresponding to information identified by its PID. The address index can be used by a processing unit to generate a physical memory address where the particular transport packet will ultimately be stored prior to transmission to decoding units. The use of the address index in the local header allows a destination location to be designated without the need to develop the complete physical address until it is necessary to actually write the transport packet to its corresponding memory queue.

Under a match condition, the match capture latch 380 stores the PID location address from the PID match table 366 (counter 368 value), the match information on line 390, and the PID attribute bits in the following format to be forwarded to the local header unit:

TABLE 2

PID Attribute Bits

| PID MATCH [8] | PID MATCH [7:5] | PID MATCH [4] | PID MATCH [3:0] |
|---|---|---|---|
| 1 = Match 0 = No Match | PID Attributes | 0 = PID_data [15:0] matched 1 = PID_data [31:16] matched | PID_data address of match |

The PID match bits [7:5] represent the PID attributes, bits [4:0] represent the address index that is formulated by the counter 368 of FIG. 5, bit [4] indicates the left or right bits that match and bit [8] indicates whether a match was detected during the compare process. This compare process terminates on detection of a match, or upon reaching the end of the PID match table 366 in a "No Match" condition. All processor PID update cycles are inhibited during this operation, and any access attempts during a PID compare cycle are postponed. Alternatively, the processor may terminate the PID compare process to update the PID table.

Figure 6:
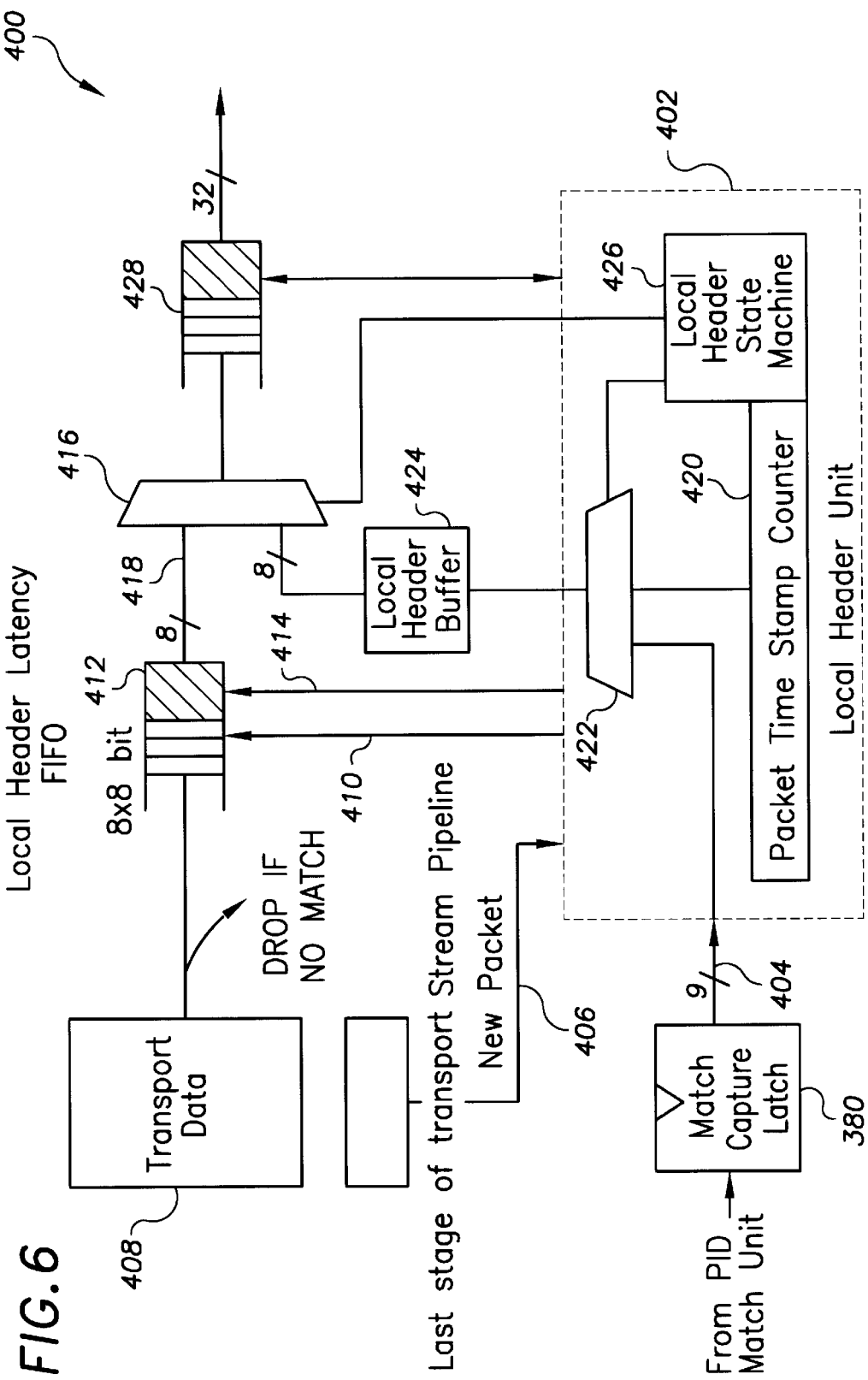
FIG. 6 is a block diagram generally illustrating the operation of the local header unit in the transport demultiplexing system.

FIG. 6 is a block diagram generally illustrating the operation of the local header unit 400 in the transport demultiplexing system. The PID match unit 350 of FIG. 5 is coupled to the local header unit 400 through the match capture latch 380, also shown in FIG. 5. The PID match output data, described in Table 2 above, is provided to the local header unit 402 via path 404. The PACKET_START signal that propagated through the transport stream pipeline 354 of FIG. 5 is also provided to the local header unit 402 via line 406 to indicate that a new transport packet has arrived. The local header unit 402 reads the match condition bit [8] from the PID match output data on path 404 to determine whether a PID match occurred. If not, the transport packet is discarded from the last stage 408 of the transport stream pipeline. If there is a match, the local header unit 402 reads the PID match attribute bits [7:5] to determine if it is a valid transport packet, and if so, provides an input enable signal on line 410 to allow the transport packet to enter the local header latency FIFO 412. The depth of the local header latency FIFO 412 is a function of both the content of the local header and the system frequency, and is designed to temporarily stage the transport packet until the local header has been generated. An output enable signal shown on line 414 enables the FIFO 412 to be read until the end of the transport packet is reached. The transport packet is provided in stages to the multiplexer 416 via path 418.

The local header unit 402 creates a unique "local" header to be inserted at the start of each transport packet. The local header unit 402 uses the PID match attributes [7:5] from path 404 to build the local header. The local header serves a variety of purposes, including generating IEEE-1394 enable information, generating time stamp information for IEEE-1394 support, providing matched PID location information, padding the packets to align bytes to the memory controller's natural boundary (burst transfer), and generating processor interrupts on arrival of particular packets (particularly PCR packets). The structure of the local header as created by the local header unit 402 is illustrated in Table 3 below.

TABLE 3

Local Header Data Structure

| Byte # | bit 7 | bit 6 | bit 5 | bit 4 | bit 3 | bit 2 | bit 1 | bit 0 |
|---|---|---|---|---|---|---|---|---|
| Byte 0 | Matched PID Location (address index) | | | | | | | |
| Byte 1 | (Reserved) | | | | 1394_En | ATTR | | ATTR |
| Byte 2 | Transport Sequence time stamp (0–255) | | | | | | | |
| Byte 3 | (Reserved) | | | | | | | |
| Byte 4–15 | (Reserved for DSS) | | | | | | | |

In one embodiment of the invention, the local header is created as depicted in Table 3, which includes between 4 to 12 bytes depending on the type of system stream provided. Where the transport packets comprise a Digital Video Broadcast (DVB) system stream, only four local header bytes are necessary. Where the transport packets comprise a Digital Satellite System (DSS) system stream, twelve local header bytes are used. The local header size is a function of the memory controller burst length and parsing information. Bytes 4–13 are reserved at this time for future use. At the present time, these bytes are marked 00. This data block is padding to fill the packets to ensure the packet length is a multiple of 16 bytes to optimize performance.

Byte 1 includes at least three fields. Bit 2 is an IEEE-1394 enable field, bits 0–1 store attribute bits. Byte 0 includes bits 4–0 are used to store the matched PID location which was determined by the PID match unit 350 of FIG. 5 and captured in the match capture latch 380. The IEEE-1394 bit in the 1394 field at bit location 2 controls the routing of the transport stream to a IEEE-1394 link controller. This bit corresponds to one of the PID attribute bits described in connection with FIG. 4 and Table 1. Particularly, this bit corresponds to the PID attribute bit at location [13] or [29] of the PID match table 366 of FIG. 5. Bits 1–0 correspond to the remaining two attribute bits associated with each PID in the PID match table. Byte 3 in this embodiment is reserved for future expansion. Byte 2 stores a counter value generated by the local header unit, and is an incremental counter value which increments or every transport packet received, regardless of whether a PID match occurred. This counter value serves as time stamp information to retain the real-time information of the transport stream, which can be used to maintain synchronization of an IEEE-1394 interface. This 8-bit value allows for 256 time stamp values. Bytes 4–13 are not used for DVB system streams, but are used to ensure the packet lengths are multiples of 16 in DSS system streams.

Returning to FIG. 6, it can be seen that the PID attributes (including the IEEE-1394 enable attribute bit) received from path 404 are entered into bits 2–0 of byte 1 of the local header. Similarly, the matched PID location received from path 404 are entered into bits 4–0 of byte 0 of the local header. The packet time stamp counter 420 generates the incremental counter value that is stored in byte 2 of the local header. The counter value, along with DSS bytes where appropriate, are multiplexed using multiplexing unit 422 and stored in the local header buffer 424 in 8-bit segments. The local header state machine 426 controls the multiplexing unit 422 to generate the local header by outputting the information in the proper order. The local header buffer 424 buffers the local header bytes as they are provided to the multiplexing unit 416, which is also controlled by the local header state machine 426. Therefore, the local header state machine 426 controls the output of the local header unit 402 such that the local header is arranged properly, and further ensures that the local header is transmitted immediately prior to its corresponding transport packet from path 418. The local header state machine works with the following pseudo-code: Wait for packet start signal 406 if local header latency FIFO 412 is empty: a) shift the mux 416 to local header; b) push all local header bytes; c) when local header is done restore mux 416 to channel go back to waiting for next packet start signal 406.

The resulting transport packet, including its leading local header, is provided to the memory FIFO 428 for organized entry to the memory controller. In one embodiment of the invention the memory FIFO 428 and the storage memory are SRAMs, however DRAMs or other memories can be used.

Figure 7A:
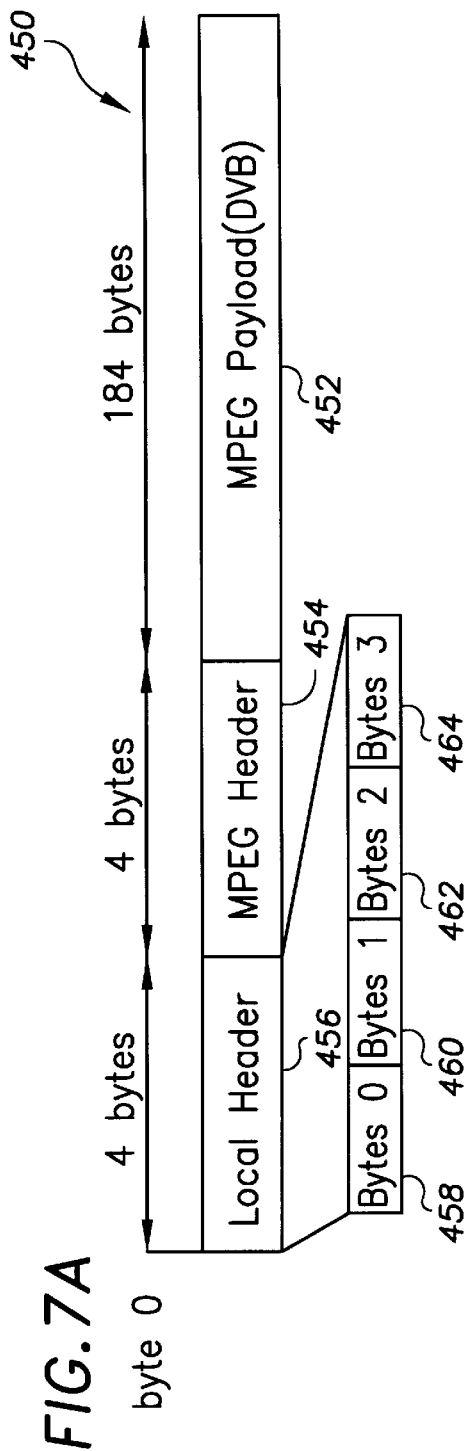
FIGS. 7A and 7B illustrate a modified transport packet, including the transport packet and its associated local header, for DVB and DSS system streams respectively.
Figure 7B:
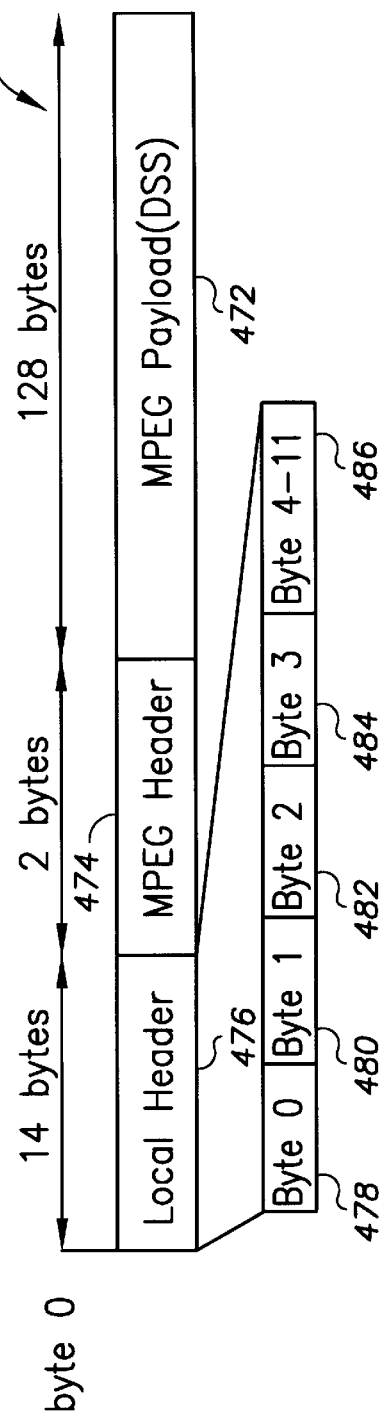

FIGS. 7A and 7B illustrate the resulting transport packet, including the transport packet and its associated local header, that is output from the multiplexing unit 416. While FIGS. 7A and 7B are described in terms of an MPEG system for DVB and DSS system streams respectively, it will be readily apparent to those skilled in the art from the description herein that other arrangements are possible.

In an embodiment in which an IEEE-1394 standard interface is initialized, a transport sequence time stamp (TSP) is contained within the local header, see byte 2 of Table 3. The IEEE-1394 interface uses this figure stamp data to keep the data output synchronized.

An IEEE-1394 interface is an isochronous interface in which packets arrive at a fixed rate. Time slots exist when packets can appear at the fixed rate; however the system needs to address the synchronization of data because packets may or may not be available for output during each time slot. The system keeps track of the number of time slots which pass between the arrival of a packet and places the number of time slots counted into the TST field. Thus, the 1394 interface can insert the correct number of time slots into the 1394 data stream where transmitting the packet. As such, the 1394 data stream will possess the same timing as the packet arrival into the system.

FIG. 7A illustrates a modified DVB MPEG transport packet 450 that has been modified by the inclusion of a local header. The DVB MPEG payload 452 includes 184 bytes of payload information, which in turn includes PES headers and payload from its corresponding elementary stream. The MPEG header 454 consists of 4 bytes, and the leading local header 456 includes 4 bytes shown as byte-0 458, byte-1 460, byte-2 462, and byte-3 464, resulting in a 192-byte "local" packet. Similarly, as shown in FIG. 7B, the modified DSS MPEG transport packet 470 includes a 128-byte DSS MPEG payload 472, and a 2-byte MPEG header 474. The local header 476 includes 12 bytes, including byte-0 478, byte-1 480, byte-2 482, byte-3 484, and byte-4 through byte 11 represented by block 486, resulting in a 144-byte "local" packet.

Figure 8:
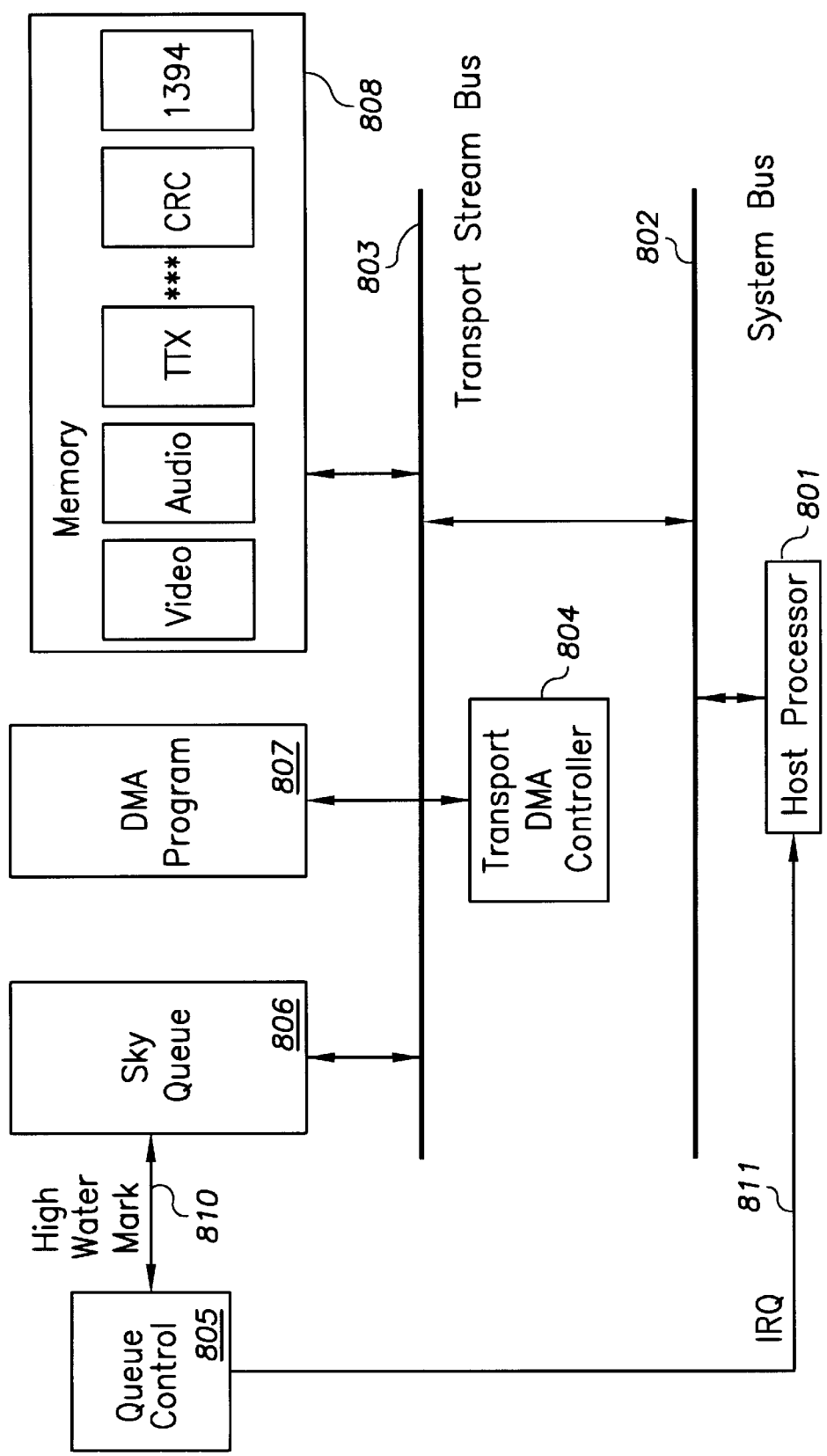
FIG. 8 is a logic block diagram illustrating a transport stream data transfer system utilizing a Direct Memory Access Controller according to one example embodiment of the present invention.

FIG. 8 is a logic block diagram illustrating a transport stream data transfer system utilizing a Direct Memory Access Controller 804. When operating, data packets are received and stored within the Sky Queue 806. Once stored within this queue, the data packets are analyzed and transferred to various separate queues in memory 808. Examples of the various queues include a video queue, an audio queue, a TTX queue, a CRC queue, and a 1394 interface queue.

The data packets are transferred from the Sky Queue to the appropriate queue by the Transport DMA controller 804 based upon a set of instructions created by the host processor 801 which have been stored in memory 807 as a set of DMA instructions. The host processor 801 creates these DMA instructions based upon the information found within the local header of each data packet. This information includes the Destination Queue Identifier which consists of the matched PID number.

The DMA transfer process begins when the Sky Queue 806 becomes one-half full. At this time, the High Water Mark 810 is asserted and Queue control logic 805 generates an interrupt service request 811 to the host processor 801. The host processor 801 reads the local headers of the data packets found within the Sky Queue 805. The host processor uses the information from the local header, along with information from the MPEG headers to create instructions for the DMA controller 804. These DMA instructions are written into memory 807 for execution by the controller 804. The DMA controller will execute these instructions to cause one of the following to occur:

The data packet is transferred without descrambling to the memory location specified by the destination physical address field of the DMA instruction;

The data packet is transferred with descrambling to the memory location specified by the write queue pointer, as specified by the destination address field;

The data packet is transferred without descrambling to the memory location specified by the destination address field of the DMA instruction;

The data packet is transferred with descrambling to the memory location specified by the write queue pointer, as specified by the destination address field;

The data packet is simultaneously transferred with descrambling to the memory location specified by the write queue pointer, as specified by the destination address field #2.

Figures 3, 9:
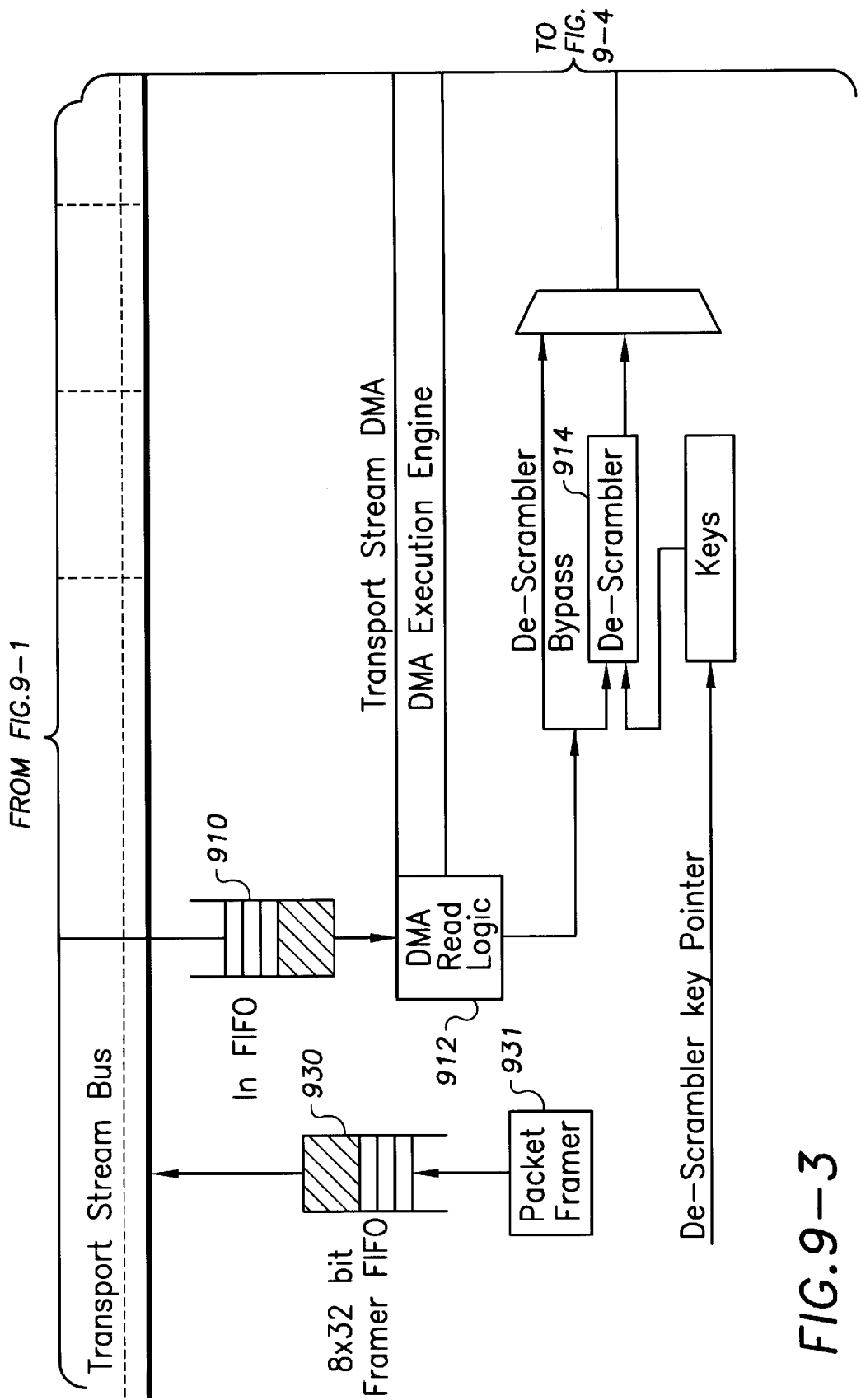
FIG. 9 is a logic block diagram illustrating an embodiment of a transport data function showing the transport data transfer logic in more detail according to one example embodiment of the present invention.
Figure 10:
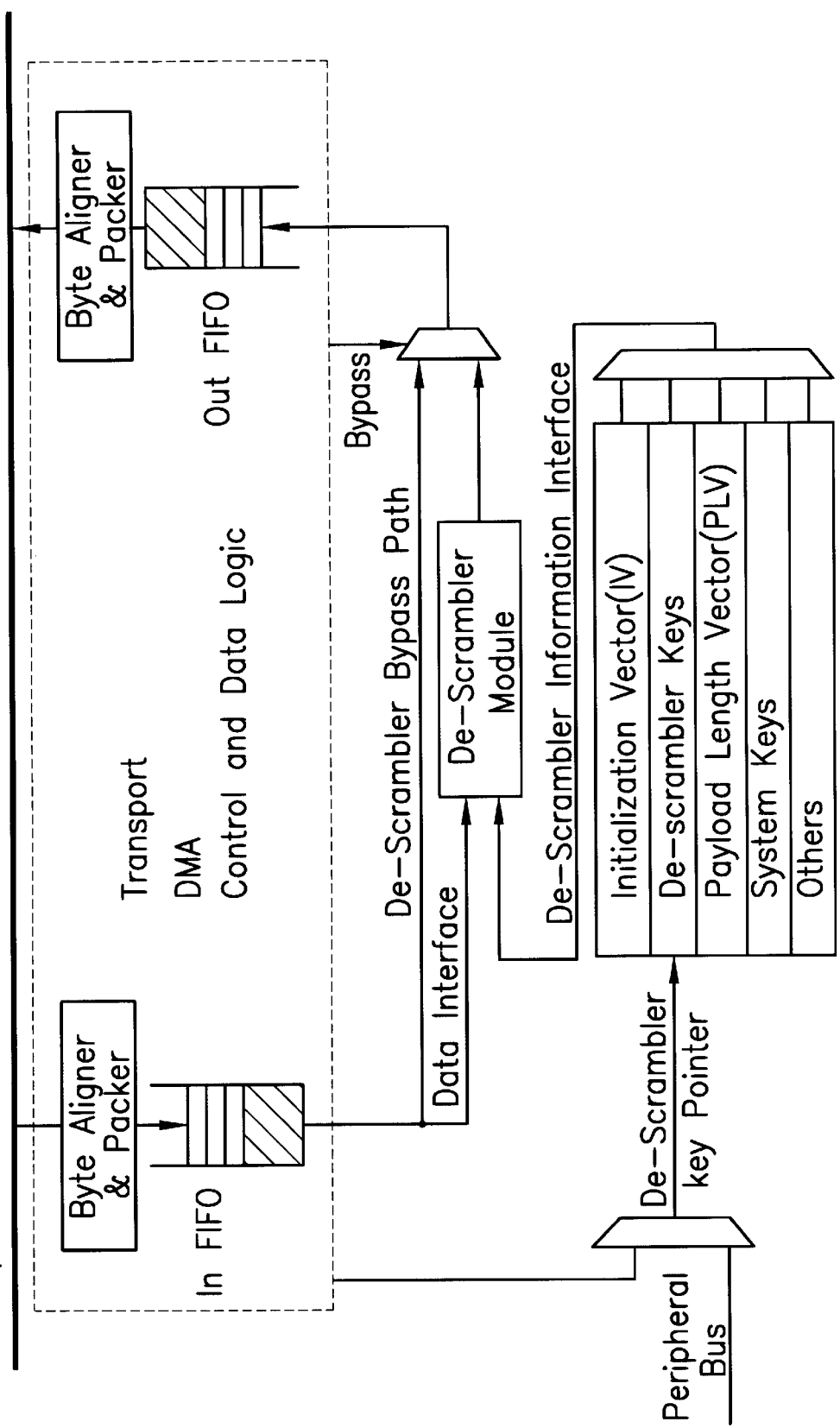
FIG. 10 is a logic block diagram illustrating the de-scrambler data functional organization according to another example embodiment of the present invention.

FIG. 9 is a logic block diagram illustrating an embodiment of a transport data function showing the transport data transfer logic in more detail. As described above, the data packets are received from the Packet Framer 931 into a FIFO 930 before being transferred to the Sky Queue 901. The DMA controller comprises an input FIFO 910, an output FIFO 911, DMA read logic 912, DMA write logic 913, and the de-scrambler 914. The data packets pass between the DMA read logic 912 and the DMA write logic 914 when being transferred. The data may either pass through the de-scrambler 914 or bypass it as necessary.

The host processor uses a set of pointers into the Sky Queue 901 to perform the data transfer operation. Table 4 below illustrates the various Sky Queue 901 pointers which are used. Table 4 also illustrates the producer, the writer of the pointer, and the consumer, reader of the pointer, for each of the Sky Queue Pointers.

TABLE 4

Sky and IEEE-1394 Queue Pointer Management

| FIFO Pointer | Producer/Consumer | Conditions | Comments |
|---|---|---|---|
| Sky Write Pounter | Packet Framer | Normal Operation | Stores all packets forwarded from the Packet Framer |
| Sky Read Pointer | Transport DMA | Normal Operation | All Packets are moved and optionally descrambled by the Transport DMA Controller |
| 1394 Write Pointer | Packet Framer | IEEE-1394 recording Scrambled or unscrambled transport stream (un-modified) | 1394 write pointer is the alias (shadow) of the Sky Queue Write Pointer |
| | Transport DMA | IEEE-1394 Recording descrambler Transport data | Transport DMA writes back descrambled data into the Sky Queue |
| 1394 Read Pointer | IEEE-1394 Interface | IEEE-1394 Recording Transport Data | |

The host processor 801 creates DMA instructions comprise 16 byte data structures illustrated below in Table 5.

TABLE 5

DMA Instruction Format

| Bits 31–34 | Bits 23–16 | Bits 15–8 | Bits 7–0 |
|---|---|---|---|
| DMA CMD | I DSC_KEY_PTR | BYTE_COUNT | |
| Q | SRC_ADDR | | |
| Q | DST_ADDR | | |
| Q | DST_ADDR2 | | |

The DMA command field "DMA CMD" determines the type of transfer performed by the DMA controller 804. One embodiment of the encoding for the DMACMD field is shown below in Table 6.

TABLE 6

DMA Program - DMA Command Field

| DMACMD | Command | Description |
|---|---|---|
| 4'b0001 | MOVE | Execute Memory-to-Memory Transaction |
| 4'b0011 | MOVE_DSC | Memory-to-Memory Transaction with De-scrambling |
| 4'b0111 | MOVE_DSC_WR | Read and Write Back to Sky Queue with De-scrambling |
| 4'b1000 | NOP | No Operation |

TABLE 6-continued

DMA Program - DMA Command Field

| DMACMD | Command | Description |
|---|---|---|
| 4'b1001 | JUMP | JUMP command |
| 4'b1110 | STOP | Stop DMA Operation |

A MOVE command executes a memory-to memory move command. The memory addresses for both the source and destination pointers may be either a queue pointer or an absolute memory address. Both the source and destination pointers may reference a byte address.

A MOVE_DSC command executes a memory-to-memory data transfer using the de-scramber 914. The DSC_KRY_PTR provides the memory location for the key used in the de-scrambling operation.

A MOVE_DSC_WR commands executes a double write into memory using the de-scrambler. Both destination pointers, DST_ADDR and DST_ADDR2, are used to write data to memory at different locations.

A NOP command involves no data transfer. The DMA controller 804 steps to the next DMA instruction.

A JUMP command allows the DMA controller to jump to the next DMA instruction specified by a destination address. The command allows the DMA controller to execute complex command sequences. The Q bits should not be set with the JUMP command.

A STOP command causes the DMA controller 804 to stop executing DMA commands.

The de-scrambler key pointer, DSC_KEY_PTR, field provides the location for the key to be used in the de-scrambling operation. The DMA controller addresses this location in the Key Table to extract the particular key to be used in de-scrambling a data packet. This key table is initialized by host processor 801 prior to the execution of the DMA instructions by the DMA controller 804.

The byte count, BYTE_COUNT, field indicates the number of bytes the particular DMA command is to transfer.

The Queue control bit field, Q, controls the decoding of the contents of the source address, SRC_ADDR, and the destination address, DST_ADDR, and destination 2, DST_ADDR2, fields. The values within the SRC_ADDR and DST_ADDR fields are decoded as physical addresses when the MSB (bit 31) is cleared. The values within the SRC_ADDR[23:16] and DST_ADDR[23:16] fields are decoded as queue numbers if the MSB (bit 31) is set. The queue manager in the memory system will decode these bits as queue numbers and use the appropriate queue pointers to generate the memory addresses used for the data transfers. The values within the SRC_ADDR[15:0], DST_ADDR [15:0], and DST_ADDR2 [15:0] fields are decoded as skip addresses if Q=2'b11. The queue manager adds the value in bits [15:0] to the respective queue pointer to generate the memory addresses used in the data transfer. Table 7 shown below illustrates the decoding performed on the DMA Q Control Field.

TABLE 7

DMA Program - DMA Q Control Field

| Q Control [31:30] | Field | Description |
|---|---|---|
| 2'b0x | Queue Disable | Source/Destination Address = SCR/DST_ADDR[23:0] |
| 2'b10 | Queue Enable | Source/Destination Address = Queue Number in SCR/DST_ADDR[23:16] |
| 2'b11 | Queue Enable with Skip Enable | Queue Number - SCR/DST[23:16] + Skip No. of bytes in SCR/DST/[15:0] |

The source and destination pointers provide the DMA controller with the locations of the source data and the destination data for a DMA instruction. As described above, these fields may reference queue numbers to be used in the data transfer or may reference an absolute memory address.

Table 8, shown below, illustrates the decoding of the interrupt, I field, contained within the DMA instructions.

TABLE 8

I Field Description

| I | Field | Description |
|---|---|---|
| 1'b0 | NO_INTR | No Interrupt |
| 1'b1 | INTR | Interrupt at end of command |

Transport DMA controller 804 may be instructed to generate an interrupt service request to the host processor upon the completion of a DMA instruction. This operation allows the host processing software to track the completion of the DMA operations. The DMA controller is configured to halt its operation and generate an interrupt service request upon detection of an illegal instruction. During the execution of all illegal instructions, the DMA controller will advance to the next DMA instruction, set all necessary flags, and halt operation.

The format of the various DMA instruction formats are shown below in Tables 9–12.

TABLE 9

DMA Program with Physical Addresses

| Bits 31–24 | Bits 23–16 | Bits 15–8 | Bits 7–0 |
|---|---|---|---|
| DMA CMD  I | DSC_KEY_PTR | BYTE_COUNT | |
| 'b0x | SRC_ADDR | | |
| 'b0x | DST_ADDR | | |

TABLE 10

DMA Program with Queue Pointers and Skip Counts

| Bits 31–24 | Bits 23–16 | Bits 15–8 | Bits 7–0 |
|---|---|---|---|
| DMA CMD  I | DSC_KEY_PTR | BYTE_COUNT | |
| 'b11 | Source Q Pointer | Skip Count | |
| 'b11 | Destination Q Pointer | Skip Count | |

TABLE 11

DMA Program for NOP and STOP Commands

| Bits 31–24 | Bits 23–16 | Bits 15–8 | Bits 7–0 |
|---|---|---|---|
| DMA CMD | I | | |
| | | | |
| | | | |

TABLE 12

DMA Program for JUMP Command

| Bits 31–24 | Bits 23–16 | Bits 15–8 | Bits 7–0 |
|---|---|---|---|
| DMA CMD | I | | |
| | | | |
| 0x | Jump Address | | |
| | | | |

The transport DMA controller 804 powers up in an idle state. The host processor 801 writes the DMA program comprising one or more DMA instructions into the main memory 807. The host processor 801 starts the DMA controller 804 by writing the initial location of the DMA program into an address register, DMA Command Address pointer, of the DMA controller 804. The DMA controller 804 wakes up and begins executing the DMA commands in the DMA program starting at the address contained within the DMA Command Address pointer. The DMA controller continues to execute commands until either a STOP command or an illegal command is decoded.

The transport DMA controller 804 optimizes read and write operations by varying the alignment and size of a transfer. The natural burst boundary of 16 bytes is achieved by the transfer operation and the DMA controller executes burst transfers for the remaining data. In normal operation, this burst transfer operation is utilized at the beginning and the end of a transfer.

Figures 1, 11:
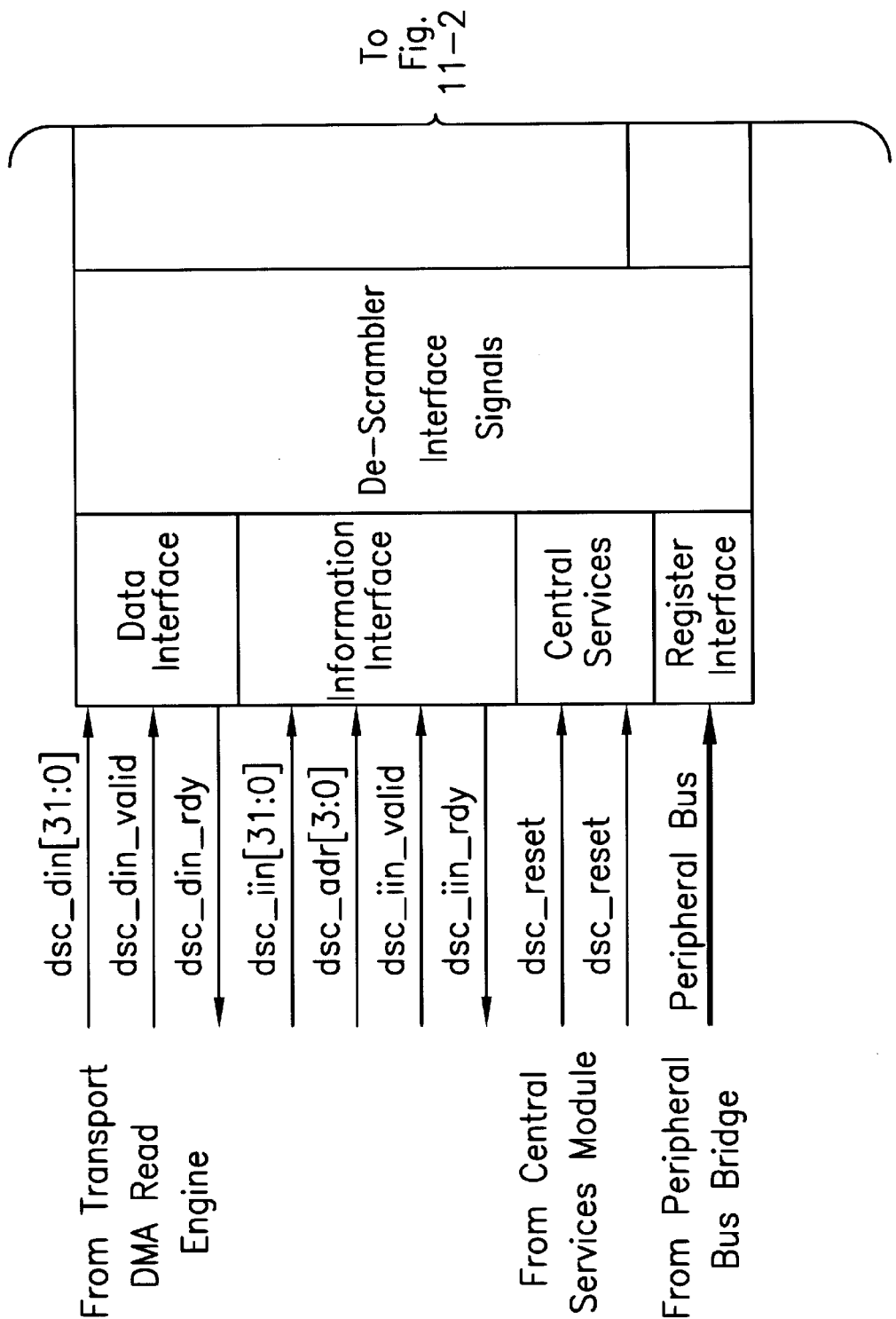
FIG. 11 is a logic block diagram illustrating the de-scrambler interfaces according to another example embodiment of the present invention.
Figures 2, 11:
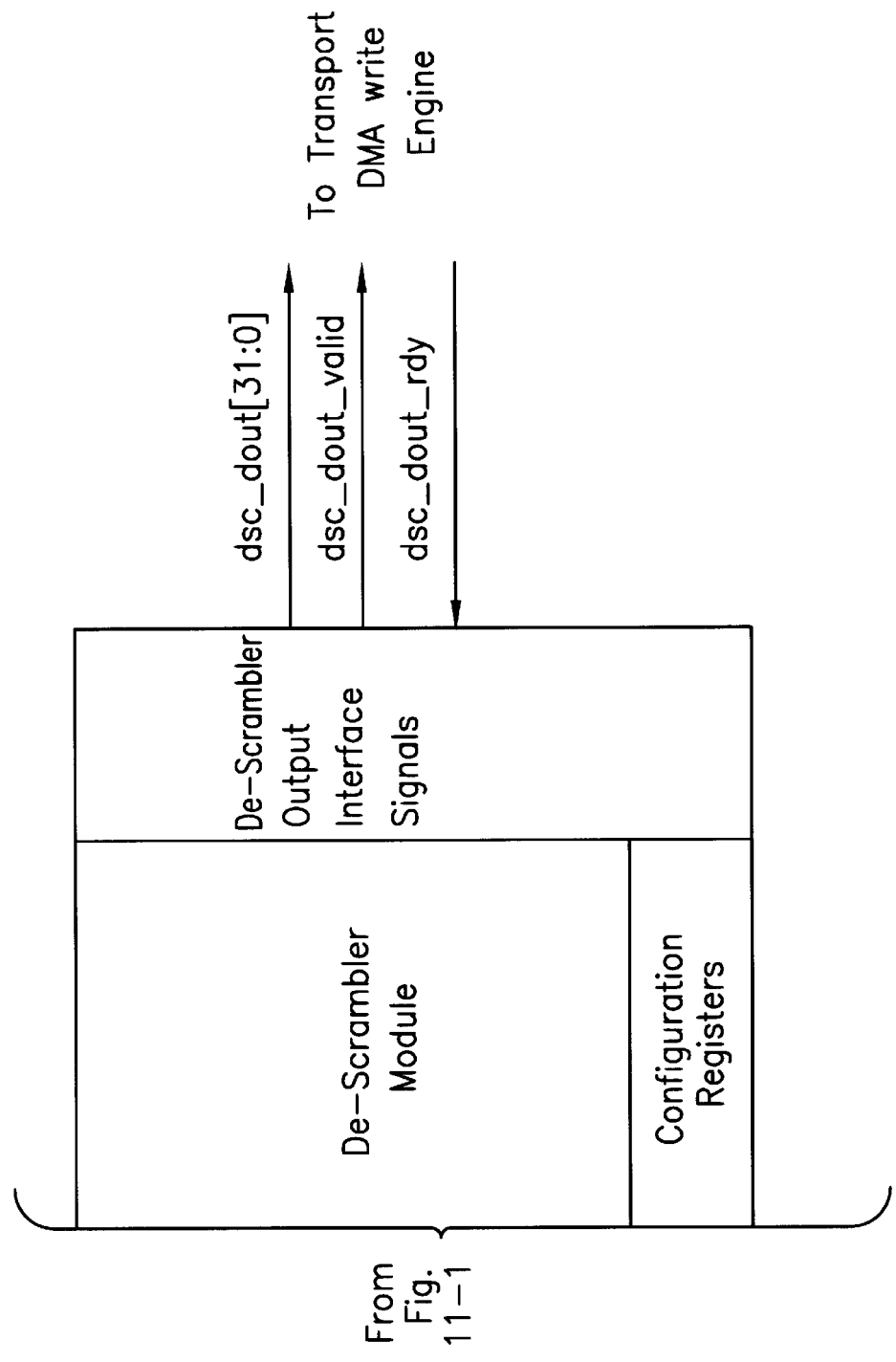
Figure 13:
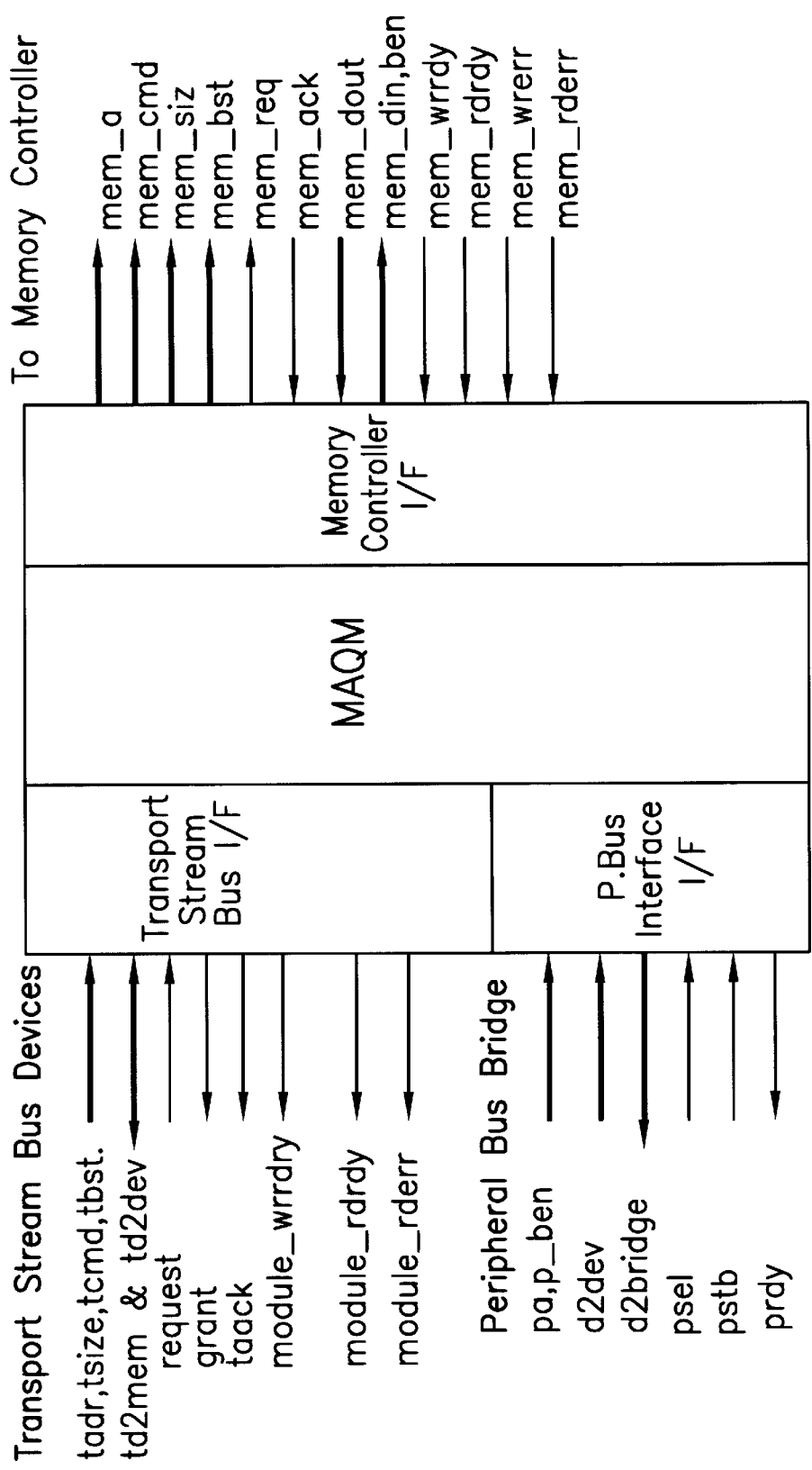
FIG. 13 is a logic block diagram illustrating a MAQM module according to another example embodiment of the present invention.

FIG. 11 illustrates an example embodiment of a functional implementation of the Transport DMA and De-scrambler. The Transport DMA provides a data path to the de-scrambler for both scrambled data as well as de-scrambled data. A bypass path is provided for the de-scrambler to allow transport DMA engine to move un-scrambled data without intervention of the de-scrambler. Table 13, below, defines the signal descriptions for the de-scrambler and its interface. FIG. 12 illustrates an example embodiment of the de-scrambler interface and its interface signals.

The Transport DMA engine uses the data interface shown in FIG. 11 to load and unload scrambled and de-scrambled data from the de-scrambler. The information interface is used to load the control data into the de-scrambler as keys, initialization vectors, and other control information. The interface is optimized to allow independent operation of the de-scrambler once initialized. The logical sequence of data/information transfer to the de-scrambler is established by the Transport DMA.

TABLE 13

De-scrambler Interface

| Signal Name | Active | I/O | State Meaning | Timing Comments |
|---|---|---|---|---|
| Data Interface Group | | | | |
| dsc_din[31:0] Data Bus | High | Transport DMA → De-scrambler | Content: represents the state of the data during a read transaction. All bytes of the quadlet may or may not be valid. | Assertion/Negation: A data transfer occurs on the cycle where dsc_din_valid and dsc_din_rdy are asserted. Both Transport DAM and the de-scrambler may advance the data tenure on a multi-beat data transfer. |
| dsc_din_rdy De-Scrambler ready | High | De-scrambler → Transport DMA | Asserted: Indicates that the de-scrambler is ready to accept data. Transport DMA and De-scrambler must assume a transfer of data on clock cycles where dsc_din_rdy and dsc_din_valid are asserted. Negated: Transport DMA or De-scrambler must wait for the transaction to complete | Assertion: May occur during any cycle of the data transaction. May be held active to transfer multiple data beats. Negation: Must occur the cycle of the last data beat |
| dsc_din_valid De-Scrambler data is valid | High | Transport DMA → De-scrambler | Asserted: Indicates that the Transport DMA has provided data to the De-scrambler. Negated: Indicates data transfers may not continue on the bus. Any dsc_din_rdy detected by Transport DMA is ignored and the De-scrambler may not advance to the next state. | Assertion: May occur during any cycle of the data transaction. May be held active to transfer multiple data beats. Negation: May occur during any cycle |
| dsc_dout[31:0] Data Bus | High | De-scrambler → Transport DMA | Content: represents the state of the data during a read transaction. All bytes of the quadlet may or may not be valid. | Assertion/Negation: A data transfer occurs on the cycle where dsc_din_rdy and dsc_din_valid are asserted. Both Transport DMA and the De-Scrambler may advance the data tenure on a multi-beat data transfer |
| dsc_dout_valid De- | High | De-scrambler | Asserted: Indicates that | Assertion: May occur during any |

TABLE 13-continued

De-scrambler Interface

| Signal Name | Active | I/O | State Meaning | Timing Comments |
|---|---|---|---|---|
| Scrambler data is valid | | → Transport DMA | the De-scrambler has provided data to the DMA Transport. Negated: Indicates data transfers may not continue on the bus. Any dsc_dout_rdy detected by De-scrambler is ignored and the Transport DMA may not advance to the next state. | cycle of the data transaction. May be held active to transfer multiple data beats. Negation: May occur during any cycle |
| dsc_dout_rdy De-scrambler ready | High | De-scrambler → Transport DMA | Asserted: Indicates that the Transport DMA has accepted data from the De-scrambler. If a multi-beat transfer, De-scrambler may advance to the next data transaction. Transport DMA and De-scrambler must assume a transfer of data on clock cycles where dsc_dout_rdy and dsc_dout_valid are asserted. Negated: Transport DMA or De-scrambler must wait for the transaction to complete | Assertion: May occur during any cycle of the data transaction. May be held active to transfer multiple data beats. Negation: Must occur the cycle of the last data beat |

Information Interface Group

| Signal Name | Active | I/O | State Meaning | Timing Comments |
|---|---|---|---|---|
| dsc_iin [31:0] Data bus | High | Transport DMA → De-scrambler | Content: represents the state of control information. dsc_adr defines the data type as Key, IV, etc. All bytes of the quadlet may or may not be valid | Assertion/ Negation: a data transfer occurs on the cycle where dsc_iin_valid and dsc_iin_rdy are asserted |
| dsc_adr[3:0] Data Transaction Address (type) | High | Transport DMA → De-scrambler | Content: Specifies type of control information. Encoding varies with the De-scrambler | Assertion/ Negation: Same timing as dsc_iin [31:0] |
| dsc_iin_rdy De-Scrambler ready | High | De-scrambler → Transport | Asserted: Indicates that the De-scrambler has | Assertion: May occur during any cycle of the data transaction. May |

TABLE 13-continued

De-scrambler Interface

| Signal Name | Active | I/O | State Meaning | Timing Comments |
|---|---|---|---|---|
| | | DMA | accepted data from the Transport DMA. Transport DMA and De-scrambler must assume a transfer of data on clock cycles where dsc_iin_rdy and dsc_iin_valid are asserted. Negated: Transport DMA or De-scrambler must wait for the transaction to complete | be held active to transfer multiple data beats. The data lines must consist of valid data. Negation: Must occur the cycle of the last data beat |
| dsc_iin_valid De-Scrambler data is valis | High | Transport DMA → De-scrambler | Asserted: Indicates that the DMA Transport has provided data to the De-scrambler Negated: Indicates data transfers may not continue on the bus. Any dsc_iin_rdy detected by DAM Transport is ignored and the De-scrambler may not advance to the next state. | Assertion: May occur during any cycle of the data transaction. May be held active to transfer multiple data beats. Negation: May occur during any cycle |

Central Services Module Interface Signals

| Signal Name | Active | I/O | State Meaning | Timing Comments |
|---|---|---|---|---|
| dsc_clock | Positive Edge | Central Service Module → De-scrambler | Asserted/ Negated: primary clock signal for the de-scrambler. All timing of the interface and internal protocol is referenced to this clock. | dsc_clock is a free running clock signal. May or may not have any relationship to the other clocks of the module and is stoppable |
| dsc_reset | High | Central Service Module → De-scrambler | Asserted: Indicates that De-scrambler must clear its internal states and enter an idle state. Negated: Indicates that the de-scrambler may operate | Assertion: may occur during any cycle synchronous to dsc_clock Negation: May occur during any cycle synchronous to dsc_clock |

One additional aspect of the present invention involves the use of circular queues to construct the various queues described above for use in the present invention. FIG. 12 illustrates an example embodiment of a queue used in accordance with the present invention. Queue 1201 comprises a contiguous block of memory 1202 having a queue start address 1203, a queue size 1204, a read pointer 1205, and a write pointer 1206. These data structures, when used together with a Memory Arbiter Queue Manager (MAQM) unit 1206, provide a hardware based solution for creating and automatically maintaining the queues without the intervention of a host processor.

In its simplest form, a circular queue is a buffer in memory which can be addressed sequentially with a provision that the "next" address in the sequence following the highest address corresponds to the first address in the buffer. FIG. 12 illustrates a data packet 1210 which is stored in memory starting at a packet start address 1211 and ending at a packet stop address 1212. Because the packet length in bytes is more than the available memory between start address 1211 and the end of this particular queue, the data packets consists of a first part 1220 and a second part 1221. The second part 1221 is stored in the lowest portion of the memory for this queue 1201 such that the data packet 1210 may be addressed as a contiguous block within this queue 1201.

The data packet 1210 can be addressed as a single block of memory if the following translation is applied to the addressing of the data packet 1210 when the packet 1210 is both written into and read from the queue 1201:

ADDR = (packet start address 1211 + count) mod queue size 1204 + queue start address 1203 where count refers to the index used to address each byte in the packet.

In the preferred embodiment, this translation is performed by MAQM as the data is written into and read from the queues. The translation is automatically performed and is transparent to the host computer and the Transport DMA Engine which move the data packets 1210 into and out of the queue 1201. Thus, the host processor and the DMA engine merely accesses the queue 1201 as a data structure using the information contained within the local header as described above as a contiguous block of memory with the operation of the queue, its pointers, and the necessary address translation being handled by the MAQM.

The memory arbiter and queue manager (referred to as MAQM) is responsible for forwarding any request for the memory access on the Transport Stream Bus onto the Memory Interface Bus. The function of this module is:

a) to arbitrate between different devices b) to forward the requests to the memory controller c) to translate the queue number into the physical address information while transferring the request to the memory controller.

d) to generate control signals for steering of the memory data to the devices and for controlling the FIFO in the write path to the memory.

e) to send the translated address onto the Transport Stream Bus so that the device which requested the memory access or address translation, can use it for it's own purpose.

The MAQM also comprises an interface to the peripheral bus. This interface is used by the host processor to initialize the pointers, queue size fields for different queues in the queue manager, and doing read/write to the status registers.

This module can be divided into 3 sub modules: an arbiter 1401, a memory request engine 1402, and a datapath control logic module 1403. The arbiter 1401 accepts the requests from all the devices and decides which device will get the grant. The arbiter 1401 is capable of taking this decision within one system clock. The arbiter 1401 uses the round robin arbitration scheme.

The Memory Request Engine 1402 forwards the request of the device, which has received the grant from the arbiter sub-module, to the memory controller. This sub-module is also responsible for the translation of the address if any device uses the queue mechanism for accessing the memory. Since this module deals with the Synchronous SRAMs used for storing the Q related information, the host interface logic is also included in this module.

Figure 14:
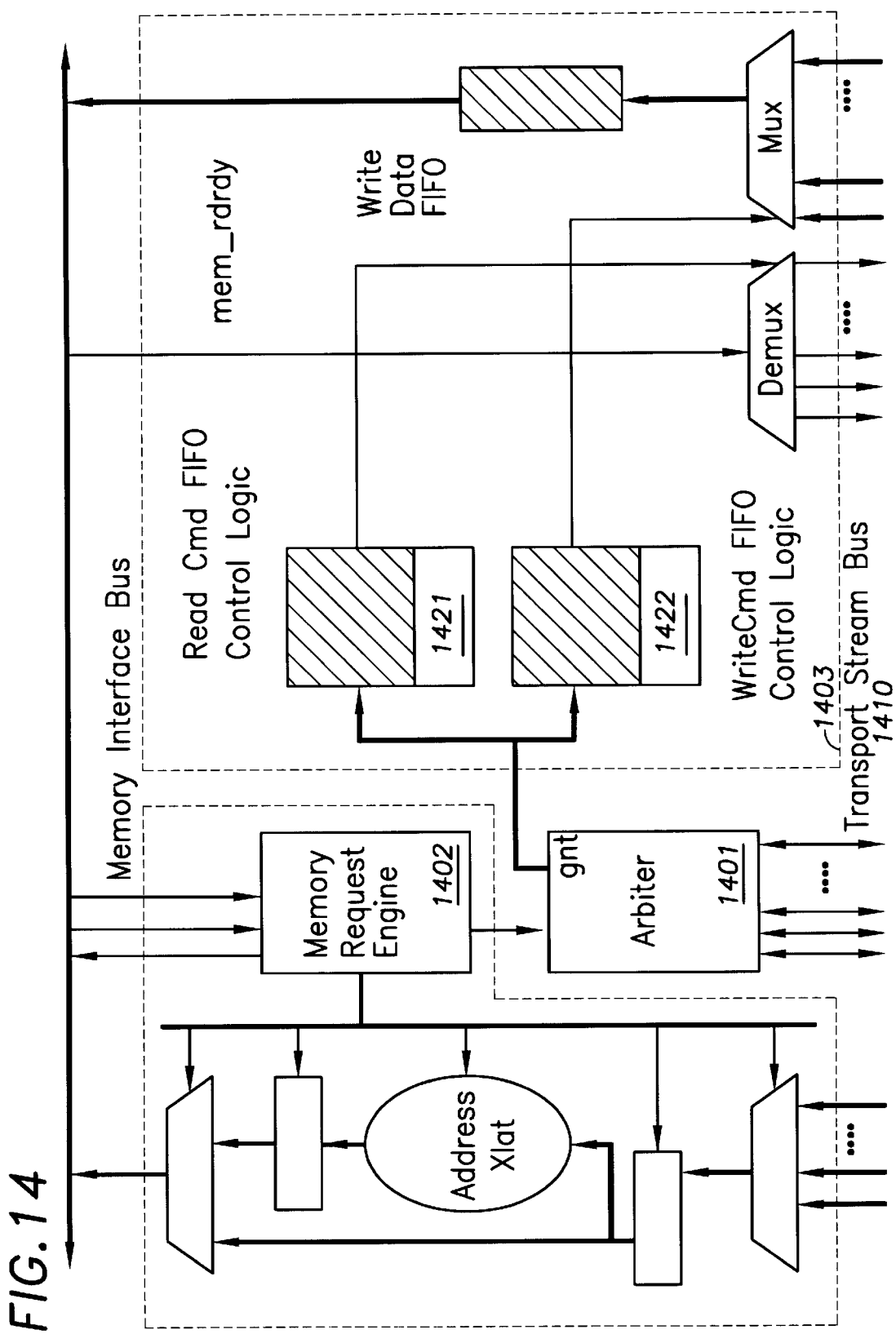
FIG. 14 is a detailed logic block diagram illustrating a MAQM module according to another example embodiment of the present invention.

The Datapath Control Logic module 1403 generates control signals to steer the incoming memory data to the proper device and also to accept the write data from various devices and to present them to the memory controller at the appropriate time. The block diagram of the MAQM module is shown in the FIG. 14.

The devices on the Transport Stream Bus 1410 will assert their requests along with the address/size/burst/command information, whenever the devices are ready to accept the data or ready to deliver the data to the memory controller. The Arbiter 1401 will sample the requests and decide which device's request will be forwarded to the memory controller. Accordingly it will assert the grant. The grant vector is also used to select the address group signals from all the requesting devices on the Transport Stream Bus 1410 with this information being stored in a register.

The device can specify the address for the memory access in one of the two ways. It can either specify the physical memory address or it can specify a unique queue number. This is indicated by the bit 31 in the address bus. Depending on this bit, the Memory Request Engine 1403 will either directly forward the address to the memory controller or translate the queue number to the physical address. The device is given an acknowledgment by means of the signal taack. Whenever the request and grant of a particular device are sampled asserted, it indicates that one request from that device was accepted by the MAQM block.

If the request specifies a Q number, then the Memory Request Engine-translates that to physical memory address. The request is forwarded to the memory controller along with the translated address. The grant information for this particular request is also stored in either Read Command FIFO 1421 or Write Command FIFO 1422. When the memory controller indicates it's ability to either accept the data from the devices, (mem_wrrdy asserted) or to supply data to the devices (mem_rdrdy asserted), the data is steered by the Datapath Control Logic 1403 to and from the appropriate device. This operation occurs concurrently. Therefore, while the Arbiter 1401 is calculating the next grant, the Memory Request Engine 1402 asserts the request signal to the memory controller and the Datapath Control Logic 1403 performs the write data transfer and read data transfer simultaneously.

Figure 15:
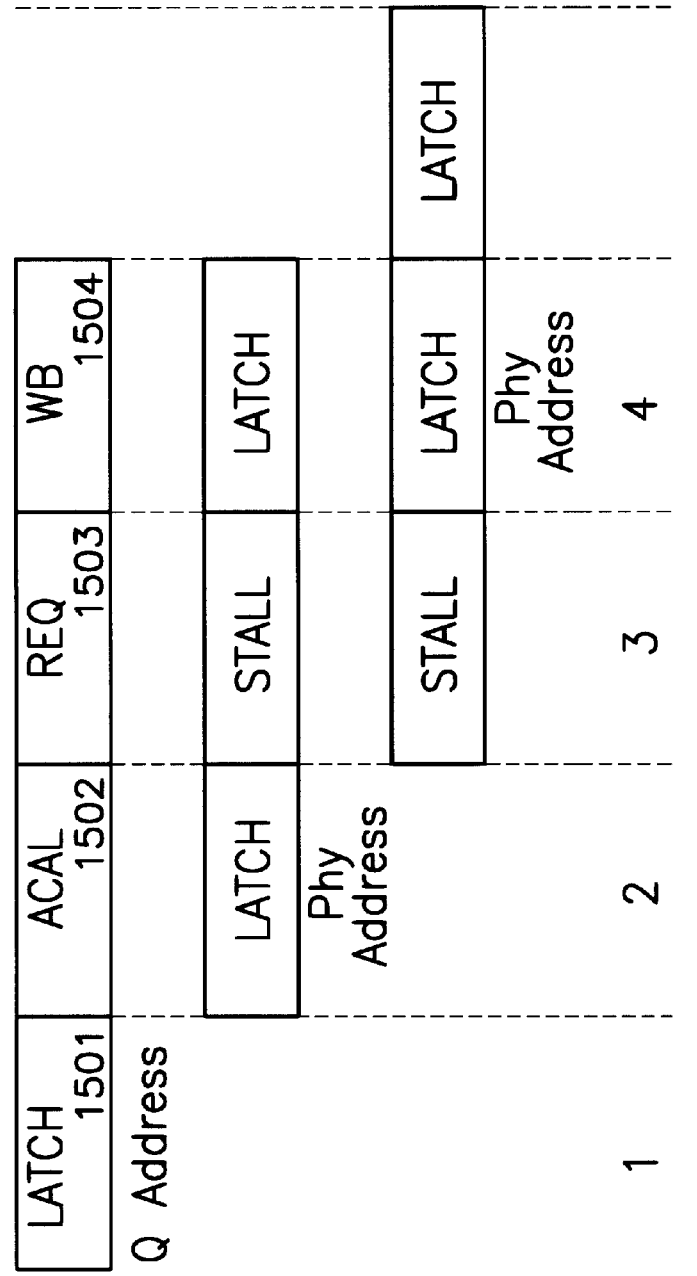
FIG. 15 is a logic state diagram illustrating a set of Pipeline Stages in a MAQM module according to another example embodiment of the present invention.

The main part of this operation is controlled by the Memory Request Engine 1402. Once a request from the device enters the Memory Request Engine 1402, it can have one of the following phases as shown in FIG. 15. It can be in the LATCH state 1501 where the address group signals are latched into the 1st of the pipeline. It can be in ACAL 1502 phase were the calculation of the memory address is going on. The REQ phase 1503 means the memory controller is notified of a request which used Q addressing mechanism. The WB phase 1504 is for the flags and the updated pointers to be written back to the SRAMs. If the request uses physical addressing mode, it is passed on to the memory controller on the next clock. The request uses the Q addressing mode. The operation requires 3 clock cycless before it is forwarded to the memory controller.

To accommodate for this difference in time required for the requests, there is a 2 stage pipeline. Every incoming request goes to the first stage of the pipeline. Depending on the addressing mode, it will either go to the memory controller or to the next state in the pipeline. The arbiter will be stalled if there is a chance that the pipeline will be full on the next clock. The typical execution flow is shown in the FIG. 15.

On the first clock, the Memory Request Engine 1402 receives a request which uses Q addressing mode. Thus the request will be forwarded to the memory controller on the clock #3. In the meantime, it receives another request which uses absolute address. This second request will not be forwarded until clock #4 when the first request is in the WB phase 1504. If the Memory Request Engine 1402 receives the requests which absolute address consecutively, then the request will be forwarded to the memory controller until the memory controller can not accept new requests. The Memory Request Engine 1402 can stall the arbiter if both the stages of the pipeline contain valid requests or are going to contain valid requests.

The Datapath Control Logic 1403 has separate FIFOs for read and write cycles. A new request enters in the appropriate FIFO whenever the arbiter asserts a new grant. The entries go on shifting in the FIFOs on each request accepted by the MAQM block. When the entry reaches the last stage in the Write Command FIFO 1422, it is used to multiplex the data from all the devices. When an entry reaches the last stage in the Read Command FIFO 1421, it is used to steer the memory read ready signal to the appropriate device. In the first case, the entry is also used to assert the ready signal to the device. The depth of both the FIFOs will be the same as that of the memory controller. Thus the FIFOs in the MAQM module will have the exact copy of the information about the requests in the FIFO of the memory controller.

The Arbiter 1401 is capable of calculating the next grant within one cycle. But Memory Request Engine 1402 may take 1 or 2 clocks to forward the request to the memory controller depending on the addressing mechanism used by the device. If the device uses Physical Addressing Mechanism, then the request will be transferred to the memory controller on the clock subsequent to the clock on which device's grant input is asserted. But if the device uses the Queue Addressing Mechanism, then the Memory Request Engine 1402 takes one clock to translate the queue number to the physical memory address. Thus, the request to the memory will be asserted 2 clocks after the grant to the particular device is asserted. Also, the Memory Request Engine 1402 will accept one more request while it is doing the address translation for the previous request, therefore it can hold 2 requests at any given time in its pipeline.

Because the time required between the request entering the Memory Request Engine 1402 and the generation of the memory request is either 1 clock or 2 clock, sometimes both of the buffers in the Memory Request Engine 1402 will contain valid requests. In such a situation, the Arbiter 1401 will be stalled. In the stalled condition, the Arbiter 1401 will not assert any grant, but it will continue to evaluate the request inputs and decide which request will get the grant on the next clock. The arbiter 1401 will also stall if the memory controller indicates its inability to accept a new memory request by asserting mem_bsy.

Figure 16:
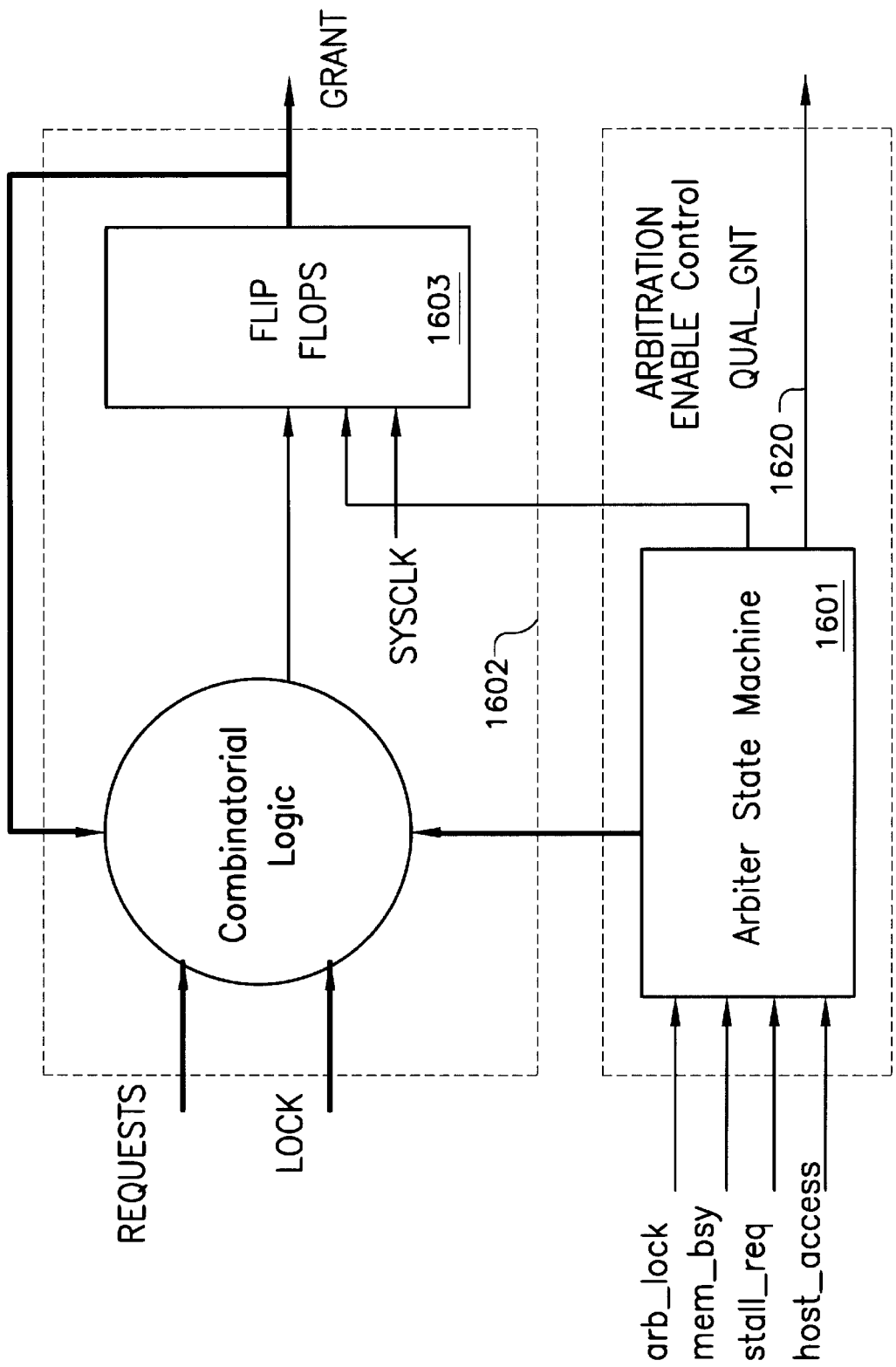
FIG. 16 is a logic block diagram illustrating a Arbiter module according to another example embodiment of the present invention.

The block diagram of the Arbiter module is shown in the FIG. 16. The Arbiter module can be further subdivided into 2 small modules. The Arbiter State Machine module 1601 controls whether the arbiter will give out the next grant vector or not. This module will stall the arbiter logic if the memory controller pipeline is not ready to accept a memory requests from any of the devices. It will also stall the arbiter logic if the Memory Request Engine 1402 is unable to register the address, size, command information for any new request from the devices because the registers holding these data, are already having valid data. In this case, the arbiter state machine will not load the new grant into the grant flip flops.

Thus the arbiter logic 1602 will maintain the current grant status. The arbiter 1401 will not load the new grant in case of arbiter lock. If a device requests the lock on arbiter, the arbiter 1401 will give grant to that device and will not change the grant till the lock is removed or the lock expires. To avoid the infinite locking of the arbiter by any device, a time-out mechanism is implemented. If a device which locks the arbiter gives more than 8 requests to the arbiter during the lock condition, then a flag "lock_expired" is asserted. This flag will cause the host CPU to be interrupted and the arbiter will start generating new grants. The decision of whether to change the status of the flip flops 1603 holding grant vector is taken by the arbiter state machine 1601. The division of the Arbiter module in this fashion is done so that the arbiter state machine 1601 runs independent of the arbitration policy chosen or the number of requests coming to the arbiter. This arrangement allows a change in the arbitration policy from the round robin scheme to any other scheme.

The arbiter state machine 1601 also generates a qualify grant (qual_gnt) signal 1620. This signal goes to the Datapath Control Logic and tells that module that the information on the grant line is new. If the Datapath Control Logic finds qual_gnt asserted 1620, it will take the grant information and put it in the appropriate pipeline. This is used in the data phase of any request.

The Arbitration Logic module 1602 actually computes the next grant vector depending on the present value of the request vector and the current grant vector. This module uses the round robin scheme. Hence, every time a device gets a grant, its priority will be the lowest. The round robin scheme is selected because there are random requests coming from the devices which need a nearly equal amount of the memory bandwidth. The grant will not change if the arbiter is locked or stalled, but the computation for deciding who will win the next arbitration continues. Thus, when the arbiter 1401 comes out of lock or stall, it will be in a position to give a new grant.

The state transition diagram for the Arbiter module is shown in the FIG. 17 The Arbiter state machine has 4 states. The Idle state 1701 is entered only after the power on reset or after the lock timer has expired. In this state, no device gets the grant. The Grant state 1702 is entered after any one of the requests is asserted in the IDLE state 1701. In this state, the arbiter logic is enabled. Thus, the grant vector can change if the request vector changes. If there is no request asserted, then the grant of the last device granted is kept asserted, i.e. the arbiter is parked on that device. If any new device requests the bus, then the arbiter evaluates the request and asserts the grant.

The Stalled state 1703 is entered if the conditions demand that the arbiter be stalled, i.e. all the grants to the devices should be negated. This situation can arise if the memory controller is unable to accept a new request or if the Memory Request Engine is unable to process any new request from the devices or the host wants to access the contents of the Q Pointer RAMs.

The Locked state 1704 is entered whenever a device locks the arbiter. The grant vector will not change in this state. As soon as the state changes to LOCK 1704, a counter which counts the number of requests from the device which locked the arbiter, is enabled. If the count exceeds 7 (meaning the devices requested 8 times) before the removal of the lock, then a bit "lock_expired" is set and the state machine returns to the IDLE state 1701. If the lock is removed before the count reaches to 7, then the state changes to GNT. The state machine can jump to the STALL state 1703 from the LOCK state 1704, if the Memory Request Engine, of memory controller asks the arbiter to stall.

Any access to the SRAMs by the host can not proceed if the Arbiter has been locked by a device or if the Pipeline in the Memory Request Engine is not empty. The signals req_2_acc_srams, host_acc_gnted and host_cycle_done are involved in this handshake operation. Any access to the SRAMs by the host will result in the assertion of a signal req_2_acc_srams. The arbiter than asserts the signal host_acc_gnted giving the permission to access the SRAMs. When the host access is complete, the signal host_cycle_done will cause the normal operation to be resumed.

Figure 18:
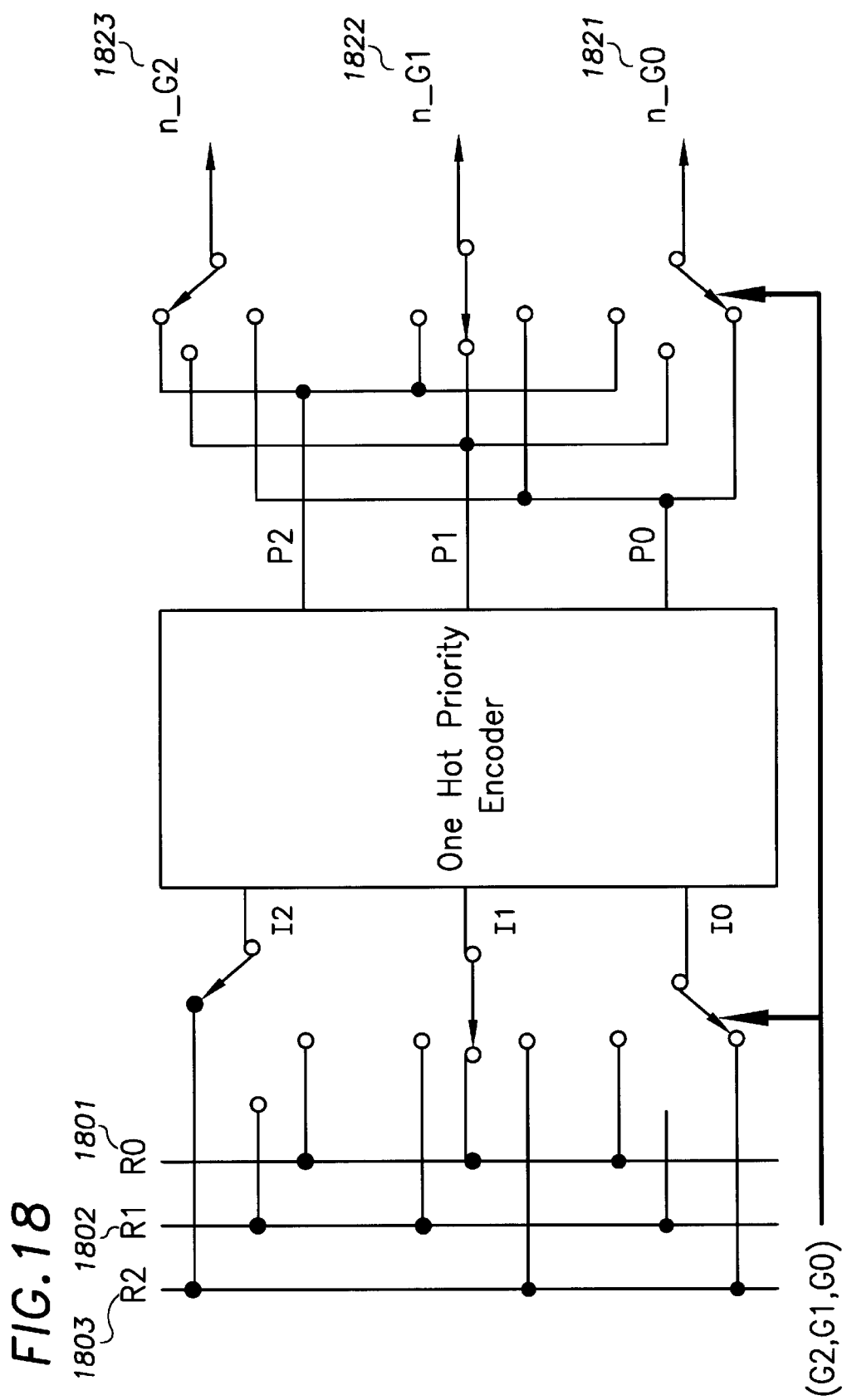
FIG. 18 is a logic block diagram illustrating a round robin arbiter according to another example embodiment of the present invention.

The actual arbitration logic is purely combinational and is dependent on the arbitration algorithm chosen. As a result, the logic is located within a separate module. Also, the requests are divided into 2 sub groups. The primary requests are the requests which need more memory bandwidth. The secondary requests are the requests for which the memory bandwidth required is small. The primary arbiter arbitrates between the primary requests and the combined secondary group request. When the secondary group is granted, then the request selected by secondary arbiter will be granted. The current algorithm selected is the round robin algorithm. The table 13 below shows the priority evaluation for a 3 input arbiter. FIG. 18 shows an example embodiment for an implementation of the logic for 3 input arbiter.

Each request coming to the arbiter core will go to a switch. The switch will connect a particular request to one input of a priority encoder at any given time, depending on the present status of the grant. This priority encoder gives its output in one hot coded fashion. Assume that the current grant status is 3'b001. i.e. requester R0 1801 is granted. So requester R2 1803 will have the highest priority and R0 1801 will have the lowest priority and R1 will have the medium priority. The input R2 1803 will be switched to input I2 of the priority encoder. R1 1802 will be switched to the input I1 of the priority encoder. R0 1801 will be switched to the input I0 of the priority encoder. Similarly, if present grant is (001), then the output P2 of the priority encoder will be switched to n_G2 1823, output P1 will be switched to n_G1 1822, and the output P0 will be switched to n_G0 182. This decision of where to switch the input is based on the present grant condition. The positions of different switches in FIG. 6 show the case present grant is 001.

The logic is implemented in this fashion so that the arbiter module can be parameterized. The switch operation is a cyclic operation, i.e. depending on the present grant, the present quest vector is rotated (carry comes back to LSB) a certain number of times. The result of this rotation, goes to the priority encoder. A reverse rotation on the outputs of the priority endcoder will give the next grant vector.

TABLE 13

Priority Evaluation for 3 input round robin arbiter.

| Present Grant {G2, G1, G0} | The Highest Priority Request | The Medium Priority Request | The Lowest Priority Request |
|---|---|---|---|
| 000 (The state after reset) | R2 | R1 | R0 |
| 001 | R2 | R1 | R0 |
| 010 | R0 | R2 | R1 |
| 100 | R1 | R0 | R2 |

Figures 1, 19:
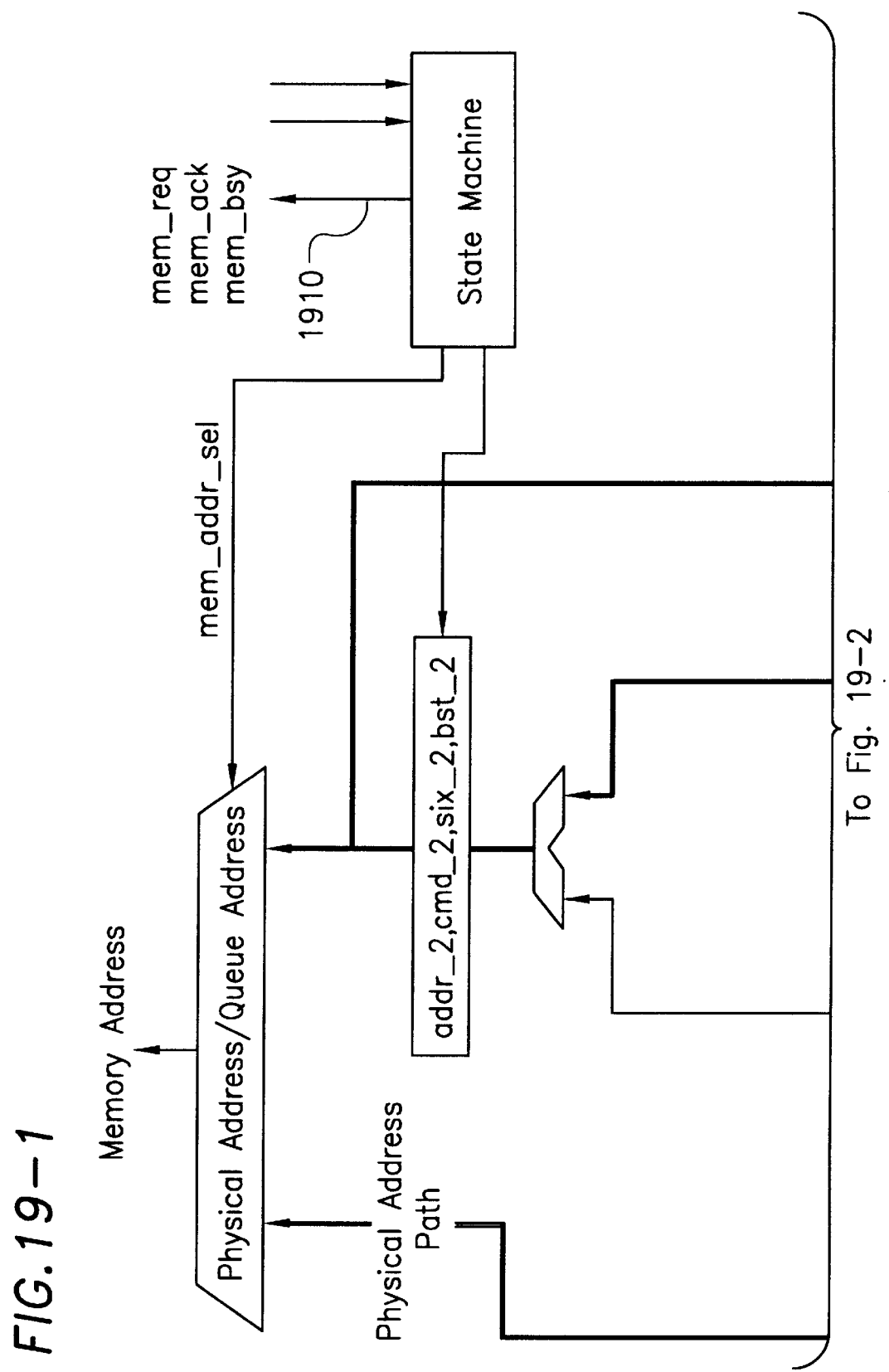
FIG. 19 is a logic block diagram illustrating a Memory Request Engine Module according to another example embodiment of the present invention.
Figures 2, 19:
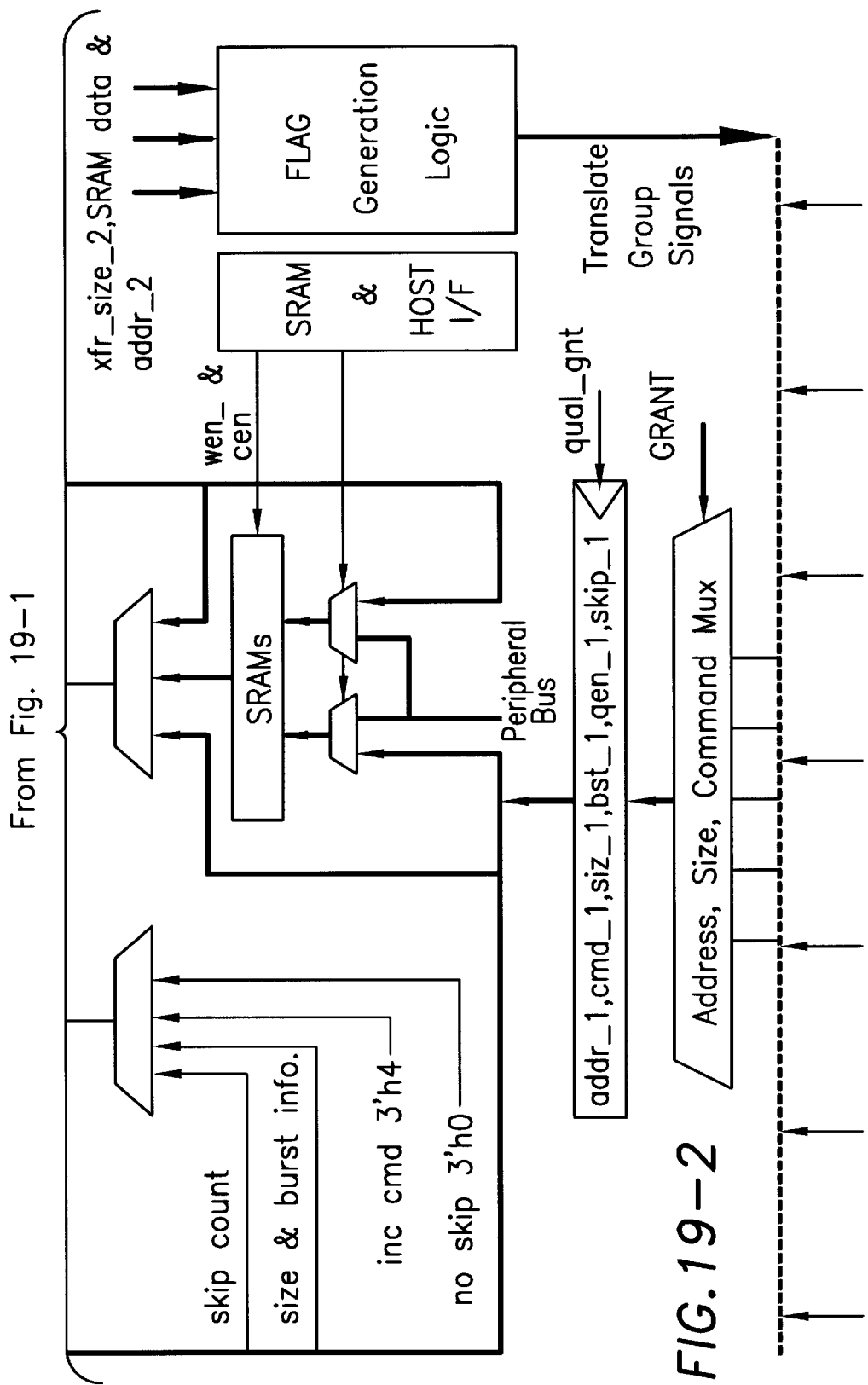

The Memory Request Engine module generates the control signals required for the operation of the address translation, request generation. The block diagram for this module is shown in the FIG. 19. This module is the main logic in the MAQM module. This module will accept the cerrent grant information from the Arbiter. It will use the grant to select the address group information for the device whose grant input is asserted. The address is then translated to the physical memory address if the device uses Queue Addressing Mechanism. When this is done, it will asset the memory request signal going to the memory controller. When the memory controller asserts the mem_akc 1910, it means that one request has been accepted by the memory controller. If the Memory Request Engine has one more request pending in its pipeline, it can keep the request asserted and change the address/size/command information. It also presents the id of the device whose request was forwarded to the memory controller, to the Datapath Control Logic along with the command (read or write) information. When the memory controller asserts the mem_ack 1910 and if mem_req is asserted, one new entry will enter either the Write Command FIFO or the Read Command FIFO. The address translation is achieved by using a SRAM.

The queue number presented by the device (bits 23 to 16 of module_tadr) is used as an address to this SRAM. The contents of the selected location is the physical address. The device may specify to skip a certain number of bytes from this address. This is indicated by bit #30 in the address vector. If that bit is set, then the number indicated by module_tadr[15:0] is added to the output of the SRAM. The final result is the actual physical address to be sent to the memory controller. This is used to update the queue pointers, the queue full, and the queue empty flags. This whole information is then sent on the translation signals along with the queue number. The device whose queue number matches the data present on the txlat_qnum will use the translated address present on txlat_offset. This is done to aid the byte packing and unpacking process that is done in the device.

Figure 20:
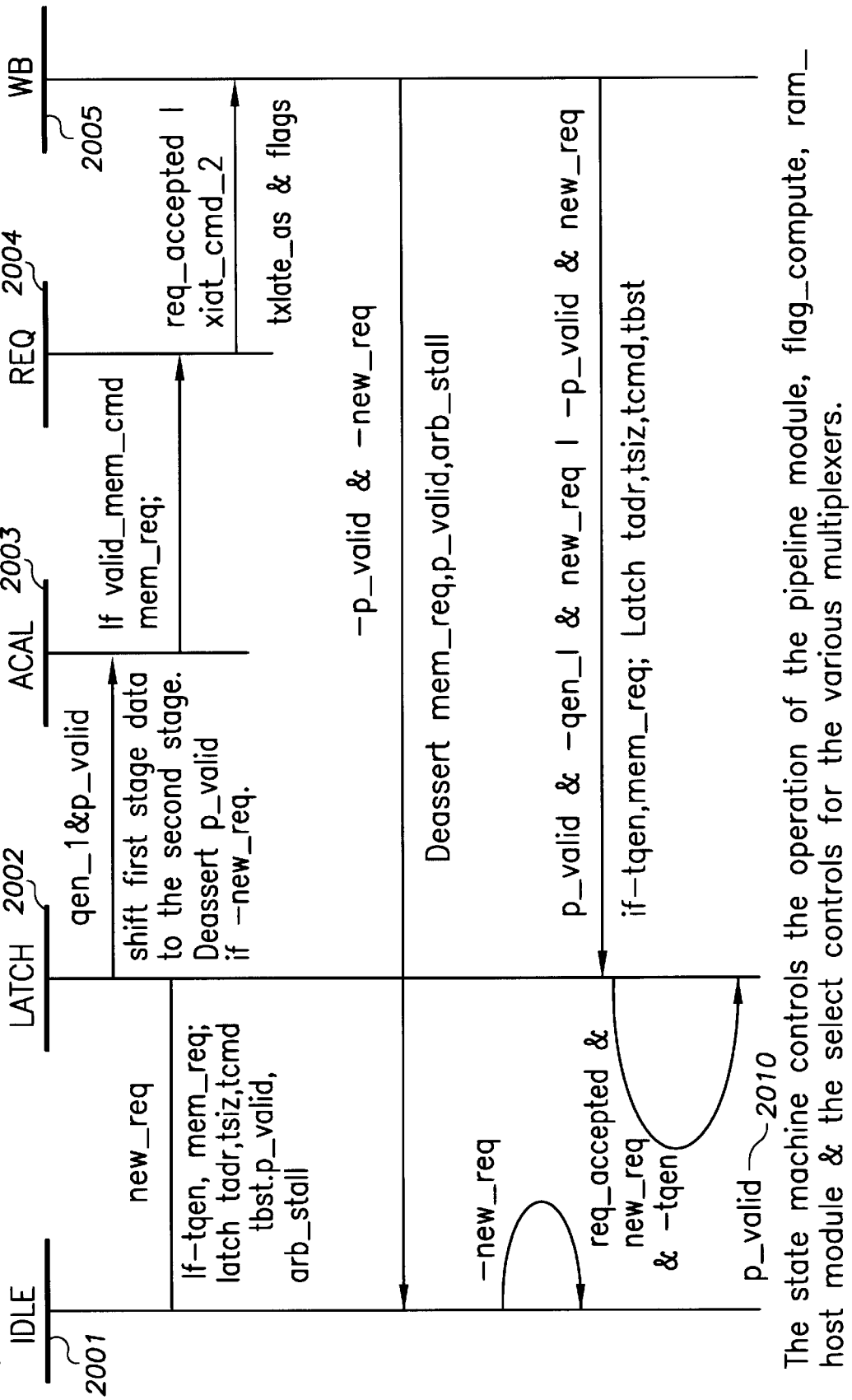
FIG. 20 is a state diagram illustrating Memory Request Engine transitions according to another example embodiment of the present invention.

The state transition diagram for the Memory Request Engine is shown in FIG. 20. This state machine is very closely coupled to the multiplexor module and the pipeline module. The state machine controls the operation of the pipeline module, flag_compute module, ram_host module, and the select controls for the various multiplexers.

The IDLE state 2001 is entered upon the reset condition. When there is a new request from the arbiter, the state changes to LATCH 2002. Also, the address group signals are latched into the first state of the pipeline. If the device uses an absolute address, then that request is forwarded to the memory controller. If the request uses Q addressing mechanism, then the state changes to ACAL 2003. Here, the read cycle from the SRAMs in initiated and the contents of the first state of the pipeline are shifted to the second stage. Thus, the logic can accept one more request while it is processing one request. The RAM data will be valid in the next clock cycle. The data is used to compute the address to be given to the memory controller. Thus, in the REQ state 2004, the memory controller is presented with the address and command information.

From the address given to the memory controller and the size of the transfer, the computation of the flags and Q depth starts. These signals are latched into the flip flops during the WB state 2005. Here the updated pointer and the flags are written back to the SRAMs. Thus, if the request uses the absolute address, it will take only 1 clock to go to the memory controller. But if it uses Q addressing mechanism, it will take 3 clocks. While going from the REQ 2004 state to the WB state 2005, if there is any request in the pipeline's first stage (indicated by p_valid) and that request uses the absolute addressing mode, then the request is forwarded to the memory controller in the WB state 2005. The requests using the absolute addressing mode will not face any delay under any circumstances; however, the requests, which need the address to be computed from the SRAMs, will face the delay.

The signals mem_req can be thus generated in LATCH 2002, REQ 2003, or WB state 2005. The signal p_valid 2010 and arb_stall are used to control the arbiter. If the first stage of the pipeline has valid data, then the signal p_valid 2010 is asserted. This signal will be deasserted when either the contents of the first stage of the pipeline are shifted to the second stage or the contents are forwarded to the memory. The signal arb_stall is used to stall the arbiter if the pipeline can not accept any more request or it anticipates that both the stages will have valid data on the next clock. The arbiter is capable of giving new grants on every clock. Due to the synchronous nature of the arbiter, it may give one request before it samples the arb_stall asserted. Hence, when a request using the Q addressing mechanism is encountered, the arbiter is stalled until the request goes from the first stage of the pipeline to the second stage. The state machine also controls the various multiplexors which are used in the address translation logic. The table lists the various cases when we have to use the multiplexors.

TABLE 14

The various conditions the address translation logic will encounter.

| Command | tqen | skip | Actions in LATCH state | Actions in ACAL state | Actions in REQ state | Actions in WB state |
|---|---|---|---|---|---|---|
| NOP | 0 | X | Latch the address, Request to the memory controller. | | | No write back needed. |
| | 1 | 0 | Latch the address group signals. | Calculate the address. | Generate the request. | No write back. |
| | 1 | 1 | Latch the address group signals. | Calculate the address | Generate the request. | No write back. |
| WRITE | 0 | X | Latch the address. Generate the request. | | | No write back needed. |
| | 1 | 0 | Latch the address group signals. | Calculate the address. | Generate the request. | Write Back the address calculated in the 2nd step + # bytes transferred. |
| | 1 | 1 | Latch the address group signals. | Calculate the address. Add # of skip bytes. | Generate the request. | Write Back the address calculated in the 2nd step + # bytes transferred. |
| WRITE INC | 0 | X | Increment the address in the addr_2 register. | | | No write back needed. |
| | 1 | 0 | Latch the address group signals. | Calculate the address. | | Write Back the address calculated in the 2nd step + 4. |
| | 1 | 1 | Latch the address group signals. | Calculate the address. Add # skip bytes to it. | | Write Back the (address calculated in the 2nd step + 4.) |
| READ | 0 | X | Latch the address group signals. Generate the request. | | | No write back needed. |
| | 1 | 0 | | Extract queue id. Find the physical address. | | Write Back the address calculated in the first step + 4. |
| | 1 | 1 | | Extract queue id. Find the physical address. Add # of skip bytes. | | Write Back the address calculated in the first step + 4. |
| READ INC | 0 | X | | Address is the physical address. No translation | | Store the address calculated in the first step + 4 |
| | 1 | 0 | | Extract queue id. Find the physical address. | | Write Back the address calculated in the first step + 4. |
| | 1 | 1 | | Extract queue id. Find the physical address. Add # of skip bytes. | | Write Back the address calculated in the first step + 4 |
| XLAT_RD | 0 | X | Illegal Command | Illegal Command. (1) | Illegal Command | Illegal Command |
| | 1 | 0 | Latch the address | Calculate the address. | No request to the | Send the calculated |

TABLE 14-continued

The various conditions the address translation logic will encounter.

| Command | tq e n | s ki p | Actions in LATCH state | Actions in ACAL state | Actions in REQ state | Actions in WB state |
|---|---|---|---|---|---|---|
| | | | group signals. | Use the Read Pointer RAM for this. | memory controller. | address back to the transport devices. |
| | 1 | 1 | Latch the address group signals. | Calculate the address. Use Write Pointer RAM for this. Add # of skip bytes. | No request to the memory controller. | Same as above. |
| XLAT_WR | 0 | X | Illegal Command | Illegal Command | Illegal Command | Illegal Command |
| | 1 | 0 | Latch the address group signals. | Calculate the address. Use the Write Pointer RAM for this. | No request to the memory controller. | Send the calculated address back to the transport devices. |
| | 1 | 1 | Latch the address group signals. | Calculate the address. Use Write Pointer RAM for this. Add # of skip bytes. | No request to the memory controller. | Same as above. |

The Multiplexers and Select Controls module contains 5 multiplexers to select base address and the offset values. They are given below in the Table 15. The select controls to these muxes are derived from the state machine and the command presented by the device. The following sections describe each of these multiplexers in detail.

TABLE 15

Multiplexers and Their Functions

| Multiplexer | Function |
|---|---|
| Base Address Multiplexer | To select either RAM output or the physical address or the Queue Address computed earlier. |
| Offset Multiplexer | To select the offset to be added to the base address. The offset can be 0,4, skip count, or the size of the data transferred. |
| Address Multiplexer | To select either the latched physical address or the translated Address. |
| Read or Write Pointer Select Multiplexer | To select either the Read Pointer or the write Pointer for the address calculation depending on the command. |
| Queue RAM Address Multiplexer | To select between the queue_id and host_address. |
| Queue RAM Data Multiplexer | To select between the queue_addr and host_data. |

The Base Address Multiplexor selects the base address of the translated address. The select control for the multiplexer is decided by the state of the machine and the command and the addressing mode used. The Base Address Multiplexor is illustrated in FIG. 21.

Table 14 below describes the conditions which will have effect on the value of the select input to this multiplexer. The output of the RAM is used only when the request comes from a different device or the device uses READ or WRITE command. The value addr_1 is used for the increment commands with the physical addressing mode. The value queue_addr is used for the increment commands with the queue addressing mode.

TABLE 14

The Select Control for the Base Address Multiplexer

| State | Condition | Action |
|---|---|---|
| IDLE | There is a new request and the command is either RD_INC or WR_INC | Select the addr_2 register. The previous command would have latched the address in the addr_2 register. |
| IDLE | There is a new request and it uses Queue addressing mode and the command is READ or WRITE | Select the output of the RAM. This command should occur before any RD_INC or WR_INC command occurs. |
| IDLE | There is a new request and it specifies the physical memory address. and the command is READ or WRITE | Select the addr_1 register. |
| LATCH | Q addressing cmd is being processed and it is asking to increment address | No change. |
| LATCH | Q addressing cmd is being processed and it is either READ or WRITE. | No change.t |
| LATCH | Physical addressing is being processed and it is asking to increment the address. | The select would have already selected addr_1 register. |
| ACAL | On the next clock, one request will be given to the memory controller. Hence prepare for the write back operation. | Select addr_2 register. |

TABLE 14-continued

The Select Control for the Base Address Multiplexer

| State | Condition | Action |
|---|---|---|
| REQ | If memory has not acknowledged for the request. | Do not change the select. |
| REQ | If request is accepted and there is a new request with physical addressing mode. | Select addr_1 register. |
| WB | There is a new request which uses absolute address. | select addr_1 register |
| WB | There is a new request which used the Q addressing mode. | Do not change the select. |

This multiplexer supplies the offset to be added to the base address in order to generate the final translated address. The width of each field is different. i.e. in one case the offset is 4, n other case it is the 16 bit skip count. In the third case, it is the number of the quads transferred, or the fourth case is where we do not need any offset. The values skip_count, 4, and 0 are useful only during the address translation phase. The value "size" is useful during the write back phase. The FIG. 22 shows the schematic for this multiplexer.

Table 15 below lists the conditions which can control the value of the offset.

accessing the contents of the RAM from the host. The multiplexers are controlled by the host interface logic. They require the handshaking between the host and the arbiter and the memory request state machine. Only under certain conditions will the host address and host data be passed to the SRAMs. The function of the adder is to add the base address and the offset to generate the final translated address. The base address is 26 bit wide. The offset is 16 bit wide. Since the address translation logic must perform its operation within one clock, the adder selected is Carry Look Ahead type adder.

TABLE 15

The Select Input for the Offset Multiplexer

| STATE | Condition | Offset |
|---|---|---|
| IDLE | new_req and qen and!skip | Offset is 0. This is because this request probably is preceding a sequence of the RD_INC or WR_INC commands. |
| IDLE | new_req and qen and skip | Offset is equal to the skip count. |
| IDLE | new_req and!qen | Offset and Base address are not required. So keep the value same. |
| LATCH | qen_1 | No change in the offset value. |
| LATCH | req_accepted and new_req and inc_cmd | Offset is 4. The start address is already latched in the addr_2 register. |
| LATCH | req_accepted and new_req and!inc_cmd | Offset is 0. |
| LATCH | req_accepted and new_req and skip and qen | Offset is equal to the skip count. |
| ACAL | cmd_1 is an increment command | Offset is 4. This is the start of the write back operation. |
| ACAL | cmd_1 is not increment command. | Offset is equal to the number of the quad data to be transferred. This is the start of the write back operation. |
| REQ | ! req_accepted | Do not change the offset. |
| REQ | req_accepted and new_req and qen and!skip and!inc_cmd | No change. If a request using Q addressing mechanism in encountered in REQ or WB states, the state changes to LATCH and then the computation starts. |
| REQ | req_accepted and new_req and qen and!skip and inc_cmd | No change. |
| REQ | req_accepted and new_req and qen and skip | No change. |
| REQ | req_accepted and new_req and!qen and inc_cmd | Offset is equal to 4. |
| REQ | req_accepted and new_req and!qen and!inc_cmd | Offset is 4. This is used to advance the current address by 4, in anticipation of the next command being a RD_INC or WR_INC command. |

The multiplexer for the Memory Address Group Signals selects either the value latched in the addr_1 register or the value latched in the queue_addr register. The register addr_1 contains the physical address specified by the device. The requester queue_addr contains the translated address.

There are 2 multiplexers, one each for address and data_in ports of the RAM. These multiplexers provide a way of

TABLE 16

Select Control for the final Multiplexer in the Address Path.

| State | Condition | Select Control |
|---|---|---|
| IDLE | new_req and!tqen | Select addr_1 |
| IDLE | new_req and tqen | No change. |

TABLE 16-continued

Select Control for the final Multiplexer in the Address Path.

| State | Condition | Select Control |
|---|---|---|
| LATCH | qen_1 and p_valid | No change |
| LATCH | !quen_1 and !req_accepted | Do not change. |
| LATCH | req_accepted and new_req and tqen | No change |
| LATCH | req_accepted and new_req and !tqen | Select addr_1 |
| ACAL | No condition in this state. | Select addr_2 |
| REQ | !req_accepted | Select addr_2 |
| REQ | new_req and tqen | Change back to addr_1. By default the memory address is same as addr_1. Only when a request uses Q addressing mechanism, or increment command is encountered, the address is taken from addr_2. |
| REQ | new_req and !tqen | Select addr_1 |
| WB | p_valid and !qen_1 and !req_accepted | Select addr_1 |
| WB | p_valid and qen_1 | Select addr_1 |
| WB | -p_valid | Select addr_1 |

The SRAM and Host Interface functions are combined together because they are closely related to each other. A synchronous SRAM will be used for storing the pointers and the flags related to the queues. The maximum number of queues allowed is 256. The different fields and their widths are given in table 17.

The host bus is 16 bits wide. Some of the fields are more than 16 bits in width. Hence, the read pointer and write pointer fields are mapped into the host space as 2 half-words. Also the fields Q size, High Water Mark and Low Water Mark are combined together and mapped in a single half-word in the host address space. These fields are accommodated in 5 different SRAMs; one each for read pointer, write pointer, threshold, Q size and watermarks combined together and the flags. The address to these SRAMs is the queue id in the normal operation. During the address translation process, the values for a specific queue are read from the SRAMs. Depending on those values and actual transfer size, the flags and the pointers are updated in the write back process. The host will initialize the fields for all the queues during the boot process. The host also can update the fields during the normal operation.

TABLE 17

Q Related Fields

| Field | Width | Purpose |
|---|---|---|
| Read Pointer | 26 | The Reads from the queue will use this value. |
| Write Pointer | 26 | The writes to the queue will use this value. |
| Threshold | 8 | This value is used to determine the fullness and emptiness of the queue. |
| Q Size | 4 | This field denotes the size of the queue. The actual Q size is given by the formula actual Q size = $32*2^{(Q\ size)}$ |
| High and Low Watermarks | 10 5 bits each | These fields are used to ensure that there is always enough data in the queue for the consumer and there will be an advance warning of Q being full or empty. The entire Q is divided into 32 equal parts. The actual watermark levels are calculated as follows. HWM Level = (Actual Q Size/32) * HWM LWM Level = (Actual Q size/32) * LWM |
| Flags | 5 | These flags give us the status of the queue. The mark flags include Q Full, Q empty, High Water mark crossed, Low water mark crossed, Wrap Around of the pointers. These flags will be broadcast during a translate cycle. |

The MAQM block will access the SRAMs in the ACAL and WB states of the Memory Request Engine state machine. During the ACAL state the logic will perform a read operation on the RAMs to get the current read or write pointer and other related fields. During the WB state, the updated pointer and flags are written back. The hardware does not have a write permission to the Threshold RAM, Q Size and Water Mark RAMs. The host can do Read or Write to any of the RAMs. The computation of the flags starts as soon as the Memory Request Engine state machine enters the ACAL state. The flags will be ready at the end of the WB state. At the end of the WB state, a translate cycle will broadcast the flags and the Q fullness along with the queue id. The device whose queue id matches with that on the bus, will use the flags and other information for its own processing.

Figure 23:
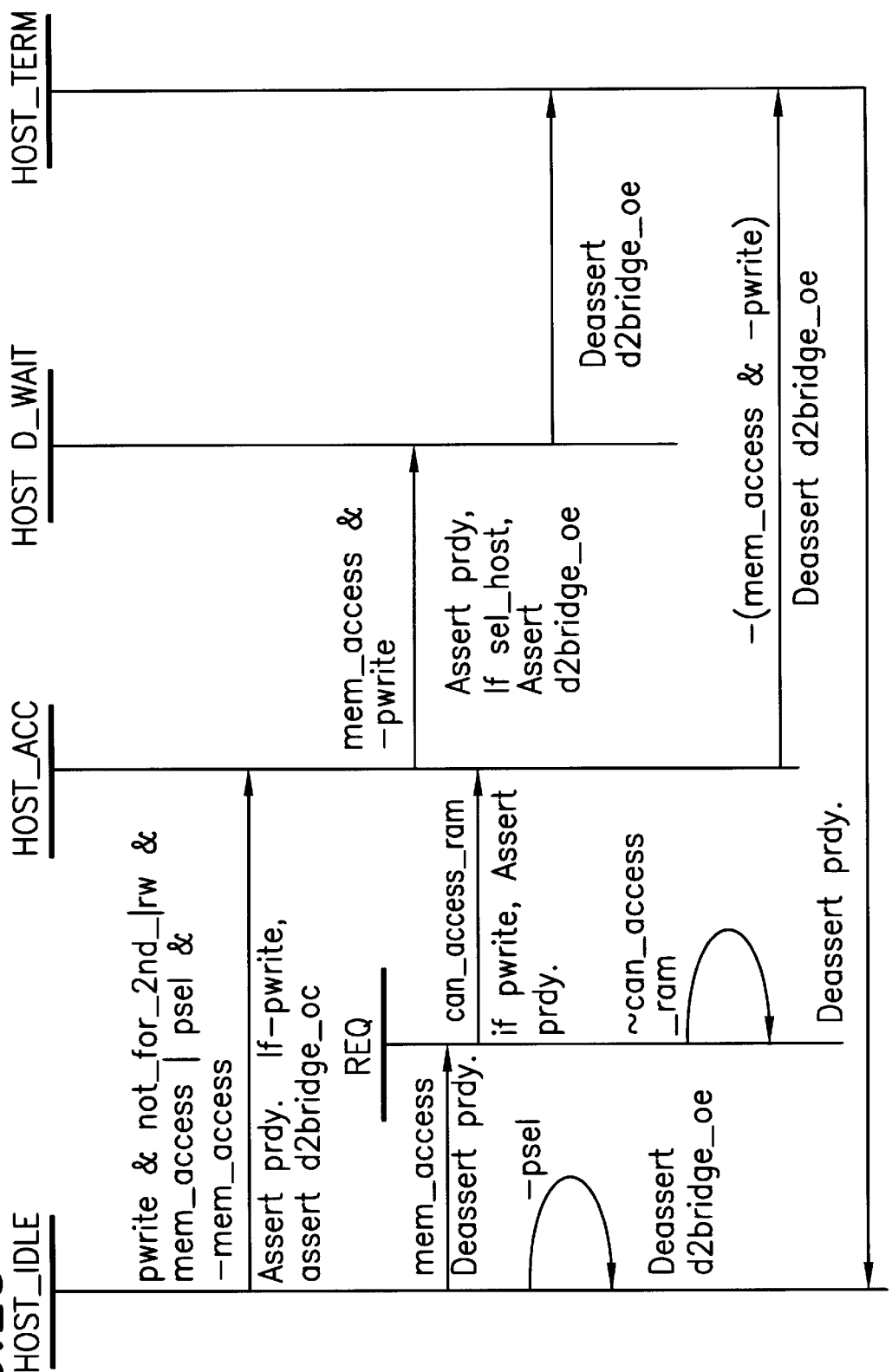
FIG. 23 is a state diagram illustrating Host State Machine transitions according to another example embodiment of the present invention.

The host access is governed by the host state machine. This is a small state machine used to generate the d2bridge_ee and prdy_maqm signals. The state transition diagram is shown the FIG. 23. The signal prdy is deasserted as soon as any read access to the SRAMs or any write access to the Threshold SRAM, Q Size and Water Mark SRAM or any write access to the Upper Read or Write Pointer fields is detected. This signal is kept deasserted until the conditions favor the host access to the SRAMs. The signal not_for_2nd_hw indicates the current address is not for the half-words with addresses XXX2, XXX6, XXXA, XXXE etc. The state HOST-RD_WAIT is needed because the SRAMs need 2 clocks to complete the read cycle. Hence during the read access, the state machine will go through this state.

Figure 24:
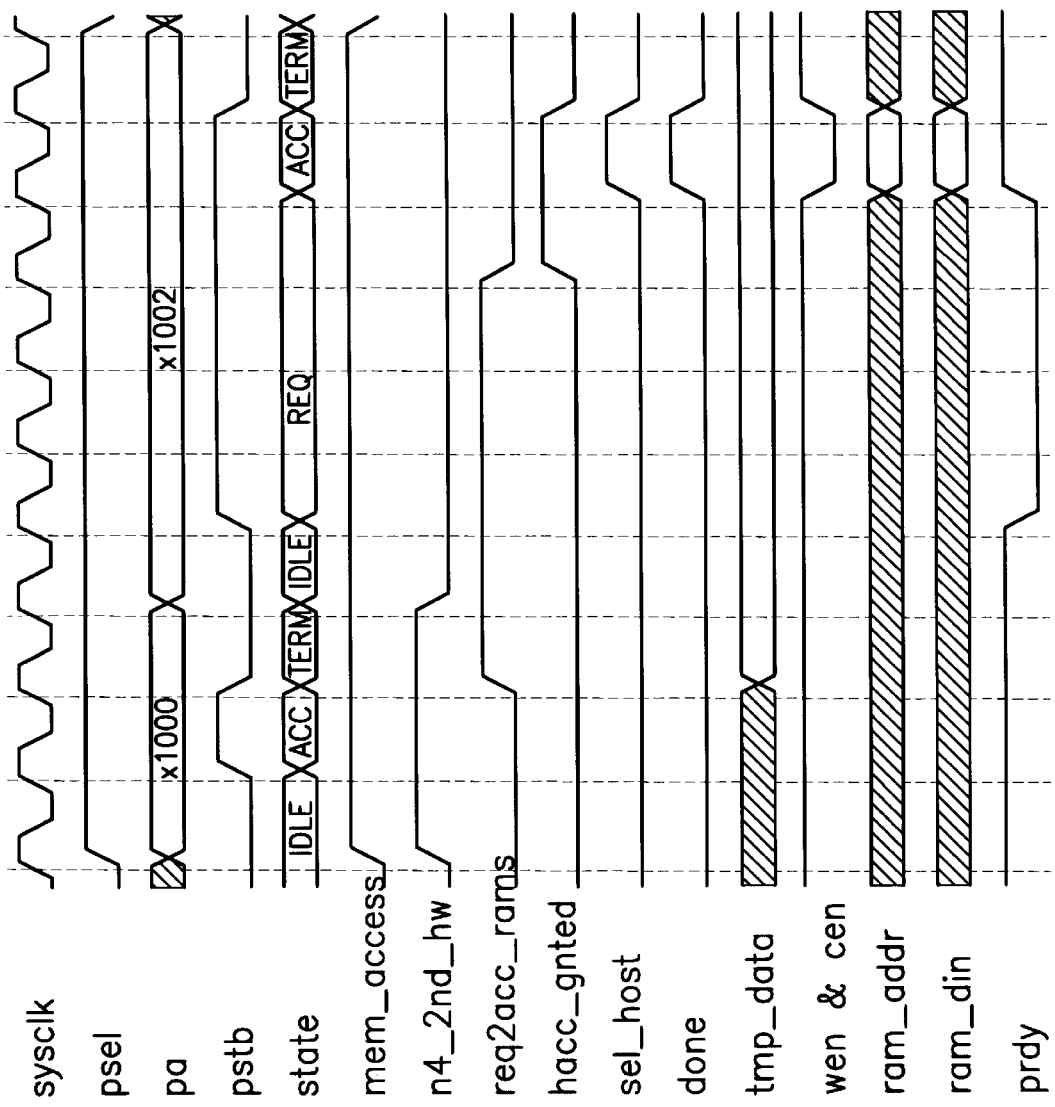
FIG. 24 is a timing diagram illustrating Host Access to Write Pointer RAM according to another example embodiment of the present invention.

A host access to the SRAMs is not allowed to proceed until the arbiter is not in the LOCK state and the pipeline in the Memory Request Engine is empty. This will ensure that the host does not update the contents of the RAMs while a request from the device is being processed. The signals req_2_acc_srams, host_acc_gnted and host_cycle_done are used in this handshake between the arbiter and the host interface. Since the read and write pointer fields are 26 bit wide, the host needs to perform 2 cycles to access one entity from the read pointer SRAM and the write pointer SRAM. The write to these SRAMs is different from the write to any other SRAM. The host will write the lower halfword of the pointer to the appropriate SRAM. But a write cycle to the SRAM is not initiated until the host writes the upper half of the pointer. Only then a write cycle is initiated to the appropriate RAM. The first halfword is stored in a temporary register. Note that if the software changes this sequence of initialization, the pointer will not be initialized correctly. FIG. 24 shows the handshake between the arbiter and the host interface.

Figure 25:
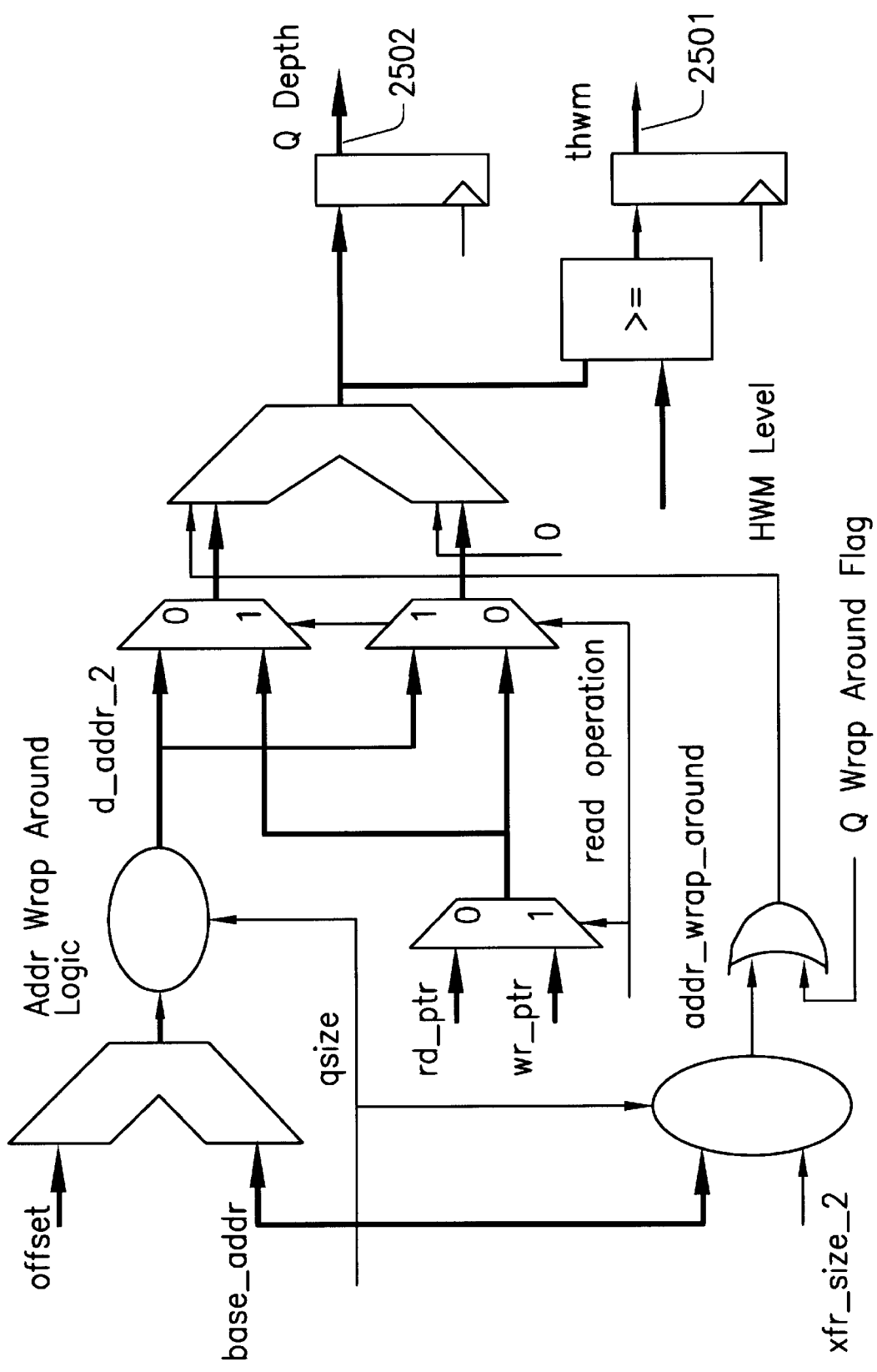
FIG. 25 is a logic block diagram illustrating a a Flag Computation Logic according to another example embodiment of the present invention.

The flags and Q fullness are computed for every request that uses the Queue Addressing Mechanism. FIG. 25 shows the logic used to compute the data available in the Queue and various flags associated with the queue. Note that the diagram shows only the thwm flag 2501. The other flags use the similar logic. The computation has to be performed in one clock. The output of the adder contains the linear value of the updated pointer. The address wrap around logic will take into account the size of the queue and thus give out a pointer which is wrapped around the queue size. This value is to be stored in the Write Pointer SRAM for write cycles and in the Read Pointer SRAM for the read cycle. The logic also looks at the queue wrap around flag (telling that the write pointer was wrapped around) and the address wrap around flag (telling the current pointer has wrapped around).

Table 18 below shows the possible combinations of these variables. The multiplexers select the appropriate value and provide the 2 operands to the subtractor. The output of the subtractor gives the data available in the queue. This is clocked into a set of the flipflops and then broadcast during the translate cycle. The flags are computed using the qdepth and different levels associated with the queue. The diagram shows the computation of the high water mark crossed flag. The high water mark level is computed from the high water mark value programmed and the queue size. This value is compared with the queue depth 2502. If q depth is more than the high water mark level, high water mark flag is set. Similarly the flags low water mark crossed, Q full and Q empty are calculated.

memory controller knows. Because of this, the logic which steers the data to and from the devices is simple. The logic which generates the req_id and the beats information is common to the read path and the write path. Similarly multiplexing the incoming write data and byte enables is a function of the write data path logic. The block diagram of the Data Path Controller Logic is shown FIG. 26.

The write data path control module 2610 will multiplex the data coming from the devices and will pass it on to the memory controller. The block diagram of this module is shown in the FIG. 27. The arbiter asserts the signal qual_gnt 2710 whenever it puts a new grant vector on the grant bus. The grant vector acts as a select to a multiplexer which multiplexes the tsizw, tbst, tcmd signals. From the multiplexed tsize, tbst and tcmd information, the number of clocks a device will be writing the data to the memory controller (beats) is calculated. For example, if tsize is 5, it means there will be 2 data transfers, although the actual bytes transferred will not be 8. The incoming grant information is also in binary coded form. The req_id and beats information goes to the Command FIFO. The output of the FIFO is latched in the registers data_mux_select and beat_cntr. The register data_mux_select acts as a select

TABLE 18

Decision Table for Q Depth Computation

| Cycle | Addr Wrap Around | Q Wrap Around Flag | Operand for the + input of the subtractor | Operand for the- input of the subtractor | Remark |
|---|---|---|---|---|---|
| Write | 0 | 0 | {roll_over,d_addr_2} | read pointer | No wrap around |
| Write | 0 | 1 | {roll_ove,d_addr_2} | read pointer | Wrap Around |
| Write | 1 | 0 | {roll_over,d_addr_2} | read pointer | Set Q wrap around flag |
| Write | 1 | 1 | Write Rate is too high to cause overflow before the buffer is completely by the consumer. | | |
| Read | 0 | 0 | {roll_over,wr_ptr} | d_addr_2 | Normal Operation |
| Read | 1 | 0 | Read can not be ahead of the write. | | |
| Read | 0 | 1 | {roll_over,wr_ptr} | d_addr_2 | Wrap Around |
| Read | 1 | 1 | {roll_over,wr_ptr} | d_addr_2 | Reset Q wrap around flag. |

The Datapath Control Logic module controls the data transfer happening between the memory controller and the device. It allows a write transfer to proceed while the memory controller is supplying the data for the read operation for some other device. This is achieved by 2 separate paths in the logic. One path will be concerned with the read data given by the memory controller. The other path is concerned with the write data coming from the devices, and going to the memory controller. The Arbiter provides the information about the device id by means of the grant vector. The multiplexed address group signals tsize, tbst and tcmd are used to compute the type of the cycle and the size of the data transfer. The size is represented in terms of the number of clocks. This module is not concerned with the number of bytes a device wants to read or write. What it needs is the number of clocks the signal mem_rdrdy or mem_wrrdy is to be asserted to complete this data transfer. The beats information thus depends on the command and tsize and tbst signals.

When the arbiter generates a new grant, the command FIFOs in the read data path control and write data path control will see whether the new request is a read operation or a write operation. Accordingly the req_id and the beats information will be stored in one of the FIFOs. The command FIFOs know about the request even before the input to the multiplexer which multiplexes the data buses. It is also used to generate the module_wrrdy signal. The multiplexed data enters the Data FIFO. the output of the Data FIFO goes to the memory controller. The devices can post the data to this FIFO. The signal mem_wrrdy acts as a read control for the Data FIFO.

Every time mem_wrrdy (or mem_wrerr in case of error) is sampled asserted, the read pointer to the Data FIFO is incremented to get the next data word. The Data FIFO also stores the byte enables. The module_wrrdy signal is generated from the internal wrrdy signal "int_wrrdy". This signal indicates the readiness of this module to accept the data from the devices. Whenever there is a request in the Command FIFO and the Data FIFO is not full, this signal will be asserted. The data_mux_select signal steers the int_wrrdy to the appropriate module.

The depths of the Command FIFO MUST be same as the depth of the FIFO in the memory controller. The depth of the Data FIFO can be varied depending on the specific implementation. When the Command FIFO is empty and the arbiter gives a new request, the incoming req id and beats information is directly loaded into beat_cntr and data_mux_select. The requests enter the Command FIFO whenever the arbiter asserts the qual_gnt signal. This same signal triggers the Memory Request Engine State machine. Thus whenever it samples the qual_gnt signal, it will go to the LATCH state and this is the earliest it can generate the mem_req. The memory controller may thus give the mem_wrrdy on the next clock after sampling mem_req asserted. This module will always be ahead of the memory controller by one clock.

The Read Command FIFO Control Logic, shown in FIG. 28, accepts the grant information from the Arbiter and puts it in a FIFO. The depth of the FIFO is parameterized. It is equal to that of the FIFO in the memory controller. When memory controller gives mem_rdrdy, this logic will steer the data and ready to the proper device as selected by the first entry in the Read Command FIFO. This logic also needs to know the size of the data transfer requested by the device, to flush the entries out of the Read Command FIFO. The block diagram of this module is shown in the FIG. 28. From multiplexed tsize, tcmd and tbst signals, the size of the data transfer in terms of number of clocks is calculated. The grant vector will give the id of the device.

The information about the requester id and # of clocks for the data transfer, are stored in a FIFO. The output from the FIFO is loaded into the registers dmx_slct and beat_cntr. The value is dmx_slct acts as a select input to the demultiplexer. There are 2 demultiplexers. One demultiplexes the mem_rdrdy signal and the other demultiplexes the signal mem_rderr. Thus mem_rdrdy and dmx_slct will generate module_rdrdy [n:0]. Smilarly mem_rderr and dmx_slct will generate module_rderr[n:0].

The beat counter counts the number of cycles for which either mem_rdrdy or mem_rderr is asserted. This register is loaded with the number of beats of data transfer the device requested. For example, if a device wants to read 16 bytes from the memory, the value loaded in this counter will be 4. The counter will decrement on any clock on which it samples either mem_rdrdy or mem_rderr asserted. When it reaches 1, and either mem_rdrdy or mem_rederr is asserted, it indicates that the current data transfer is the last data transfer. A signal xfr_done is generated. This signal increases the read pointer to the command FIFO.

An entry enters the FIFO whenever the MAQM block accepts the request. The write pointer is incremented for every entry that enters the FIFO. The FIFO never becomes full. This is because the FIFO depth is the same as that of the memory controller's request FIFO. The memory controller stops accepting the request when it's FIFO is full, thus the READ command FIFO never gets full. When the FIFO is empty, we can load the registers dmx_slct and beat_cntr, directly from the inputs req_id and beats respectively. But the information is also entered in the FIFO so that the FIFO status exactly reflects the status of the FIFO in the memory controller. The signal mem_rderr will also set a bit in the status register. This can also generate an interrupt to the host CPU. The device, which receives the signal module_rderr, will discard the data given to it by memory.

The registers in this modules are the Interrupt Status Register and the Q Transaction Register. The interrupt status register indicates the state of different flags. The Q transaction register contains the translate group information from the latest translate cycle. The Host can access the contents of the Q pointer RAMs. Each Queue requires 82 bits for storing 26 bit read pointer, 26 bit write pointer, 8 bit flags, 4 bit size, 8 bit threshold, 5 bit high watermark, 5 bit low watermark. These bits are divided into 5 groups. For each group there is one SRAM. The groups are listed below and comprise a Read Pointer, a Write Pointer, a Threshold, a Flags, and a Size, High Watermark and Low Watermark register.

Each queue is allocated 16 bytes. There can be 256 such queues. The detail description of the registers is given in the tables below.

TABLE 19

Interrupt Register

| Register Field | Bit Position | R | W | Data | Description |
|---|---|---|---|---|---|
| Reserved | 0000_0000_0000_0000 fedc_ba98_765 | R R | | | Power On Reset Value Reruns 0000_0000_000b |
| | | | W | XX | No effect |
| Write To Full Queue Interrupt | ---- ---- ---4 ---- | R | | | Returns the state of the Write To Full Queue Register. This bit is set when a device attempts write operation to a already full Queue. No Effect |
| | | | W | 0 1 | Clears the Write to Full Queue Interrupt |
| Read From an Empty Queue | ---- ---- ---- 3--- | R | | | Returns the state of the Read from an empty queue interrupt. This bit is set when a device tries to read from an already empty queue. No Effect |
| | | | W | 0 1 | Clears the Read From an Empty Queue Interrupt |
| Interrupt on Error During the Write | ---- ---- ---- -2-- | R | | | Returns the state of the Error during Write Cycle Interrupt. This bit is set if, memory controller asserts mem_wrerr during data transfer of write operation. No Effect |
| | | | W | 0 1 | Clears the Error During Write Cycle Interrupt |
| Interrupt On | ---- ---- ---- --1- | R | | | Returns the state of the Error |

TABLE 19-continued

Interrupt Register

| Register Field | Bit Position | R | W | Data | Description |
|---|---|---|---|---|---|
| Error During Read Cycle | | | | | During the Read Cycle Interrupt. This bit is set if the memory controller asserts mem_rderr during the data transfer of a read operation. |
| | | | W | 0 | No Effect |
| | | | | 1 | Clears the Error During Read Cycle Interrupt |
| Interrupt on Lock Expiry | ---- ---- ---- ---0 | R | | | Returns the state of the lock expired interrupt. This bit is set if a device gives more than 8 requests during the LOCK condition. No Effect |
| | | | W | 0 | Clears the Lock Expired Interrupt. |
| | | | | 1 | |

TABLE 20

Queue Transaction Register

| Register Field | Bit Position | R | W | Data | Description |
|---|---|---|---|---|---|
| | 0000_0000_0000_0000 | R | | | Power On Reset Value |
| Wrap Around | ---c ---- ---- ---- | R | | 1 | Indicates that the Write Pointer to the Queue specified by the queue id field, is wrapped around the queue size, but the read pointer to the queue is not wrapped around. |
| | | | | 0 | Write Pointer is not wrapped around or Both the pointers wrapped around. |
| | | | W | X | No Effect |
| Lower Water Mark Crossed | --- b--- ---- ---- | R | | 1 | Date available in the queue is less than the threshold value |
| | | | | 0 | Data available in the queue is more than the low threshold value. |
| | | | W | X | No Effect |
| High Water Mark Crossed | ---- -a-- ---- ---- | R | | 1 | Data in the queue is more than the high threshold value. |
| | | | | 0 | Data in the queue is less than the high threshold value. |
| | | | W | X | No Effect |
| Q Empty | ---- --9- ---- ---- | R | | 1 | Queue Empty. |
| | | | | 0 | Queue is not Empty. |
| | | | W | X | No Effect |
| Q Full | ---- ---8 ---- ---- | R | | 1 | Queue Full. |
| | | | | 0 | Queue is not full. |
| | | | W | X | No Effect. |
| Queue ID | ---- ---- 7654 3210 | R | | | Returns the ID of the queue |
| | | | W | X | No Effect. |

Queue Registers

Lower Read Pointer to a Queue N, offset 0x1000+16*N

TABLE 21

Lower Read Pointer

| Register Field | Bit Position | R | W | Date | Description |
|---|---|---|---|---|---|
| Lower Read Pointer | fedc_ba98_ 7654_3210 | R | | | Returns the lower 16 bits of the read pointer to queue #N. |
| | | | W | Data | Initializes the lower 16 bits of the read pointer to the queue N. |

Upper Read Pointer to the Queue #N, offset 0x1000+16*N+2

TABLE 22

Upper Read Pointer

| Register Field | Bit Position | R | W | Data | Description |
|---|---|---|---|---|---|
| Upper Read Pointer to Q #N | ---- --98 7654 3210 | R | | | Returns the upper 10 bits of the read pointer to the Queue N. |
| | | | W | Data | Initializes the upper read pointer with the value data. |

Lower Write Pointer to the Queue #N, offset 0x1000+16*N+4

TABLE 23

Lower Write Pointer

| Register Field | Bit Position | R | W | Data | Description |
|---|---|---|---|---|---|
| Lower Write Pointer to the Q #N | fedc_ba98_ 7654_3210 | R | | | Returns the lower 16 bits of the write pointer to the Queue N. |
| | | | W | Data | Initializes the lower 16 bits of the write pointer to the Queue N. |

Upper Write Pointer to the Queue #N, offset 0x1000+16*N+6

TABLE 24

Upper Write Pointer

| Register Field | Bit Position | R | W | Data | Description |
|---|---|---|---|---|---|
| Upper Write Pointer to the Queue #N | ----_--98_ 7654_3210 | R | | | Returns the upper 10 bits of the write pointer to the queue #N. |
| | | | W | Data | Initializes the upper 10 bits of the write pointer to Queue #N, with the value "data". |

Threshold Register to the Queue #N, offset 0x1000+16*N+0x8

TABLE 25

Threshold Register

| Register Field | Bit Position | R | W | Data | Description |
|---|---|---|---|---|---|
| Threshold Value | ----_----_ 7654_3210 | R | | | Returns the threshold value for the Queue #N |
| | | | W | Data | Initializes the threshold value for the Queue #N. The threshold value is used in determining the Q full and empty status of the queue. If data available in the queue > (Q size-threshold), Q Full flag in the interrupt register will be set. If data available in the queue < threshold value, Q Empty flag will be set. |

Queue Size and High, Low Water Mark Register of the Queue #N, offset 0x1000+16*N+0xA

TABLE 26

Q Size and Water Mark Register

| Register Field | Bit Position | R | W | Data | Description |
|---|---|---|---|---|---|
| Q Size | --dc_ba--_----_---- | R | | 0000 | Q Size = 32 bytes |
| | | | | 0001 | Q Size = 64 bytes |
| | | | | 0010 | Q Size = 128 bytes |
| | | | | 0011 | Q Size = 256 bytes |
| | | | | 0100 | Q Size = 512 bytes |
| | | | | 0101 | Q Size = 1 K Bytes |
| | | | | 0110 | Q Size = 2 K Bytes |
| | | | | 0111 | Q Size = 4 K Bytes |
| | | | | 1000 | Q Size = 8 K Bytes |
| | | | | 1001 | Q Size = 16 K Bytes |
| | | | | 1010 | Q Size = 32 K Bytes |
| | | | | 1011 | Q Size = 64 K Bytes |
| | | | | 1100 | Q Size = 128 K Bytes |
| | | | | 1101 | Q Size = 256 K Bytes |
| | | | | 1110 | Q Size = 512 K Bytes |
| | | | | 1111 | Q Size = 1M Bytes |
| | | | W | Data | Initializes the Q Size as per the endcoding shown above. |
| High Watermark | ----_--98_765-_---- | R | | | This field along with the Q Size is used to determine the high water mark level. HWM Level = (W Size/32) * high water mark |
| | | | W | Data | Initializes the high water mark field. |
| Low Water Mark | ----_----_---4_3210 | R | | | This filed along with the Q Size is used to determine the low water mark. LWM Level = (Q size/32) * low water mark |
| | | | W | Data | Initializes the Low Water Mark. |

Flag Register for the Queue #N, offset 0x1000 30 16*N+0xC

TABLE 27

Flag Register

| Register Field | Bit Position | R | W | Data | Description |
|---|---|---|---|---|---|
| | 0000_0000_000X_XXXX | R | | | Power On Reset Value |
| Wrap Around | ----_----_---4_---- | R | | 1 | The Write Pointer to the Q wrapped around. |
| | | | | 0 | The write Pointer is not wrapped around or both the pointers are wrapped around. |
| | | | W | d | Sets or clears this bit. |
| High Water Mark Crossed | ----_----_----_3--- | R | | 1 | The Data Available in the Q is more than the high water mark level. |
| | | | | 0 | The data available in the Q is less than the high water mark level. |
| | | | W | d | Sets or clears this bit. |
| Low Water Mark Crossed | ----_----_----_-2-- | R | | 1 | The Data available in the Q is less than the low water mark level. |
| | | | | 0 | The data available in the Q is more than the low water mark level. |
| | | | W | d | Sets or clears this bit. |
| Q Full | ----_----_----_--1- | R | | 1 | The data available in the Q is more than (Q size-threshold value). |
| | | | | 0 | The data available in the Q is less t than (Q Size-threshold value). |
| | | | W | d | Sets or clears this bit. |
| Q Empty | ----_----_----_---0 | R | | 1 | The Data available in the Q is less than threshold value. |
| | | | | 0 | The Data available in the Q is more than threshold value. |
| | | | W | d | Sets or clears this bit. |

Other embodiments of the invention will be apparent to those skilled in the art from consideration of the specification and practice of the invention disclosed herein. For example, many of the principles described herein may also be applied to other digital audio/video communications systems other than those defined by the MPEG standards, or to program stream applications which typically focus on local media versus a networked environment. It is intended that the specification and examples be considered as exemplary only, with a true scope and spirit of the invention being indicated by the following claims.

What is claimed is:

1. A transport demultiplexor for use in a digital information network to receive an encoded, multiplexed transport packet stream comprising a plurality of transport packets, and to provide a plurality of demultiplexed audio/video bitstreams to corresponding audio/video decoders, the transport demultiplexor comprising:
    a real-time packet synchronizer to frame and synchronize the plurality of transport packets;
    a real-time packet identifier coupled to receive the framed transport packets from the packet synchronizer, and to identify distinct audio/video bitstreams within the multiplexed transport packet stream based on a packet identifier associated with each of the transport packets;
    a post-processing demultiplexor coupled to receive the framed transport packets and to extract the distinct audiovideo bitstreams from the framed transport packets based on the identification by the real-time packet identifier, wherein the distinct audio/video bitstreams are extracted independent of real-time operations; and
    a memory arranged to independently store the distinct audio/video bitstreams, and to output the distinct audio/video bitstreams to their corresponding audio/video decoders.

2. The transport demultiplexor according to claim 1, wherein the post-processing demultiplexor comprises:
    a transport stream bus;
    a system bus;
    a sky queue;
    a plurality of data queues;
    a transport DMA engine coupled to the transport stream bus;
    a host processor coupled to the system bus; and
    a Memory Arbiter and Queue Manager (MAQM) unit coupled to the transport stream bus; and
    system memory coupled to the MAQM unit;
    wherein the MAQM unit controls access to data transfers occurring over the transport stream bus.

3. A transport demultiplexor for use in a digital information network to receive an encoded, multiplexed transport packet stream comprising a plurality of transport packets, and to provide a plurality of demultiplexed audio/video bitstreams to corresponding audio/video decoders, the transport demultiplexor comprising:
    a real-time packet synchronizer to frame and synchronize the plurality of transport packets;
    a real-time packet identifier coupled to receive the framed transport packets from the packet synchronizer, and to identify distinct audio-video bitstreams within the multiplexed transport packet stream based on a packet identifier associated with each of the transport packets;
    a post-processing demultiplexor coupled to receive the framed transport packets and to extract the distinct audio-video bitstreams from the framed transport packets based on the identification by the real-time packet identifier, wherein the distinct audio-video bitstreams are extracted independent of real-time operations;
    a memory arranged to independently store the distinct audio/video bitstreams, and to output the distinct audiovideo bitstreams to their corresponding audio/video decoders; and wherein the post-processing demultiplexor includes a transport stream bus, a system bus, a sky queue, a plurality of data queues, a transport DMA engine coupled to the transport stream bus, a host processor coupled to the system bus, a Memory Arbiter and Queue Manager (MAQM) unit coupled to the transport stream bus, and system memory coupled to the MAQM unit;

wherein the MAQM unit controls access to data transfers occurring over the transport stream bus, and includes a memory request engine, an arbiter unit, a datapath control logic unit, wherein the memory request engine receives and forwards device bus access requests to a memory controller and translates request addresses to physical memory access, wherein the arbiter accepts device bus access requests and grants devices access to the transport stream bus, and wherein the datapath control logic unit generates control signals to steer memory data to a receiving device and accepts memory data from devices to be stored in memory.

4. The transport demultiplexor according to claim 3, wherein the memory request engine accepts bus access grant information from the arbiter unit to generate memory addresses for any memory access operations.

5. The transport demultiplexor according to claim 3, wherein the memory request engine generates physical memory addresses for any memory access operation using a queueing addressing mechanism.

6. The transport demultiplexor according to claim 3, wherein the memory request engine generates physical memory addresses for any memory access operation using a base address multiplexing mechanism.

7. The transport demultiplexor according to claim 3, wherein the memory request engine generates physical memory addresses for any memory access operation using a offset multiplexing mechanism.

8. The transport demultiplexor according to claim 3, wherein the arbiter unit comprises:
   an arbiter state machine;
   a lock detection circuit; and
   a grant flip flop;
   wherein the arbiter unit maintains a bus grant status.

9. The transport demultiplexor according to claim 8, wherein the arbiter unit accepts device bus lock requests to provide a device with continuous control of the transport stream bus.

10. The transport demultiplexor according to claim 8, wherein the arbiter unit provides a time-out mechanism to prevent a device bus lock request from preventing other devices from accessing the transport stream bus.

11. The transport demultiplexor according to claim 8, wherein the arbiter unit provides access to multiple requesting devices using a round robin priority scheme.

12. The transport demultiplexor according to claim 3, wherein the datapath control logic unit comprises:
   a write data FIFO;
   a read data FIFO;
   a command FIFO;
   an output multiplexer; and
   a input demultiplexer;
   wherein the datapath control logic unit performs data transfer operations between a memory controller and the transport stream bus.

13. The transport demultiplexor according to claim 12, wherein transport stream bus data passes through the write data FIFO when a memory write command is processed by the datapath control logic unit.

14. The transport demultiplexor according to claim 12, wherein transport stream bus data passes through the read data FIFO when a memory read command is processed by the datapath control logic unit.

* * * * *